United States Patent
Yoshida et al.

(10) Patent No.: US 7,151,582 B2
(45) Date of Patent: Dec. 19, 2006

(54) LIQUID CRYSTAL DISPLAY DEVICE WITH NEGATIVE RETARDATION OF RETARDATION PLATES BEING APPROXIMATELY ZERO.

(75) Inventors: Hidefumi Yoshida, Kawasaki (JP); Takahiro Sasaki, Kawasaki (JP); Yuichi Inoue, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 277 days.

(21) Appl. No.: 10/079,008

(22) Filed: Feb. 19, 2002

(65) Prior Publication Data

US 2003/0011731 A1   Jan. 16, 2003

(30) Foreign Application Priority Data

Apr. 4, 2001   (JP) .............................. 2001-106283

(51) Int. Cl.
*G02F 1/1335* (2006.01)

(52) U.S. Cl. .................. 349/119; 349/129; 349/118; 349/120

(58) Field of Classification Search ................ 349/129, 349/117, 119, 109
See application file for complete search history.

(56) References Cited

U.S. PATENT DOCUMENTS

| | | | | |
|---|---|---|---|---|
| 3,914,022 | A * | 10/1975 | Kashnow | 349/178 |
| 4,701,028 | A * | 10/1987 | Clerc et al. | 349/98 |
| 5,189,538 | A * | 2/1993 | Arakawa | 349/120 |
| 5,229,873 | A * | 7/1993 | Hirose et al. | 349/146 |
| 5,344,916 | A * | 9/1994 | Harris et al. | 528/353 |
| 6,166,791 | A * | 12/2000 | Mitsui et al. | 349/112 |
| 6,166,793 | A * | 12/2000 | Hayashi et al. | 349/113 |
| 6,493,050 | B1 * | 12/2002 | Lien et al. | 349/106 |
| 6,657,695 | B1 * | 12/2003 | Song et al. | 349/143 |
| 6,680,766 | B1 * | 1/2004 | Larson et al. | 349/121 |
| 6,686,981 | B1 * | 2/2004 | Noritake et al. | 349/113 |

FOREIGN PATENT DOCUMENTS

| | | |
|---|---|---|
| JP | 1-270024 | 10/1989 |
| JP | 3-5721 | 1/1991 |
| JP | 5-19247 | 1/1993 |
| JP | 06-317795 | 10/1994 |
| JP | 07311383 A * | 11/1995 |
| JP | 8-292423 | 11/1996 |

(Continued)

OTHER PUBLICATIONS

Clerc, "Vertically Aligned Liquid Crystal Displays," proceedings of the SID 1991.*

(Continued)

*Primary Examiner*—Andrew Schechter
*Assistant Examiner*—Lucy Chien
(74) *Attorney, Agent, or Firm*—Greer, Burns & Crain, Ltd.

(57) ABSTRACT

A liquid crystal display device includes a liquid crystal cell, polarizers, a first retardation plate arranged between the liquid crystal cell and the first polarizer, and a second retardation plate arranged between the liquid crystal cell and the second polarizer. Each retardation plate has an optical axis in a plane parallel to the substrate surface and a retardation of substantially λ/4. The optical axis of one retardation plate is perpendicular to the optical axis of the other. The polarizing axes of the polarizers are arranged at an angle of 45° with respect to the optical axes of the retardation plates. The liquid crystal cell is arranged such that a state of alignment of liquid crystal molecules changes, accompanying a change in a polar angle and/or change in an azimuth, upon application of a voltage.

3 Claims, 50 Drawing Sheets

FOREIGN PATENT DOCUMENTS

| | | |
|---|---|---|
| JP | 9-258013 | 10/1997 |
| JP | 10-10487 | 1/1998 |
| JP | 10-68942 | 3/1998 |
| JP | 10-282489 | 10/1998 |
| JP | 10-301097 | 11/1998 |
| JP | 11-223814 | 8/1999 |
| JP | 11-352489 | 12/1999 |
| JP | 2000-29010 | 1/2000 |
| JP | 2000-347174 | 12/2000 |

OTHER PUBLICATIONS

Wei et al., "Vide-Viewing-Angle Polymer Stabilized Homeotropically Aligned (PSHA) LCD," SID Proc, 1998.

* cited by examiner

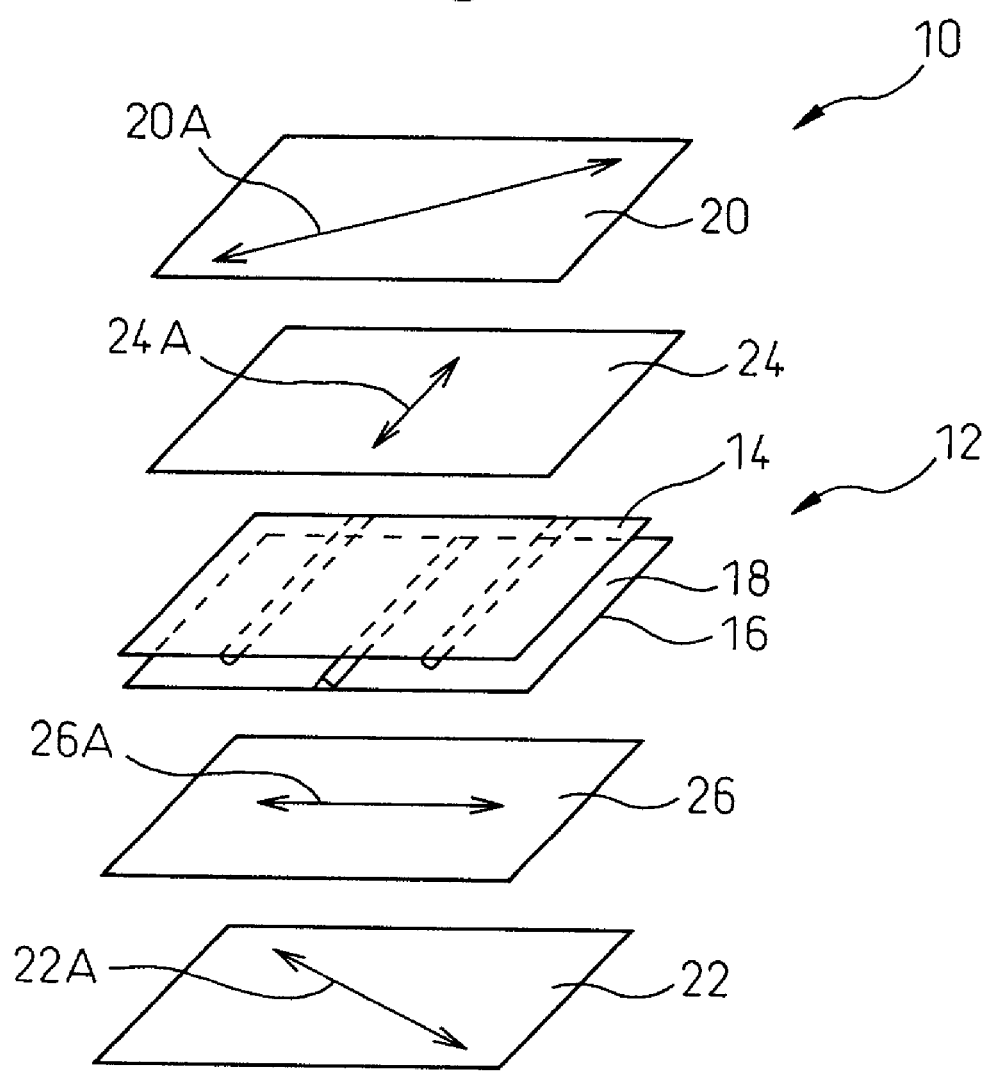

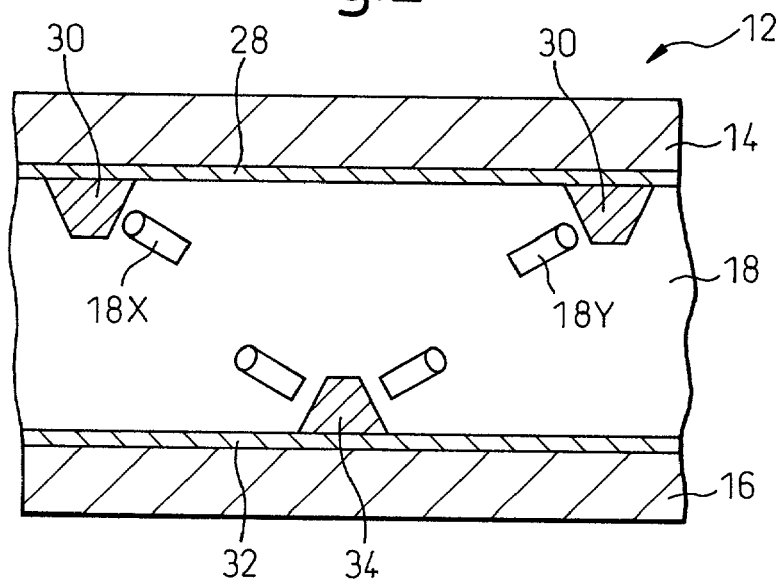
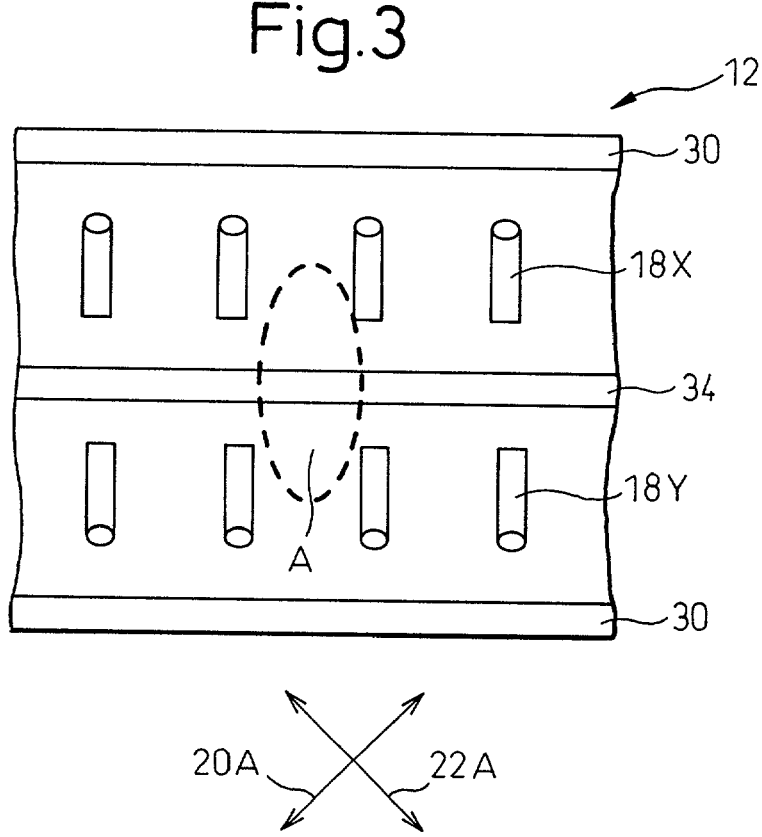

Fig.5
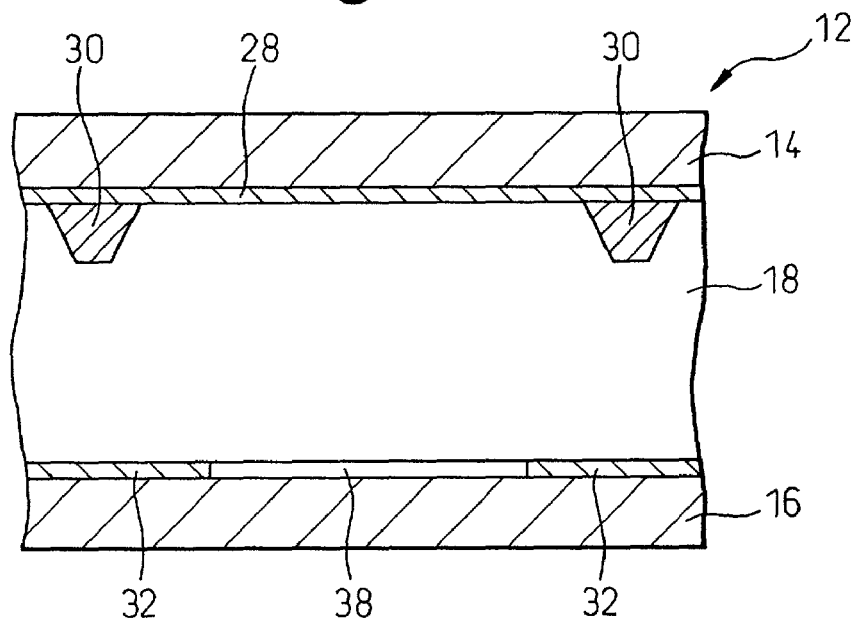
Fig.6
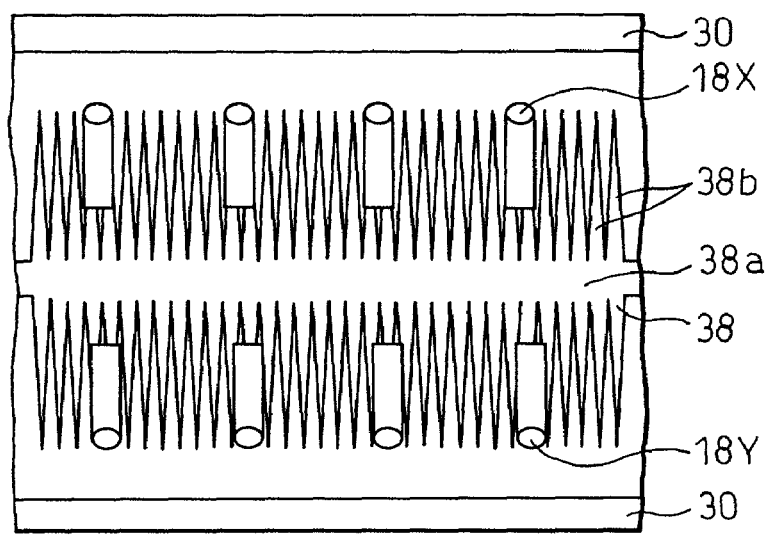
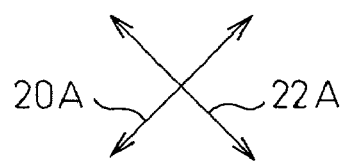

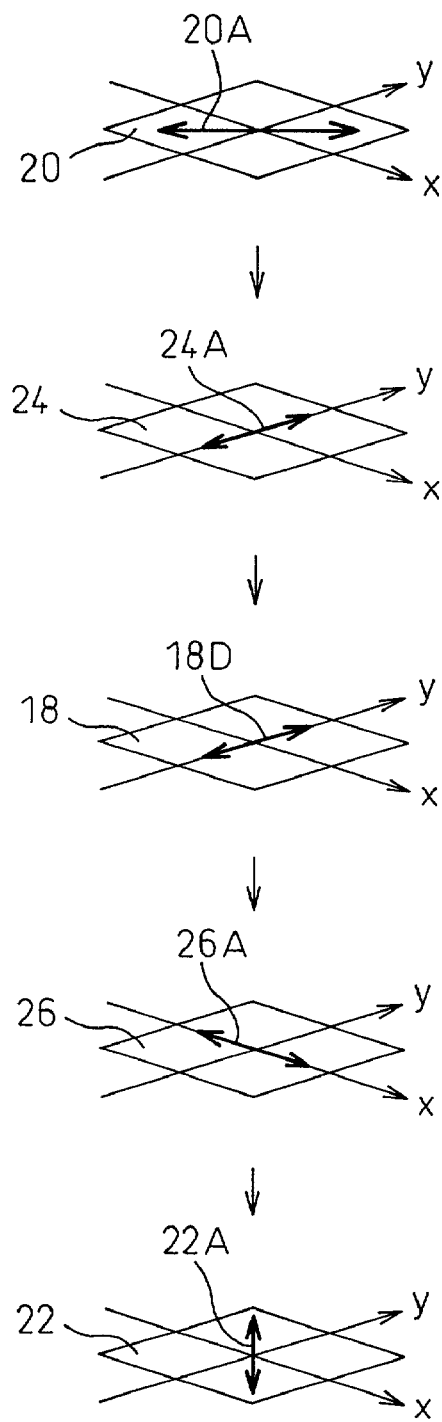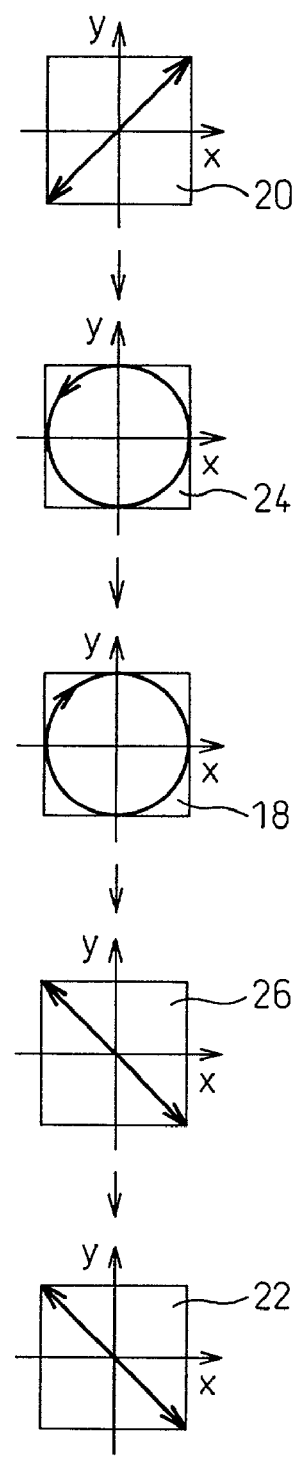

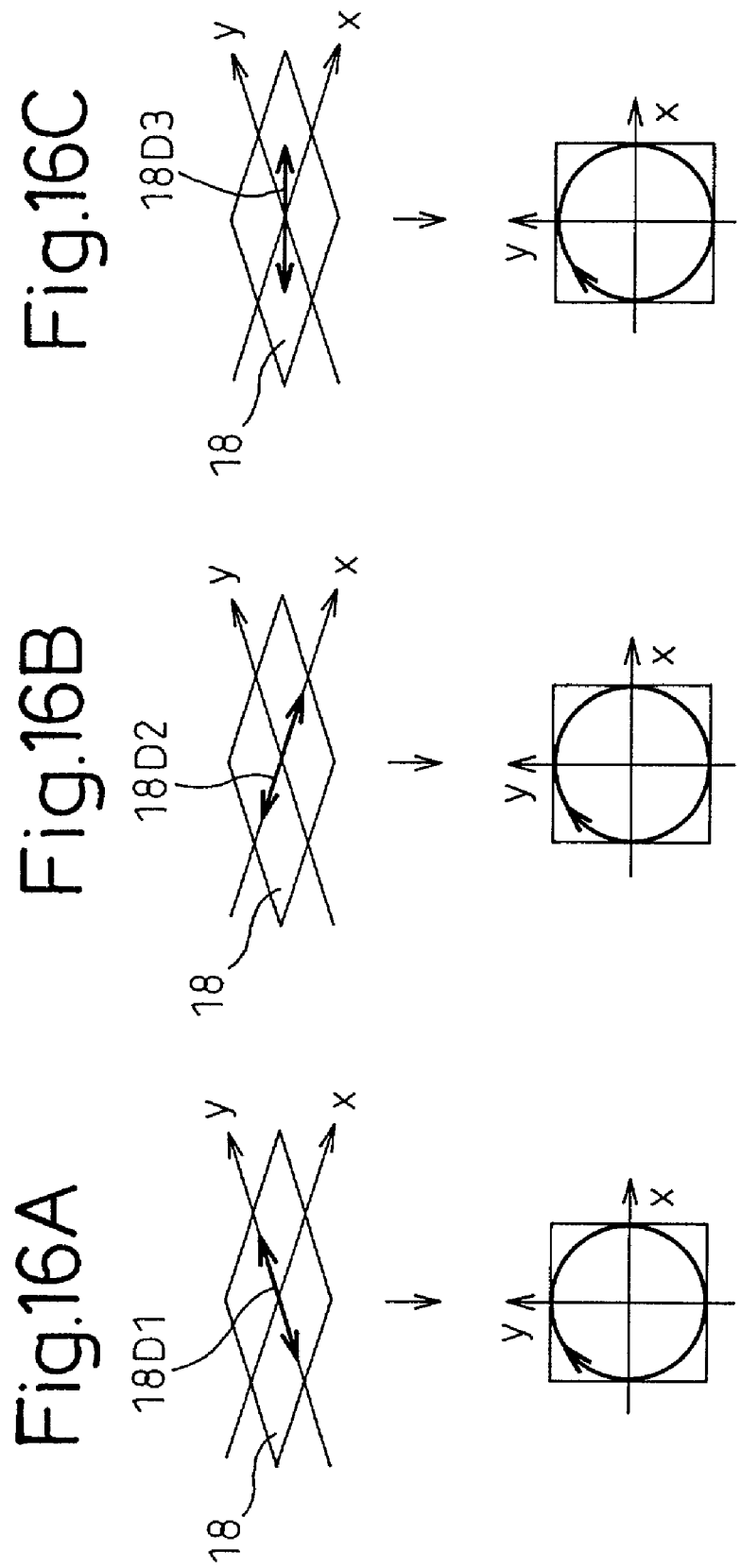

Fig.17A  Fig.17B  Fig.17C
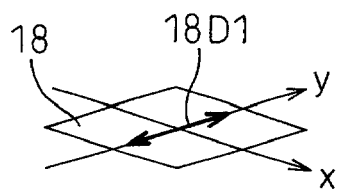 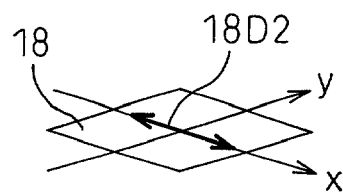 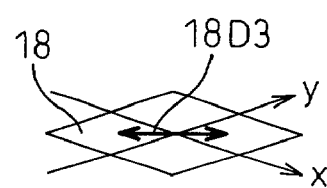
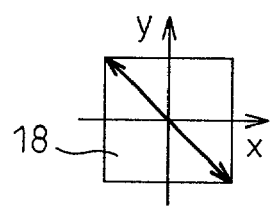 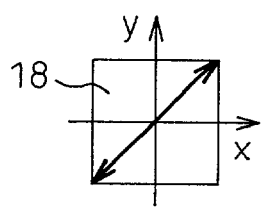 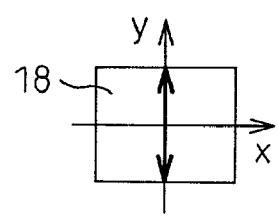
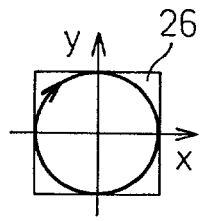 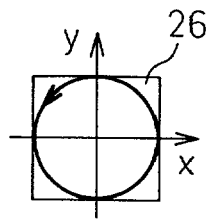 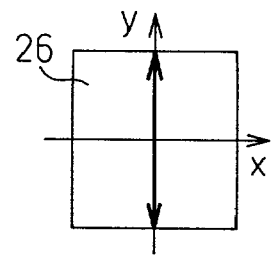
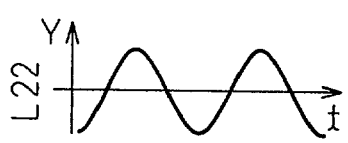  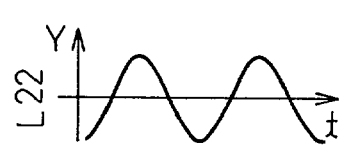

Fig.38
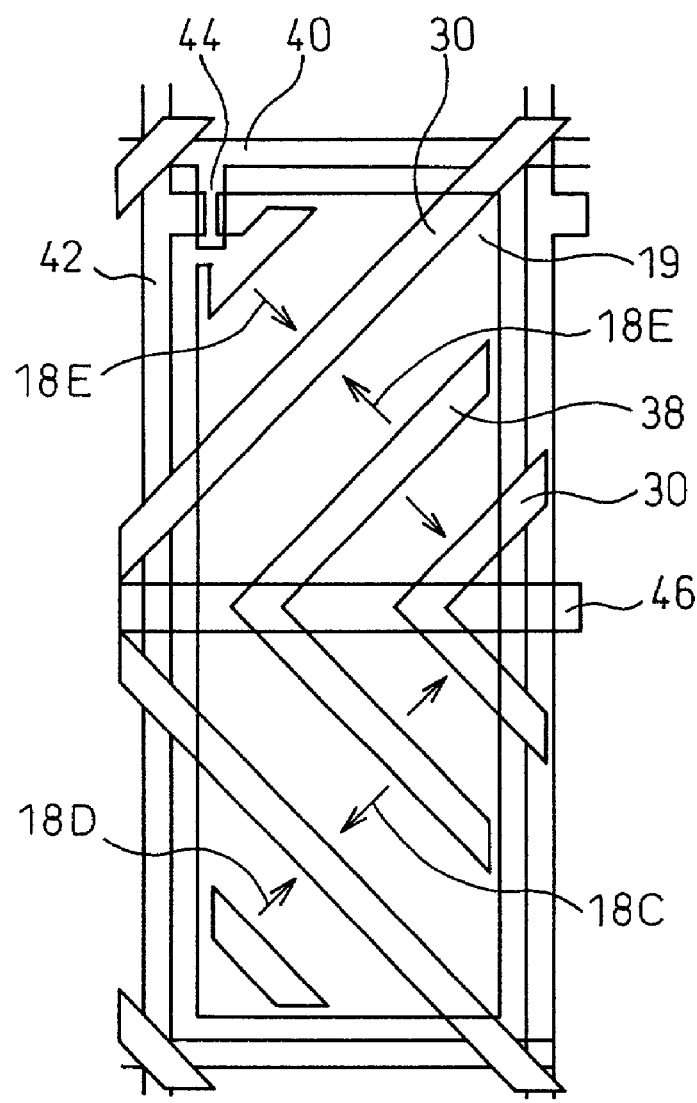
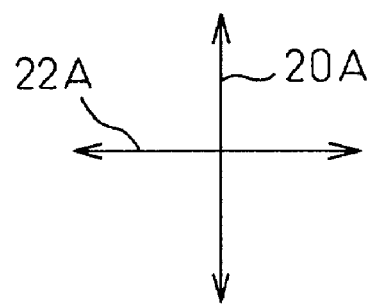

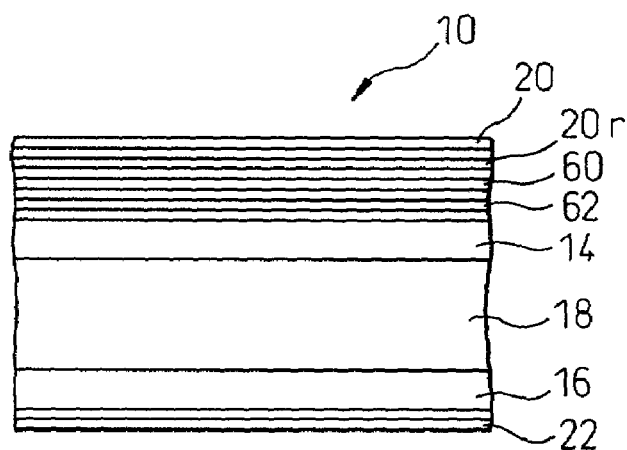
Fig.56
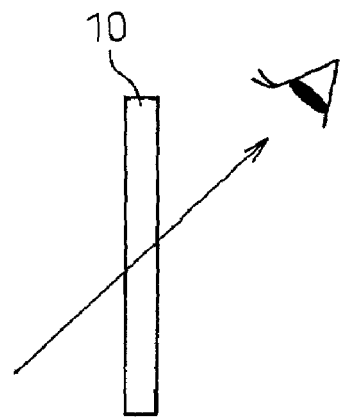 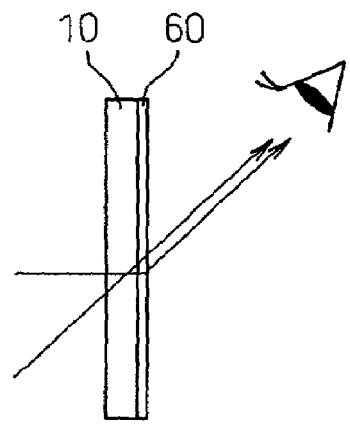
Fig.57A  Fig.57B

LIQUID CRYSTAL DISPLAY DEVICE WITH NEGATIVE RETARDATION OF RETARDATION PLATES BEING APPROXIMATELY ZERO.

BACKGROUND OF THE INVENTION

1. Field of the Invention

The present invention relates to a liquid crystal display device having an improved viewing angle characteristic.

2. Description of the Related Art

In a liquid crystal display device, it is well known that the contrast of the display in the case of taking an oblique view of the image area is different from the contrast of the display in the case of taking a front view of the image area (the viewing angle characteristic). Therefore, there is a demand for a liquid crystal display device having an improved viewing angle characteristic.

Japanese Unexamined Patent Publications No. 1-270024 and No. 2000-29010 disclose a liquid crystal display device including a vertical alignment type liquid crystal cell, first and second polarizers arranged on either side of the liquid crystal cell, a first λ/4 plate arranged between the liquid crystal cell and the first polarizer, and a second λ/4 plate arranged between the liquid crystal cell and the second polarizer. When the polarizers and the λ/4 plates are arranged as described above, it is possible to improve the viewing angle characteristic in the case of taking an oblique viewing of the image area.

However, although the viewing angle characteristic of the liquid crystal display device having the polarizers and λ/4 plates can be improved, the range of the viewing angle, in which a viewer can see the display with high contrast, is relatively small.

Also, as a technique for improving the viewing angle characteristic of the liquid crystal display device, there is provided a technique of alignment division. In the technique of alignment division, one pixel is divided into a plurality of regions or domains, the states of alignment of which are different from each other, so that a viewer can see a display with high contrast even when the viewer takes an oblique view of the image area in the same manner as that when the viewer takes a front view of the image area. Especially, the assignee of the present application proposes a vertical alignment type liquid crystal display device having structures or slits which linearly extend on or in electrodes on the substrates between which the liquid crystal layer is interposed.

In this liquid crystal display device, most of the liquid crystal molecules are aligned substantially perpendicularly to the substrate surfaces when a voltage is not applied. However, liquid crystal molecules located close to the structure or slit tend to be aligned perpendicular to the wall surface of the structure or slit and pre-tilted with respect to the substrate surface. When voltage is applied, liquid crystal molecules located close to the structure or slit are inclined according to the pre-tilt so that they are inclined to a predetermined direction. Therefore, most of the liquid crystal molecules are inclined according to the liquid crystal molecules located close to the structure or slit.

The direction of alignment of liquid crystal molecules located on one side of the structure or slit is opposite to the direction of alignment of liquid crystal molecules located on the other side of the structure or slit. Therefore, two regions, the directions of alignment of which are different from each other, are formed on either side of the structure or slit. Therefore, even if rubbing is not conducted on the liquid crystal display device, it is possible to realize the alignment division similar to that of the liquid crystal display device in which pre-tilt is provided by rubbing. Therefore, when alignment division is conducted as described above, it is possible to obtain a viewing angle characteristic in which the viewing angle range is wide and the contrast is high. The liquid crystal display device having alignment division is disclosed, for example, in Japanese Unexamined Patent Publication No. 11-352489.

Japanese Patent No. 2945143 discloses a liquid crystal display device in which a polymer dispersed type liquid crystal display device is interposed between polarizers in a Cross Nicol arrangement. Japanese Unexamined Patent Publication No. 2000-347174 discloses a network-like polymer dispersed type liquid crystal display device.

In the above described liquid crystal display device having alignment division, the state of alignment of most liquid crystal molecules in one pixel is approximately controlled according to the predetermined structures or slits when voltage is applied. However, sometimes, the state of alignment of a portion of the liquid crystal molecules in one pixel cannot be controlled according to the predetermined structures or slits. For example, liquid crystal molecules located close to the bus lines located in the periphery of the pixel tend to be aligned perpendicularly to the wall surface of the bus lines. Therefore, the state of alignment of the liquid crystal molecules is different from the state of alignment of the liquid crystal molecules controlled according to the predetermined structures or slits, which could be a cause of deterioration of brightness. Liquid crystal molecules on the predetermined structures or slits are aligned in parallel to the predetermined structures or slits. The polarizers are arranged so that the axes of polarization can form an angle of 45° with respect to the director of the liquid crystal molecules when voltage is applied. However, a portion of the liquid crystal molecules become parallel to the axis of polarization, which could be a cause of deterioration of brightness.

SUMMARY OF THE INVENTION

An object of the present invention is to provide a liquid crystal display device by which a viewer can see an excellent image area over a wide viewing angle and which provides for high brightness.

According to the first aspect of the present invention, there is provided a liquid crystal display device comprising a liquid crystal cell comprising a pair of substrates and a liquid crystal layer arranged between the pair of substrates, first and second polarizers arranged on either side of the liquid crystal cell, a first retardation plate arranged between the liquid crystal cell and the first polarizer, and a second retardation plate arranged between the liquid crystal cell and the second polarizer. Each of the first and second retardation plates has an optical axis in a plane parallel to the surfaces of the substrates, and a retardation of substantially λ/4. The optical axis of the first retardation plate is perpendicular to the optical axis of the second retardation plate, and the first and second polarizers have polarizing axes arranged at an angle of 45° with respect to the optical axes of the first and second retardation plates. The liquid crystal cell is arranged such that a state of alignment of the liquid crystal molecules changes, accompanying change in a polar angle and/or change in an azimuth upon application of voltage.

According to the above arrangement, it is possible to provide a liquid crystal display device by which a viewer can see an excellent image area over a wide viewing angle and which provides for high brightness.

Also, if an azimuth angle distribution is provided in the state of alignment of liquid crystal molecules when the liquid crystal molecules are arranged horizontally or obliquely with respect to the substrate surfaces, the transmittance can be improved.

According to the second aspect of the present invention, there is provided a liquid crystal display device comprising a liquid crystal cell comprising a pair of substrates and a liquid crystal layer arranged between the pair of substrates, first and second polarizers arranged on either side of the liquid crystal cell, a first retardation plate arranged between the liquid crystal cell and the first polarizer, and a second retardation plate arranged between the liquid crystal cell and the second polarizer. Each of the first and second retardation plates has an optical axis in a plane parallel to the surfaces of the substrates, and a retardation of substantially $\lambda/4$. The optical axis of the first retardation plate is perpendicular to the optical axis of the second retardation plate. The first and second polarizers have polarizing axes arranged at an angle of 45° with respect to the optical axes of the first and second retardation plates. The liquid crystal of the liquid crystal cell is of a vertical alignment type, the liquid crystal cell includes structures or slits arranged on or in an electrode of at least one of the substrates, and a state of alignment of the liquid crystal molecules located on one side of the structure or slit is different from a state of alignment of the liquid crystal molecules located on the other side of the structure or slit. At least one of the pair of substrates has electrically conductive linear structures.

According to the above arrangement, it is possible to provide a liquid crystal display device by which a viewer can see an excellent image area having a wide viewing angle and which provides for a high brightness.

According to the third aspect of the present invention, there is provided a liquid crystal display device comprising a liquid crystal cell comprising a pair of substrates and a liquid crystal layer arranged between the pair of substrates, first and second polarizers arranged on either side of the liquid crystal cell, a first retardation plate arranged between the liquid crystal cell and the first polarizer, and a second retardation plate arranged between the liquid crystal cell and the second polarizer. Each of the first and second retardation plates has an optical axis in a plane parallel to the surfaces of the substrates, and a retardation of substantially $\lambda/4$. The optical axis of the first retardation plate is perpendicular to the optical axis of the second retardation plate. The first and second polarizers have polarizing axes arranged at an angle of 45° with respect to the optical axes of the first and second retardation plates. The liquid crystal of the liquid crystal cell is of a vertical alignment type, the liquid crystal cell includes structures or slits arranged on or in an electrode of at least one of the substrates, and a state of alignment of the liquid crystal molecules located on one side of the structure or slit is different from a state of alignment of the liquid crystal molecules located on the other side of the structure or slit. A retardation in the plane of the retardation plate is not less than 120 μm and not more than 160 μm.

According to the above arrangement, it is possible to provide a liquid crystal display device by which a viewer can see an excellent image area over a wide viewing angle and which provides for a high contrast.

According to the fourth aspect of the present invention, there is provided a liquid crystal display device comprising a liquid crystal cell comprising a pair of substrates and a liquid crystal layer arranged between the pair of substrates and a film causing light to scatter in a specific direction. Liquid crystal of the liquid crystal cell is of a vertical alignment type, the liquid crystal cell includes structures or slits arranged on or in an electrode of at least one of the substrates, and a state of alignment of the liquid crystal molecules located on one side of the structure or slit is different from a state of alignment of the liquid crystal molecules located on the other side of the structure or slit.

According to the above arrangement, it is possible to provide a liquid crystal display device by which a viewer can see an excellent image area over a wide viewing angle and which provides for a high brightness.

According to the fifth aspect of the present invention, there is provided a liquid crystal display device comprising a liquid crystal cell comprising a pair of substrates and a liquid crystal layer arranged between the pair of substrates, first and second polarizers arranged on either side of the liquid crystal cell, a first retardation plate arranged between the liquid crystal cell and the first polarizer, and a second retardation plate arranged between the liquid crystal cell and the second polarizer. Each of the first and second retardation plates has an optical axis in a plane parallel to the surfaces of the substrates and a retardation of substantially $\lambda/4$. The optical axis of the first retardation plate is perpendicular to the optical axis of the second retardation plate. The first and second polarizers have polarizing axes arranged at an angle of 45° with respect to the optical axes of the first and second retardation plates. The liquid crystal layer of the liquid crystal cell contains liquid crystal and resin coexisting with the liquid crystal.

According to the above arrangement, it is possible to provide a liquid crystal display device by which a viewer can see an excellent image area over a wide viewing angle and which provides for a high brightness.

According to the sixth aspect of the present invention, there is provided a liquid crystal display device comprising a liquid crystal cell comprising a pair of substrates and a liquid crystal layer arranged between the pair of substrates, first and second polarizers arranged on either side of the liquid crystal cell, a first retardation plate arranged between the liquid crystal cell and the first polarizer, and a second retardation plate arranged between the liquid crystal cell and the second polarizer. Each of the first and second retardation plates has an optical axis in a plane parallel to the surfaces of the substrates and a retardation of substantially $\lambda/4$. The optical axis of the first retardation plate is perpendicular to the optical axis of the second retardation plate. The first and second polarizers have polarizing axes arranged at an angle of 45° with respect to the optical axes of the first and second retardation plates. The liquid crystal of the liquid crystal cell is of a vertical alignment type, and a polymer network is formed in the liquid crystal layer of the liquid crystal cell. Pretilt of the liquid crystal molecules and an inclination direction of the liquid crystal molecules upon application of voltage are regulated by the polymer network.

According to the above arrangement, it is possible to provide a liquid crystal display device by which a viewer can see an excellent image area over a wide viewing angle and which provides for a high brightness.

BRIEF DESCRIPTION OF THE DRAWINGS

The present invention will become more apparent from the following description of the preferred embodiments, with reference to the accompanying drawings, in which:

FIG. 1 is a diagrammatic view showing a liquid crystal display device of the first embodiment of the present invention;

FIG. 2 is a schematic cross-sectional view showing a liquid crystal cell of FIG. 1;

FIG. 3 is a schematic plan view showing the linear structures and liquid crystal molecules of the liquid crystal cell of FIG. 2;

FIG. 5 is a schematic cross-sectional view showing a variation of the liquid crystal cell of FIG. 2;

FIG. 6 is a schematic plan view of the liquid crystal cell of FIG. 5;

FIG. 15A is a view showing the relation among polarizing axes of the first and second polarizers, optical axes of the first and second retardation plates, and a direction of the liquid crystal layer, for explaining the action of the retardation plate ($\lambda$/4);

FIG. 15B is a view showing the state of light passing through the first polarizer, the first retardation plate, the liquid crystal layer, the second retardation plate and the second polarizer;

FIGS. 16A to 16C are views showing the polarized light passing through the liquid crystal layer in the case where the retardation of the liquid crystal layer is $\lambda$/2;

FIGS. 17A to 17C are views showing the polarized light passing through the liquid crystal layer and the retardation plate ($\lambda$/4) in the case where the retardation of the liquid crystal layer is $\lambda$/4;

FIG. 38 is a view showing an example of the alignment division used in FIG. 37A;

FIG. 56 is a view showing the liquid crystal display device of the fourth embodiment of the present invention;

FIGS. 57A and 57B are views for explaining the action of the specific direction light scattering film shown in FIG. 56;

DESCRIPTION OF THE PREFERRED EMBODIMENTS

Figure 4:
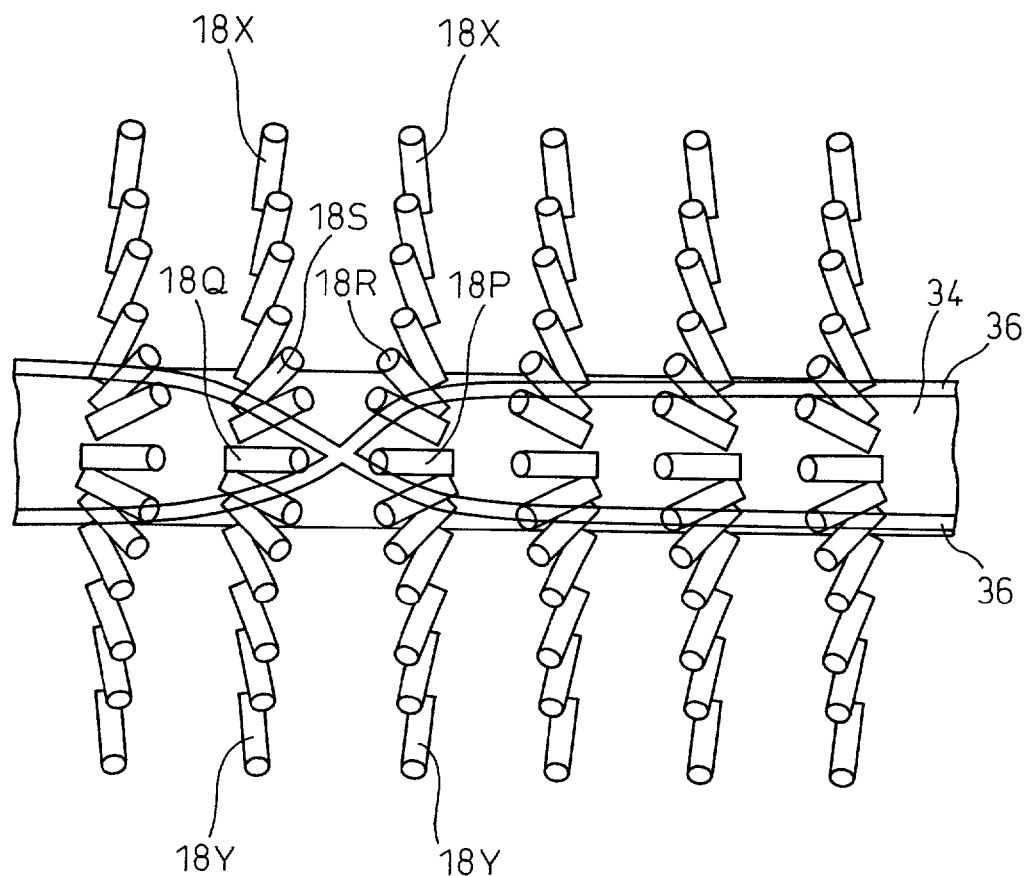
FIG. 4 is a view showing the portion A of FIG. 3 in detail.

Referring to the drawings, embodiments of the present invention will be explained below.

FIG. 1 is a view showing a liquid crystal display device of the first embodiment of the present invention. The liquid crystal display device 10 includes a liquid crystal cell 12. The liquid crystal cell 12 includes a pair of substrates 14 and 16 having electrodes, and a liquid crystal layer 18 arranged between the pair of substrates 14 and 16. Further, the liquid crystal display device 10 includes first and second polarizers 20 and 22 arranged on either side of the liquid crystal cell 12, a first retardation plate 24 arranged between the liquid crystal cell 12 and the first polarizer 20, and a second retardation plate 26 arranged between the liquid crystal cell 12 and the second polarizer 22.

Each of the first and second retardation plates 24 and 26 has an optical axis 24A, 26A in a plane parallel to the surfaces of substrates and a retardation of substantially λ/4. The optical axis 24A of the first retardation plate 24 is perpendicular to the optical axis 26A of the second retardation plate 26. The polarizing axes 20A and 22A of the first and second polarizers 20 and 22 are arranged at an angle of 45° with respect to the optical axes 24A and 26A of the first and second retardation plates 24 and 26.

The liquid crystal 18 of the liquid crystal cell 12 is of the vertical alignment type. The liquid crystal cell 12 is composed so that the state of alignment of the liquid crystal molecules changes accompanying a change in the polar angle and a change in the azimuth upon application of voltage.

FIG. 2 is a schematic cross-sectional view showing the liquid crystal cell 12 of FIG. 1, and FIG. 3 is a schematic plan view showing the linear structures and the liquid crystal molecules of the liquid crystal cell 12 of FIG. 2. The first substrate 14 has an electrode 28 and linear structures (ribs) 30 formed on the electrode 28 and made of dielectric substance. The second substrate 16 has an electrode 32 and linear structures (ribs) 34 formed on the electrode 32 and made of dielectric substance. Further, the first and second substrates 14 and 16 respectively have vertical alignment films (not shown), and the liquid crystal 18 has a negative anisotropy of the dielectric constant. One of the electrode 28 of the first substrate 14 and the electrode 34 of the second substrate 16 is a common electrode, and the other comprises pixel electrodes formed together with TFTs. Further, the substrate having the common electrode has a color filter.

Only two linear structures 30 of the first substrate 14 are shown, however, it is possible to arrange a desired number of linear structures in parallel to each other. Only one linear structure 34 of the second substrate 16 is shown, however, it is possible to arrange a desired number of linear structures in parallel to each other. As shown in FIG. 3, the linear structures 28 and 34 are alternately arranged so that they can be parallel to each other when they are viewed on a plan view.

In the vertical alignment type liquid crystal display device, in general, when voltage is not applied, liquid crystal molecules are aligned substantially perpendicularly to the substrate surfaces, and when voltage is applied, liquid crystal molecules are inclined with respect to the substrate surfaces. When the linear structures 30 and 34 are arranged, most of the liquid crystal molecules are aligned substantially perpendicularly to the substrate surfaces when voltage is not applied, but the liquid crystal molecules 18X and 18Y located close to the linear structures 30 and 34 tend to align perpendicularly to the wall surfaces of the linear structures 30 and 34 and are pretilted with respect to the substrate surfaces. Therefore, when voltage is applied, the liquid crystal molecules 18X and 18Y located close to the linear structures 30 and 34 are inclined in a predetermined direction according to the pretilt, so that most of the liquid crystal molecules are inclined depending on these liquid crystal molecules 18X and 18Y.

The direction of alignment of the liquid crystal molecules 18X located on one side of the linear structure 34 is opposite to the direction of alignment of the liquid crystal molecules 18Y located on the other side of the linear structure 34, so two regions in which the states of alignment are different from each other are formed on either side of the linear structures 34. This is also applied to the linear structures 30. Accordingly, even if rubbing is not conducted in this liquid crystal display device 10, it is possible to realize the alignment division in the same manner as in the case where pretilt is provided by rubbing. By the alignment division, it is possible to obtain an excellent viewing angle characteristic with high contrast in a wide viewing angle range.

That is, in a common liquid crystal display device, when a viewer sees an image area in the direction of the major axis of the inclined liquid crystal molecules, the image area looks blackish, and when the viewer sees the image area in the direction perpendicular to the major axis of the inclined liquid crystal molecules, the image area looks whitish. In the alignment division, there are liquid crystal molecules 18X, which are inclined onto one side, and liquid crystal molecules 18Y, which are inclined onto the other side, in one pixel, so a whitish image and a blackish image are averaged in the image area, and accordingly, it is possible for the viewer to see the image area with high contrast even if the image area is seen by a viewer in all oblique directions, in the same manner as that of a case in which the viewer takes a front view of the image area. In this way, in the vertical alignment type liquid crystal display device, the alignment division can realize an excellent viewing angle characteristic.

FIG. 4 is a view showing the portion A of FIG. 3 in detail. In the liquid crystal display device in which the alignment is divided in this way, the state of alignment of most liquid crystal molecules in one pixel is substantially controlled according to the predetermined structures 30 and 34 when voltage is applied. That is, when voltage is applied, the state of alignment of liquid crystal molecules changes from a state of alignment in which the liquid crystal molecules are substantially perpendicular to the substrate surfaces to a state of alignment in which the liquid crystal molecules are inclined with respect to the substrate surfaces, accompanying a change in the polar angle.

However, in some cases, the state of alignment of a portion of the liquid crystal molecules, upon application of voltage cannot be controlled only by the predetermined structures 30 or 34. For example, as described above, the liquid crystal molecules 18X, which are inclined onto one side with respect to the structure 30 or 34, and the liquid crystal molecules 18Y, which are inclined onto the other side with respect to the structure 30 or 34, must be continuously aligned to each other. Therefore, the liquid crystal molecules 18P and 18Q, which are located intermediately between the liquid crystal molecules 18X and 18Y and on the structure 30 or 34, are aligned in parallel with the structure 30 or 34. The liquid crystal molecules 18R and 18S adjacent to the liquid crystal molecules 18P and 18Q are aligned, forming an angle of 45° with respect to the structure 30 or 34, for example.

The polarizers 20 and 22 are arranged in such a manner that the polarizing axes 20A and 22A form an angle of 45° with respect to the director of the liquid crystal molecules upon application of voltage. The director of the liquid crystal molecules 18X, 18Y, 18P, and 18Q shown in FIG. 4 forms an angle of 45° with respect to the polarizing axes 20A and 22A. However, the director of the liquid crystal molecules 18R and 18S becomes parallel to the polarizing axes 20A and 22A. Therefore, black is displayed when white should be displayed, and black lines represented by reference numeral 36 appear. That is, there is a problem that brightness is deteriorated.

Further, since the direction of inclination of the liquid crystal molecules 18R and 18S on the structure 30 or 34 cannot be controlled, part of the liquid crystal molecules 18R on the structure 30 or 34 and the other part of the liquid crystal molecules 18S on the structure 30 or 34 are aligned opposite to each other, immediately after voltage has been applied. When a certain time passes after the application of voltage, the liquid crystal molecules 18R and 18S, which are aligned opposite to each other, are rotated in a plane of the sheet of FIG. 4 (the state of alignment changes accompanying change in the azimuth) and, therefore, most of the liquid crystal molecules 18R and 18S on the structure 30 or 34 are directed in the same direction and stabilized. Response time is determined at the point of time when the state of alignment of the liquid crystal molecules 18R and 18A is stabilized. Accordingly, the change in the state of alignment accompanying the change in the azimuth of the liquid crystal molecules 18R and 18S causes a problem in which the response of the liquid crystal display device is deteriorated.

As described above, explanation has been given of the liquid crystal display device having the structures 30 and 34. However, the same explanation may be made for a liquid crystal display device slits, which will be explained later, instead of the structures 30 and 34. Not only the state of alignment of the liquid crystal molecules 18R and 18S on the structure 30 and 34 but also the state of alignment of the liquid crystal molecules located close to the pixel edge is different from the state of alignment of the liquid crystal molecules 18X and 18Y on either side of the structures 30 and 34, which could be a cause of deterioration of brightness.

The inventors have found that the problems of deterioration of brightness and deterioration of the response of the liquid crystal display device with alignment division conducted as described above, can be solved by arranging the first retardation plate ($\lambda/4$) 24 and the second retardation plate ($\lambda/4$) 26, as shown in FIG. 1.

FIGS. 15A and 15B are views for explaining the action of the retardation plate ($\lambda/4$) 24. In FIG. 15A, the polarizing axes 20A and 22A of the first and second polarizers 20 and 22 are perpendicular to each other, and the optical axes (slow axes) 24A and 26A of the first and second retardation plates 24 and 26 and are perpendicular to each other. The polarizing axes 20A and 22A of the first and second polarizers 20 and 22 and the optical axes (slow axes) 24A and 26A of the first and second retardation plates 24 and 26 are arranged at an angle of 45° with each other. In FIG. 15A, it is assumed that the optical axis 24A of the first retardation plate 24 passes through the y-axis, and the optical axis 26A of the second retardation plate 26 passes through the x-axis. The liquid crystal layer 18 is provided with the director 18D as a whole. The polarizing axes 20A and 22a of the first and second polarizers 20 and 22 are arranged at an angle of 45° with respect to the director 18D of the liquid crystal layer 18.

FIG. 15B is a view showing the state of light passing through the first polarizer 20, the first retardation plate 24, the liquid crystal layer 18, the second retardation plate 26 and the second polarizer 22. Light made incident to the first polarizer 20 becomes linearly polarized light; linear polarized light made incident to the first retardation plate 24 becomes counterclockwise circularly polarized light; circularly polarized light made incident to the liquid crystal layer 18 becomes clockwise circularly polarized light; circularly polarized light made incident to the second retardation plate 26 becomes linearly polarized light; and linearly polarized light made incident to the second polarizer 22 transmits through the second polarizer 22. In this case, retardation of the liquid crystal layer 18 is $\lambda/2$.

FIGS. 16A to 16C show the cases in which retardation of the liquid crystal layer 18 is $\lambda/2$. FIG. 16A shows a case in which the director 18D1 of the liquid crystal layer 18 is parallel to the y-axis, FIG. 16B shows a case in which the director 18D2 of the liquid crystal layer 18 is parallel to the x-axis, and FIG. 16C shows a case in which the director 18D3 of the liquid crystal layer 18 forms an angle of 45° with respect to the x-axis. As can be seen in FIGS. 16A to 16C, all light transmitting through the liquid crystal layer 18 becomes circular polarized light, irrespective of the direction of the director 18D of the liquid crystal layer 18. Accordingly, the transmittance of light finally transmitting through the second polarizer 22 does not depend upon the direction of the director 18D of the liquid crystal layer 18.

FIGS. 17A to 17C show the cases in which retardation of the liquid crystal layer 18 is λ/4. FIG. 17A shows a case in which the director 18D1 of the liquid crystal layer 18 is parallel to the y-axis, FIG. 17B shows a case in which the director 18D2 of the liquid crystal layer 18 is parallel to the x-axis, and FIG. 17C shows a case in which the director 18D3 of the liquid crystal layer 18 is arranged at an angle of 45° with the x-axis. In FIG. 17A, in the case where retardation of the liquid crystal layer 18 is λ/4 and the director 18D1 of the liquid crystal layer 18 is parallel to the y-axis, circular polarized light transmitting through the first retardation plate 24 is transmitted through the liquid crystal layer 18 and becomes linear polarized light. When this linear polarized light is transmitted through the second retardation plate 26, it becomes circular polarized light, and a component (L22) of the circular polarized light in the direction of y-axis is transmitted through the second polarizer 22.

In FIG. 17B, in the case where retardation of the liquid crystal layer 18 is λ/4 and the director 18D2 of the liquid crystal layer 18 is parallel to the x-axis, circular polarized light transmitted through the first retardation plate 24 is transmitted through the liquid crystal layer 18 and becomes linear polarized light. When this linear polarized light is transmitted through the second retardation plate 26, it becomes circular polarized light, and a component (L22) of the circular polarized light in the direction of y-axis is transmitted through the second polarizer 22.

In FIG. 17C, in the case where retardation of the liquid crystal layer 18 is λ/4 and the director 18D3 of the liquid crystal layer 18 forms an angle of 45° with respect to the x-axis, circular polarized light transmitting through the first retardation plate 24 is transmitted through the liquid crystal layer 18 and becomes linear polarized light. When this linear polarized light is transmitted through the second retardation plate 26, it becomes linear polarized light, and a component (L22) of the linear polarized light in the direction of y-axis is transmitted through the second polarizer 22.

In this way, the directions of polarization of polarized light transmitted through the second retardation plate 26 are different from each other, but the transmittance of light finally transmitted through the second polarizer 22 does not depend upon the direction of the director 18D of the liquid crystal layer 18.

In the case where retardation of the liquid crystal layer 18 is different from λ/2 or λ/4, circular polarized light made incident to the liquid crystal layer 18 is transmitted through the liquid crystal layer 18 and becomes elliptic polarized light. In this case too, the transmittance of light transmitted through the second retardation plate 26 and the second polarizer 22 does not depend upon the director 18D of the liquid crystal layer 18.

Accordingly, even when the liquid crystal cell 12 has minute portions containing the liquid crystal molecules 18X, 18Y, 18P, 18Q, 18R and 18S, the directors of which are different, as explained referring to FIG. 4, circular polarized light is transmitted through the liquid crystal layer 18 and the second polarizer 22 in the same manner, without being affected by the change in the directors. Therefore, the deterioration of brightness can be prevented.

The fact that transmittance does not depend upon the director is advantageous in the aspect of the response property. That is, when a certain time passes after the application of voltage, the liquid crystal molecules 18R and 18S, the directions of which are opposite to each other, are rotated in a plane of the sheet of FIG. 4 (the state of alignment changes accompanying change in the azimuth), and the most of the liquid crystal molecules 18R and 18S on the structures 30 and 34 are directed in the same direction and stabilized. Conventionally, the response is determined at a point of time when the state of alignment of the liquid crystal molecules 18R, 18S is stabilized. However, in the present invention, the intensity of the polarized light transmitted through the second polarizer 22 has already become constant at a point of time when the liquid crystal molecules 18R and 18S on the structures 30 and 34 are inclined in the opposite direction, so it is not necessary to wait for change in the state of alignment accompanying change in the azimuth of the liquid crystal molecules 18R and 18S. Accordingly, the response time of the liquid crystal display device can be reduced.

Figure 18:
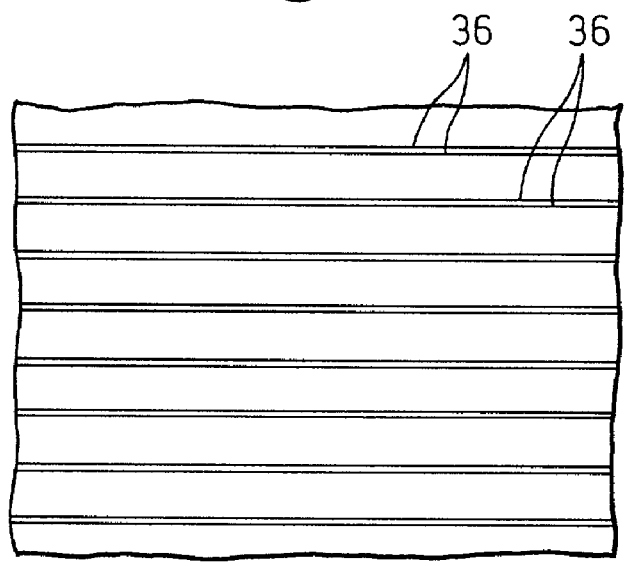
FIG. 18 is a view showing an example of an image area of a conventional liquid crystal display device in which the alignment division is conducted.

FIG. 18 is a view showing an example of an image area of a conventional liquid crystal display device with the alignment division. In FIG. 18, the black lines 36 appear, which have been explained referring to FIG. 4. The black lines 36 can be a cause of the deterioration of brightness.

Figure 19:
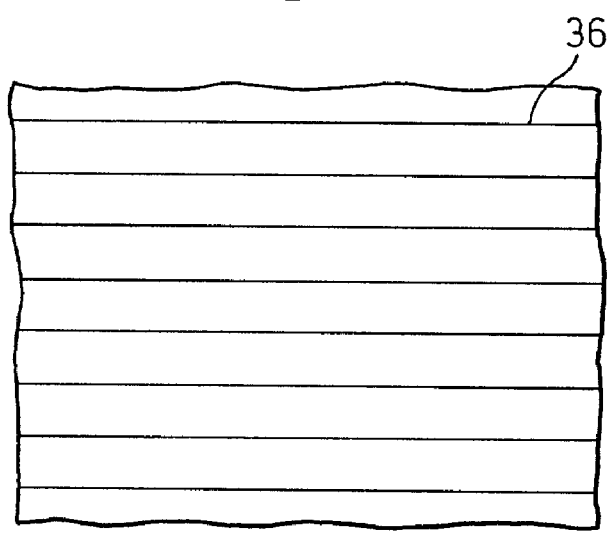
FIG. 19 is a view showing an example of an image area of the liquid crystal display device in which the alignment division is conducted and the first and second retardation plates are arranged.

FIG. 19 is a view showing an example of the image area of the liquid crystal display with the alignment division and the first and second retardation plates 26. In FIG. 18, the black lines 36 appear which have been explained referring to FIG. 4. In FIG. 19, the black lines 36 of FIG. 18 disappear.

Figure 20A:
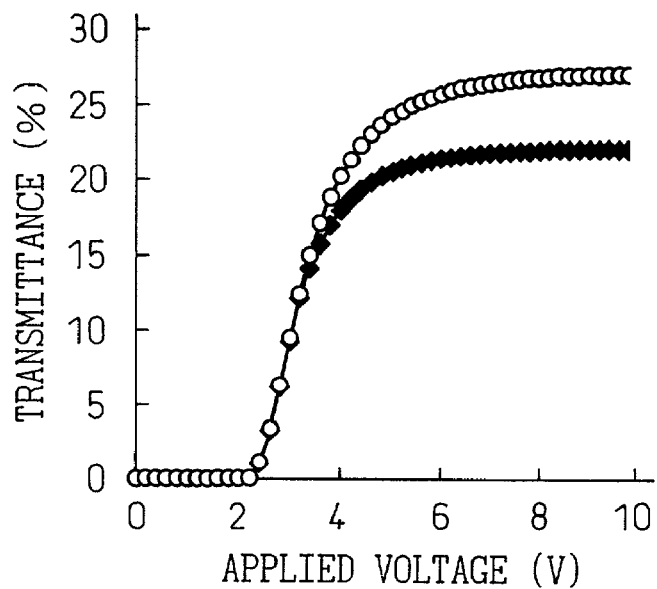
FIG. 20A is a view showing the relation between the applied voltage and the transmittance of the liquid crystal display device in which the alignment division is conducted according to the conventional manner and according to the present invention.
Figure 20B:
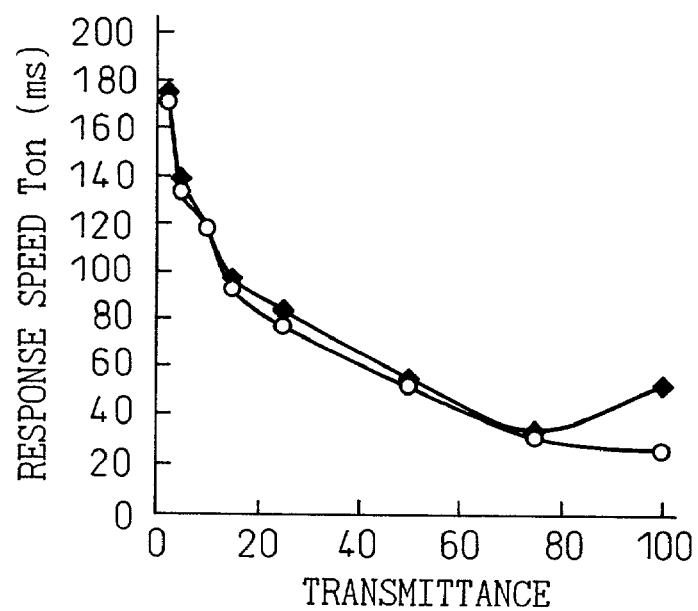
FIG. 20B is a view showing the relation between the transmittance and the speed of response.

FIG. 20A is a view showing the relation between the applied voltage and the transmittance of the liquid crystal display device with the alignment division, of the prior art and the present invention. A curve plotted by black points relates to the conventional liquid crystal display device, and a curve plotted by white points relates to the liquid crystal display device of the present invention. In both cases, the alignment division is realized by the combination of the linear structures 30 and the slit 38 (shown in FIGS. 5 and 6). The transmittance is increased by 1.19 times at the voltage of 5.4 V. FIG. 20B shows that the response speed is improved.

FIGS. 5 to 14 are views showing variations of the liquid crystal cell 12 in which the alignment division shown in FIGS. 2 to 4 is conducted. The liquid crystal cell 12 shown in FIGS. 5 to 14 can be adopted as the liquid crystal cell 12 shown in FIG. 1, and the liquid crystal cell 12 shown in FIGS. 5 to 14 provide with the action which is explained referring to FIGS. 15 to 20.

In FIGS. 5 to 6, the first substrate 14 has the electrode 28 and linear structures (ribs) 30 made of dielectric substance on the electrode 28. The second substrate 16 has the electrode 32 and slits 38 formed in the electrode 32. The slit 38 includes a slit base section 38a extending in the same manner as that of the linear structure 34 shown in FIG. 3, and minute slit sections 38b extending in the direction substantially perpendicular to the extending direction of the slit base section 38a. The slit base section 38a has the same action as that of the linear structure 34 shown in FIG. 3. Since the minute slit sections 38b are located in a portion forming a display domain, the influence of the electric field strain is transmitted to the liquid crystal molecules constituting the display domain at high speed, and it is possible to improve the performance of response of middle tone. Especially, when the shape of the minute slit sections 38b is formed in a group of triangles as shown in FIG. 6 so that the minute slit sections 38b extend in parallel to the substrate surface, the speed of response can be highly improved.

Figure 7:
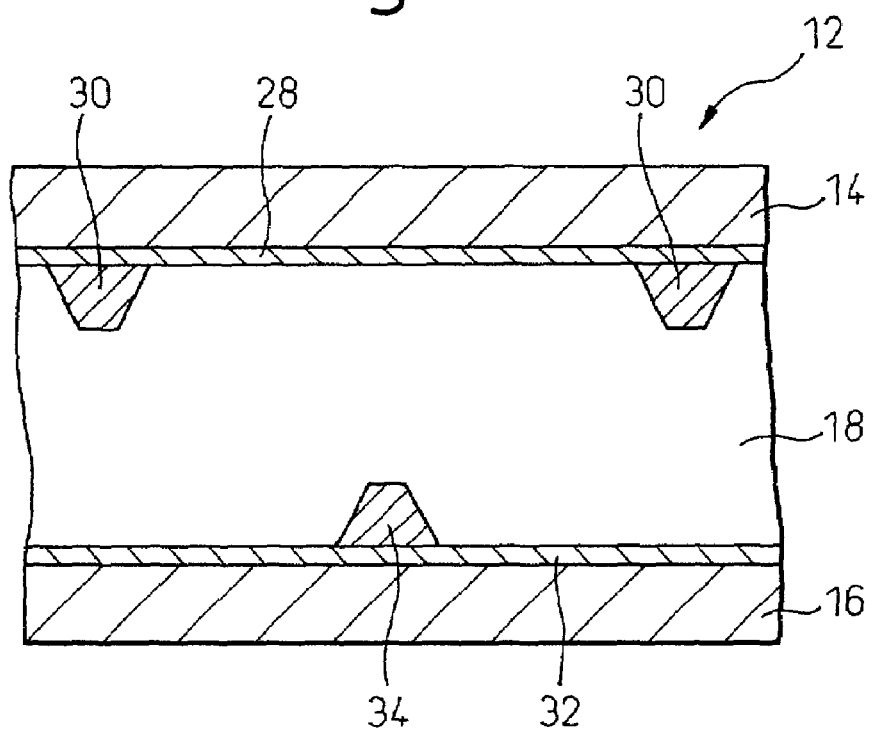
FIG. 7 is a schematic cross-sectional view showing a variation of the liquid crystal cell.
Figure 8:
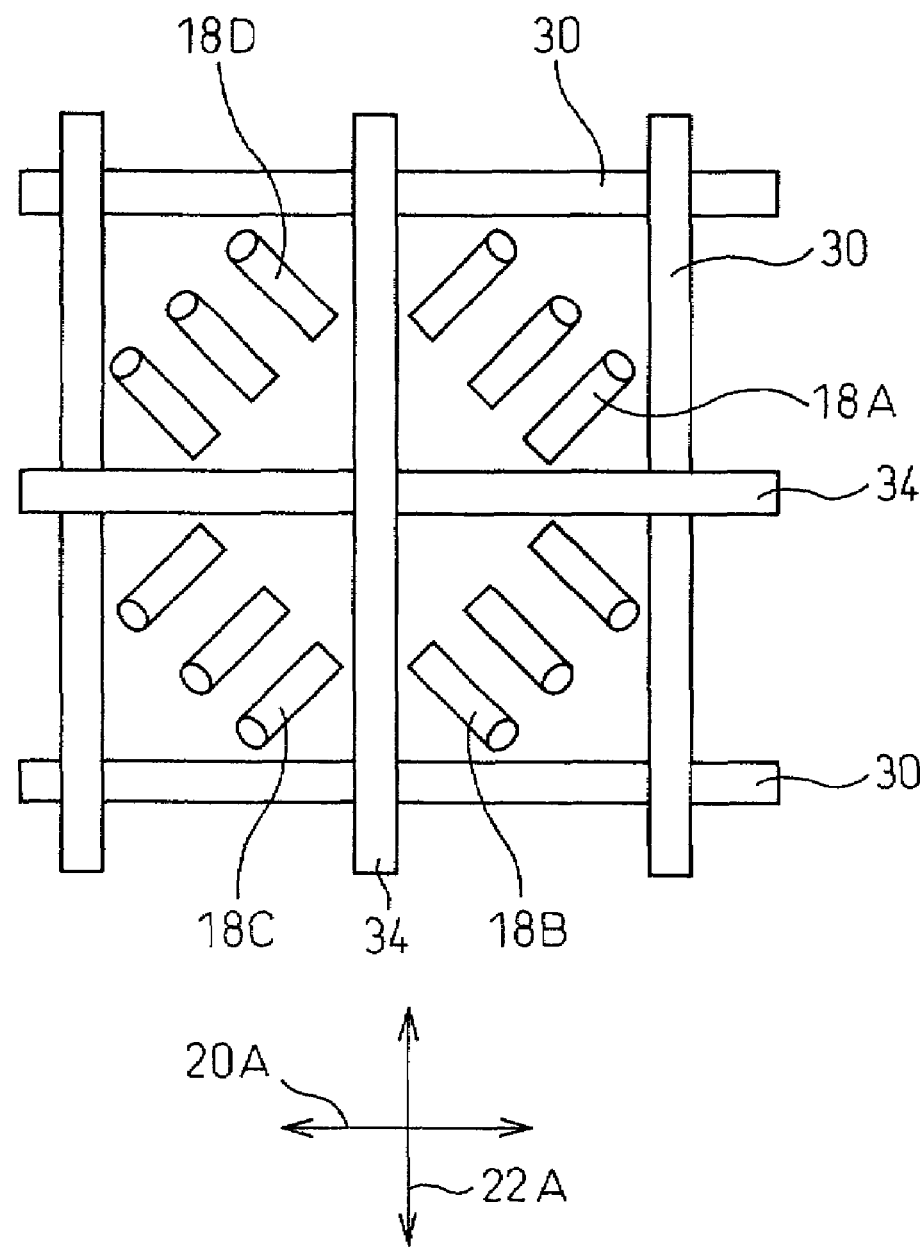
FIG. 8 is a schematic plan view showing the liquid crystal cell of FIG. 7.
Figure 9:
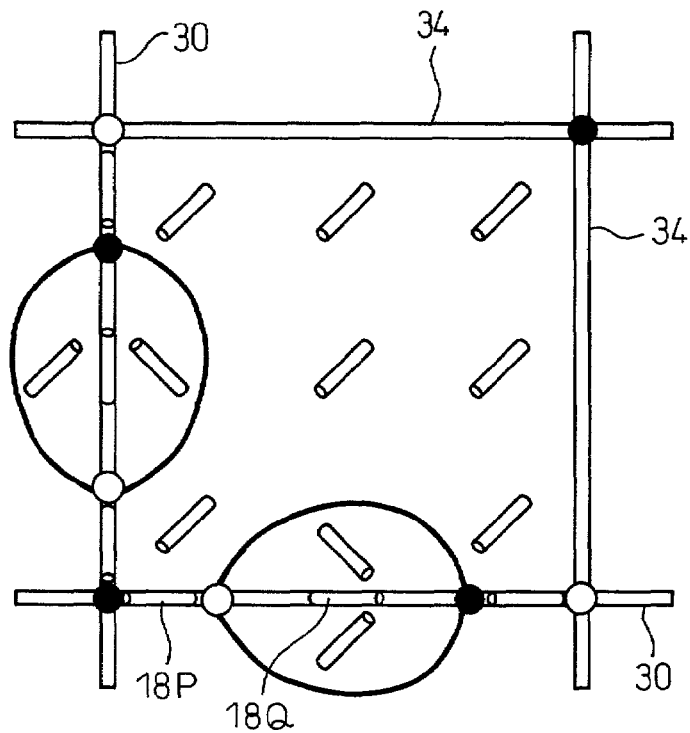
FIG. 9 is a view showing the portion of FIG. 8 in detail.

In FIGS. 7 to 9, the first substrate 14 includes the electrode 28 and linear structures (ribs) 30 made of dielectric substance on the electrode 28, and the second substrate 16 includes the electrode 32 and linear structures (ribs) 34 formed on the electrode 32. In this example, the linear structures 30 on the first substrate 14 are arranged in a grating pattern, and the linear structures 34 on the second substrate 16 are arranged in a grating pattern but shifted from the linear structures 30 on the first substrate 14. In this way, four liquid crystal alignment regions including the liquid crystal molecules 18A, 18B, 18C, 18D are formed in a cross portion of the linear structures 30 and 34. In this case, since the directions of alignment of the liquid crystal molecules 18A, 18B, 18C and 18D are different in the four liquid crystal alignment regions, the effect obtained by the alignment division can be further enhanced. In this case, the polarizing axes 20A and 22A of the first and second polarizers 20 and 22 are arranged in parallel to the linear structures 30 and 34, however, the liquid crystal molecules 18P and 18Q exist on the linear structures 30 and 34, which extend in parallel to the linear structures 30 and 34 and are arranged in the opposite direction to each other. The liquid crystal molecules 18P and 18Q would cause the black lines 36 and deteriorate the response. In the present invention, it is possible to improve the brightness and the response in the same manner as that described before, by providing the first and second retardation plates 24 and 26.

Figure 10:
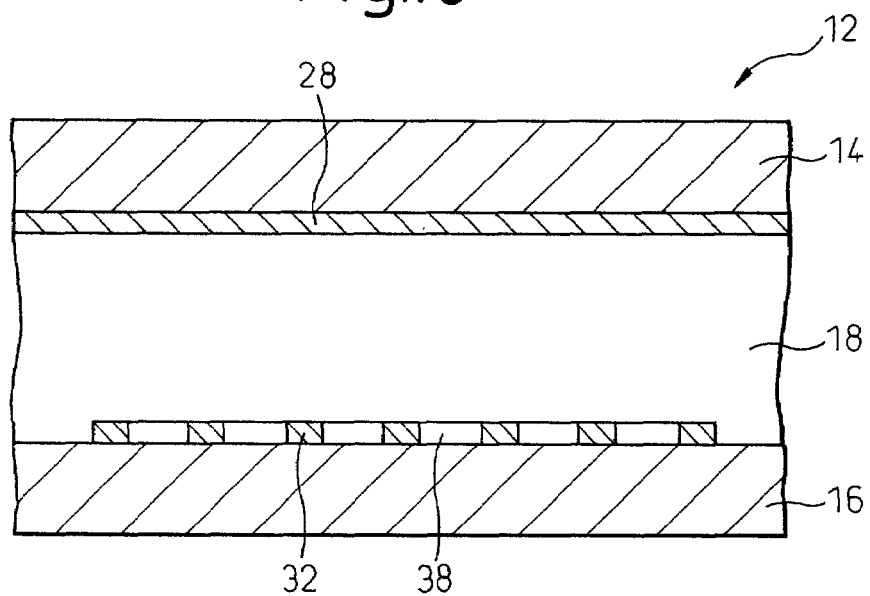
FIG. 10 is a schematic cross-sectional view showing a variation of the liquid crystal cell.
Figure 11:
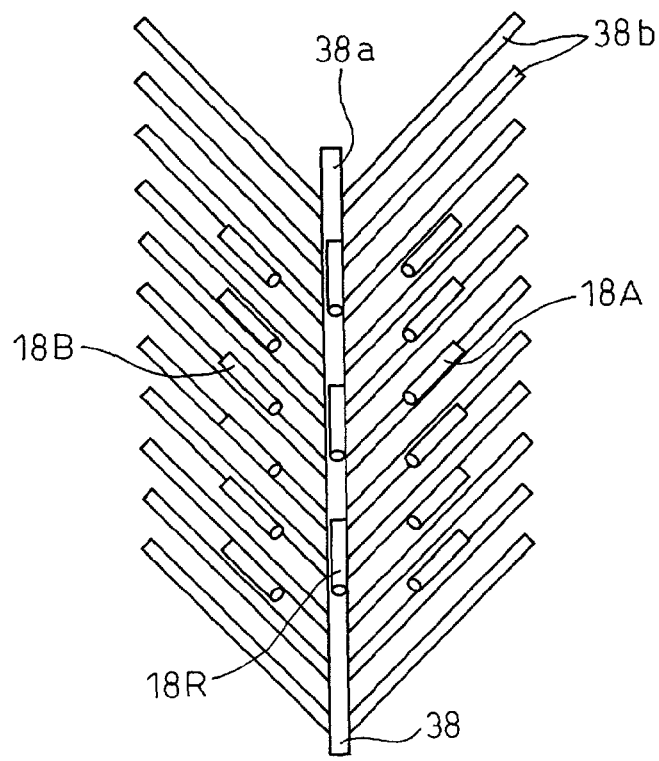
FIG. 11 is a schematic plan view showing the liquid crystal cell of FIG. 9.

In FIGS. 10 and 11, the first substrate 14 has the electrode 28, and no linear structures or no slits. The second substrate 16 has the electrode 32 and slits 38, which are formed in a fishbone pattern, in the electrode 32. The slit 38 is composed of a slit base section 38a and minute slit sections 38b. The liquid crystal molecules 18A and 18B are aligned in the directions different from each other. The liquid crystal molecules 18R are located on the slit base section 38a.

Figure 12:
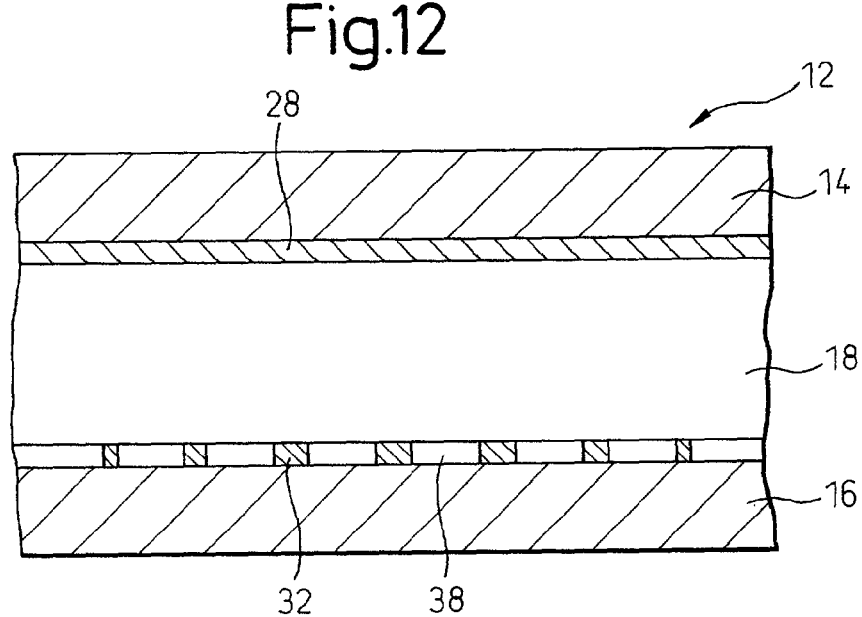
FIG. 12 is a schematic cross-sectional view showing a variation of the liquid crystal cell.
Figure 13:
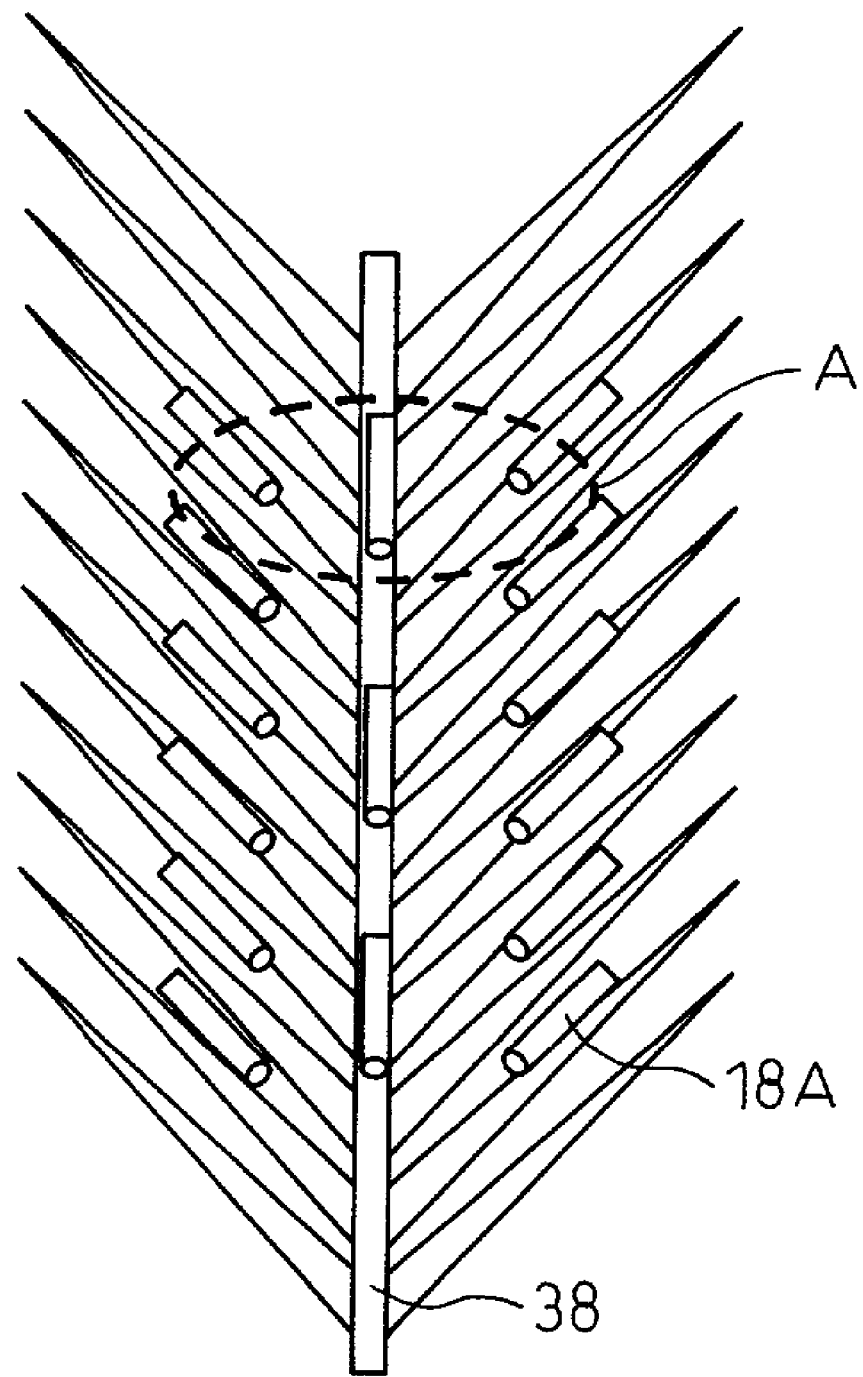
FIG. 13 is a schematic plan view showing the liquid crystal cell of FIG. 11.
Figure 14:
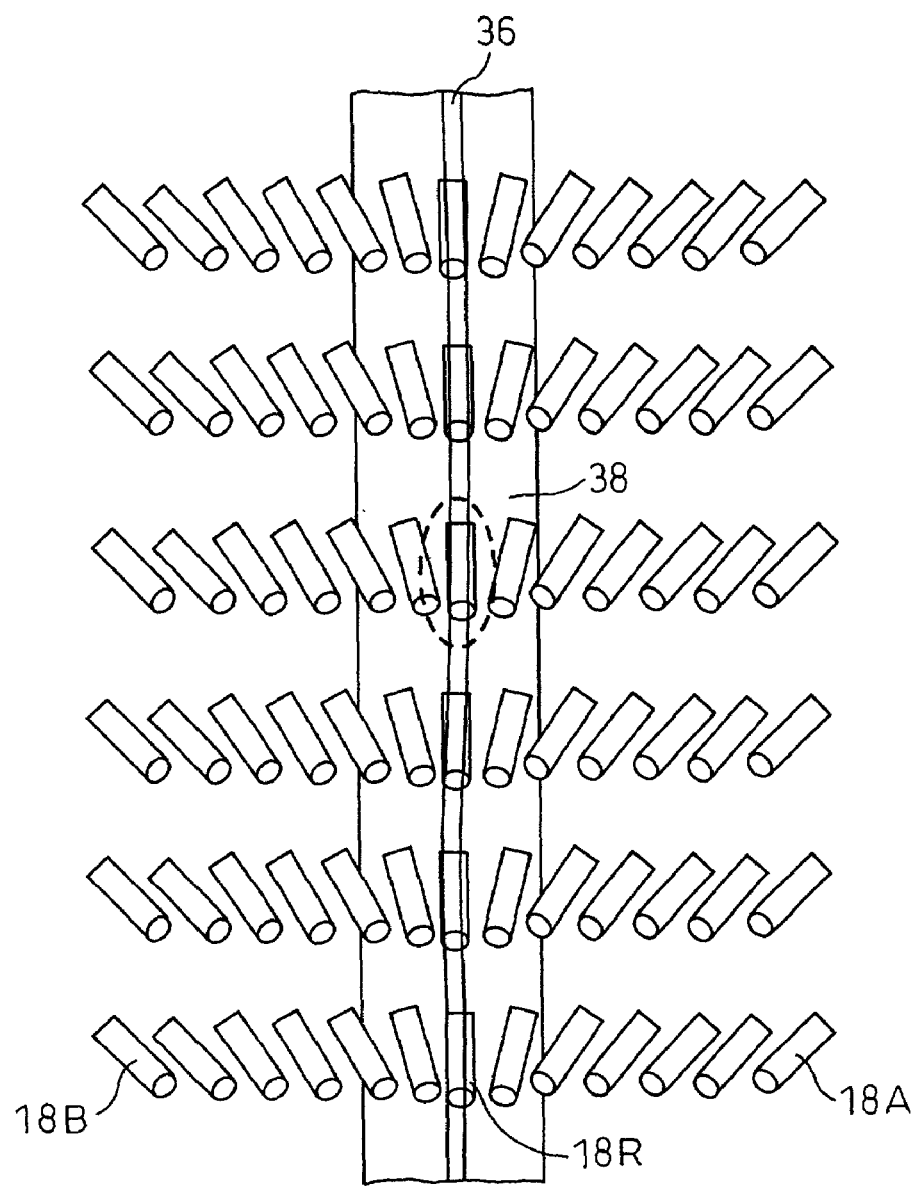
FIG. 14 is a view showing the portion A of FIG. 13 in detail.

In FIGS. 12 to 14, the first substrate 14 has the electrode 28 and no linear structure or no slit. The second substrate 16 has the electrode 32 and slits 38, which are formed in fishbone pattern, in the electrode 32. The slit 38 is composed of a slit base section 38a and minute slit sections 38b. The end of the minute slit section 38b becomes narrower. The liquid crystal molecules 18A and 18B are aligned in directions different from each other. The liquid crystal molecules 18R are located on the slit base section 38a.

Figure 21:
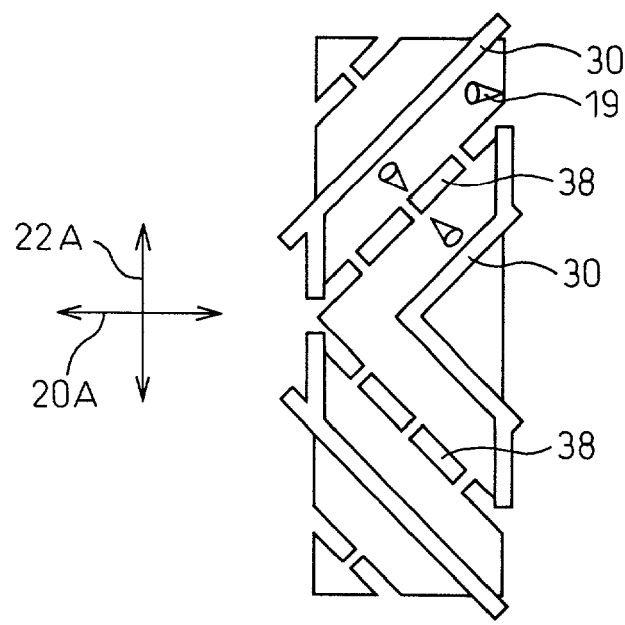
FIG. 21 is a view showing another example of the alignment division.

FIG. 21 is a view showing another example of the liquid crystal cell 12 in which the alignment division is conducted. The liquid crystal cell 12 is composed in such a manner that the liquid crystal layer 18 is arranged between the first substrate 14 and the second substrate 16. The first and second retardation plates 24 and 26 and the first and second polarizers 20 and 22 are arranged on either side of the liquid crystal cell 12 (see FIG. 1). The first substrate 14 is a color filter substrate, and the second substrate 16 is a TFT substrate. The liquid crystal cell 12 composes a liquid crystal panel of 15 inch XGA, and the pixel pitch is 297 µm.

Regarding one pixel electrode 19 (electrode 32), the linear structures 30 of the first substrate 14 are formed in a bent shape, and the slits 38 of the second substrate 16 are formed in a bent shape. In this case, the alignment division, in which the domain is divided into four, can be realized. The linear structures 30 are made of acrylic photosensitive material (for example, PC-335 manufactured by JSR), and the width of the linear structure 30 is 10 µm, and the height of the linear structure 30 is 1.2 µm. The width of the slit 38 is 10 µµm. The slits 38 are formed in the pixel electrode 19, and the slits 38 are discontinuously formed so that electric current can flow through the pixel electrode 19.

The distance between the linear structure 30 and the slit 38 is 25 µm. The thickness of the liquid crystal cell 12 is 4.64 µm. The first and second retardation plates (λ/4 plate) 24 and 26 are made of PC (polycarbonate, for example, NRF-RF01A manufactured by Nitto Denko Co.). In this case, the retardation is 140 nm. However, it is possible to use a retardation plate made of other material (for example, arton film manufactured by JSR). The first and second polarizers 20 and 22 are made of G1220DU manufactured by Nitto Denko Co.

In the case where the polarizers 20 and 22 are arranged in a cross or a plus sign arrangement (the polarizing axes 20A and 22A are arranged vertically and horizontally in the sheet of FIG. 21, and in this example, the polarizing axes 20A and 22A form an angle of 45° with respect to the main liquid crystal director), the white transmittance is 6.43%. In the same arrangement, when the polarizers 20 and 22 are arranged in a 45° arrangement (for example, the polarizing axes 20A and 22A form an angle of 45° with respect to the vertical and the horizontal in FIG. 21), the white transmittance is 6.58%. In this connection, the arrangement of the polarizers 20 and 22 is not limited to the plus sign arrangement and the 45° arrangement, and the polarizers 20 and 22 can be arbitrarily arranged. On the other hand, in the case of a conventional liquid crystal display device having no retardation plate 24 or 26, the white transmittance is 5.05% in the case of plus sign arrangement.

In the embodiment, the gap distance between the linear structure 30 and the slit 38 is 25 µm, but this distance can be changed. In the case of a conventional liquid crystal display, with alignment division and without first and second retardation plates (λ/4 plate) 24 and 26, the following problem may be encountered; the response speed is increased but the transmittance is lowered if the gap distance is reduced, and the transmittance is increased but the response speed is decreased, if the gap distance is increased. This problem is caused by change in azimuth of alignment of the liquid crystal molecules or decrease or deterioration of the transmittance due to the change in the azimuth of alignment of the liquid crystal molecules. In the present invention, since the transmittance does not depend upon the azimuth of alignment the liquid crystal molecules, the influence of the decrease of the transmittance or the decrease of the response speed due to the change in the gap distance is not so much as compared with the conventional arrangement. Therefore, it is possible to apply a liquid crystal display device with a greater gap distance or a smaller gap distance according to the use for an animated cartoon or the use for a brighter display, which cannot be conventionally applied.

Figure 22:
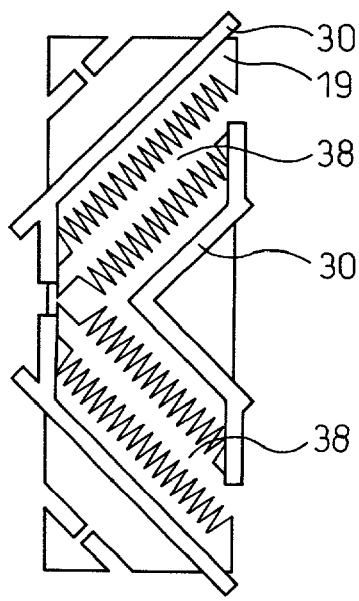
FIG. 22 is a view showing still another example of the alignment division.

FIG. 22 is a view showing another embodiment of the liquid crystal cell with the alignment division. Regarding one pixel electrode 19, the linear structures 30 of the first substrate 14 are formed in the bent shape, and the slits 38 of the second substrate 16 are formed in the bent shape. The slit 38 is formed in the same manner as that shown in FIG. 6. In this case, the alignment division in which the domain is divided into four, is realized. The width of the linear structure 30 and the slit 38 is 10 µm. The pitch of the minute slit section is 6 µm, and the length of the minute slit section is 15 µm.

The liquid crystal cell 12 is manufactured under substantially the same conditions as that of the liquid crystal cell shown in FIG. 21 except for that the thickness of the liquid crystal cell 12 is 4.26 µm. In the case where the polarizers 20 and 22 are arranged in the plus sign arrangement, the white transmittance is 5.74%. In the case where the polarizers 20 and 22 are arranged in the 45° arrangement, the white transmittance is 5.88%. On the other hand, in the case of a conventional liquid crystal display device having no retardation plates 24 and 26, when the polarizers 20 and 22 are arranged in the plus sign arrangement, the white transmittance is 4.47%. In this example, since the cell thickness is smaller than that of the example shown in FIG. 21, the retardation of the liquid crystal layer 18 is decreased and an absolute value of the transmittance is a little low, but the effect of improvement by providing the retardation plates is as high as that of the example shown in FIG. 21.

Figure 23:
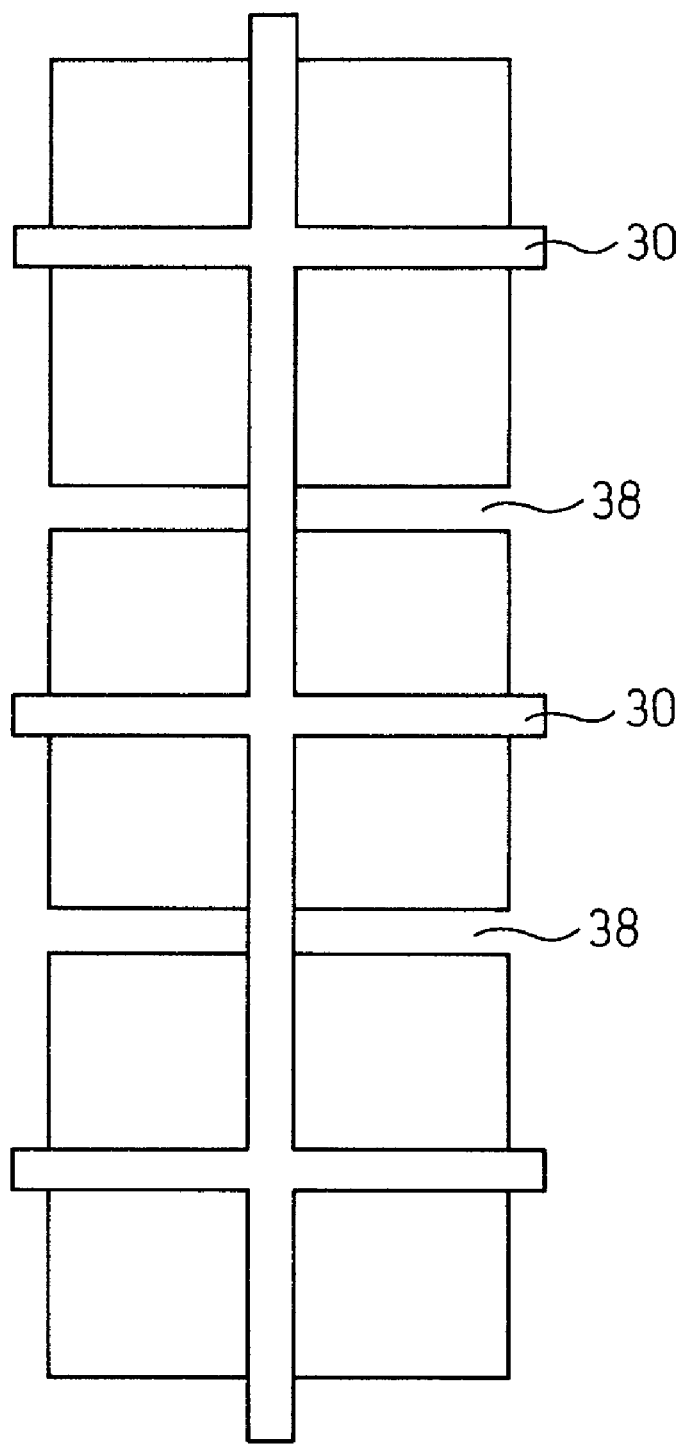
FIG. 23 is a view showing still another example of the alignment division.

FIG. 23 is a view showing another embodiment of the liquid crystal cell with the alignment division. The first substrate 14 has the linear structures 30, and the second substrate 16 has slits 38. The linear structures 30 and the slits 38 are arranged in the grating pattern in the same manner as that of the linear structures 30 and 34 of the liquid crystal cell 12 shown in FIG. 9. The width of the linear structure 30 is 8 µm, and the height of the linear structure 30 is 0.75 µm. The width of the slit 38 is 8 µm. The thickness of the cell is 4.02 µm. In the case where the polarizers 20 and 22 are arranged in the plus sign arrangement, the white transmittance is 5.86%. In the case where the polarizers 20 and 22 are arranged in the 45° arrangement, the white transmittance is 5.78%. On the other hand, in the case of a conventional liquid crystal display device having no retardation plates 24 and 26, when the polarizers 20 and 22 are arranged in the plus sign arrangement, the white transmittance is 4.48%.

Figure 24:
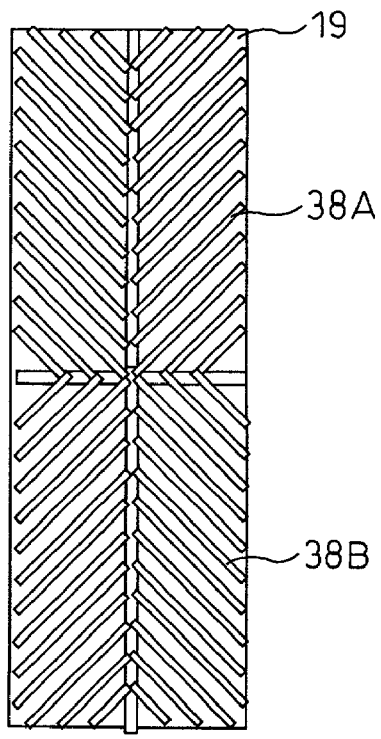
FIG. 24 is a view showing still another example of the alignment division.

FIG. 24 is a view showing another embodiment of the liquid crystal cell with the alignment division. This example includes two fishbone patterns of slits 38A and 38B, which are similar to the fishbone pattern of slits 38 shown in FIG. 11. The cell thickness is 3.86 µm. Other conditions are the same as those of the example shown in FIG. 21. In the case where the polarizers 20 and 22 are arranged in the plus sign arrangement, the white transmittance is 6.26%. In the same structure, in the case where the polarizers 20 and 22 are arranged in the 45° arrangement, the white transmittance is 6.06%. On the other hand, in the case of a conventional liquid crystal display device having no retardation plates 24 and 26, when the polarizers 20 and 22 are arranged in the plus sign arrangement, the white transmittance is 5.12%.

Figure 25:
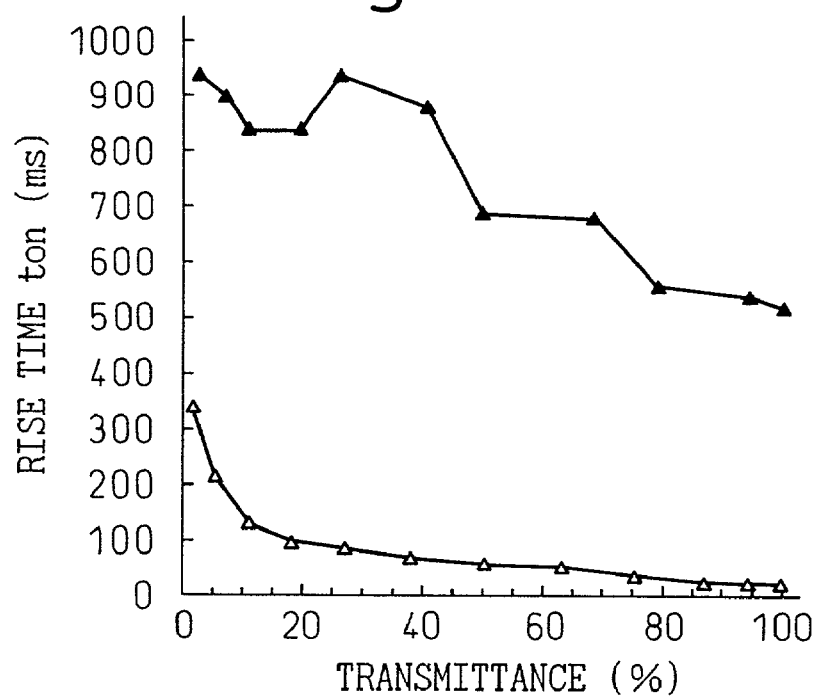
FIG. 25 is a graph showing the relation between the attainable transmittance and the rise time in the case of alignment division shown in FIG. 24.

FIG. 25 is a view showing the relation between the attainable transmittance and the rise time in the case of alignment division shown in FIG. 24. The curve plotted by black triangles shows a case in which the alignment division shown in FIG. 24 is adopted but no retardation plates are provided, and the curve plotted by white triangles shows a case in which the alignment division shown in FIG. 24 is adopted and retardation plates are provided. Conventionally, in this system, the response time in all gradation including the middle tones is several hundred ms. Therefore, this system is not suitable for a liquid crystal display device applied to a liquid crystal monitor, for example. However, when the present invention is applied to this system, a high speed response is realized as follows. The response time from black to white is 20 ms, and even the response time from black to the middle tome (25%) is 90 ms. Therefore, this system can be applied to a liquid crystal device such as a liquid crystal monitor.

Figure 26:
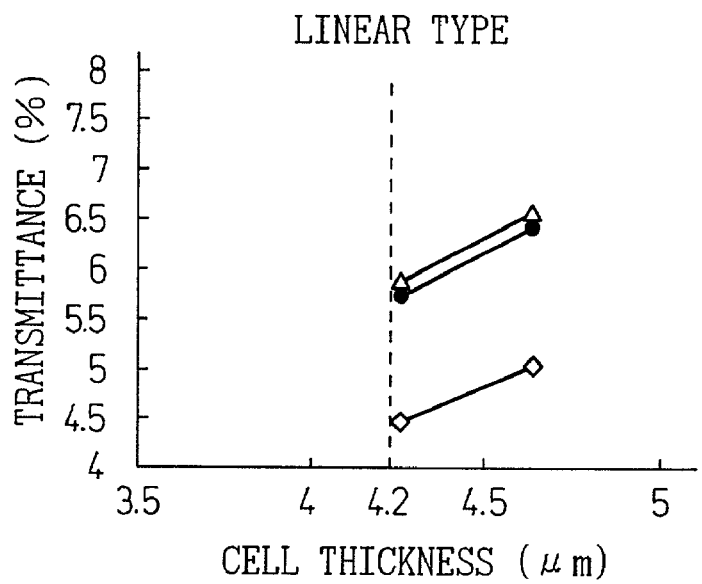
FIG. 26 is a view showing the relation between the cell thickness and the transmittance in the case of the alignment division of the parallel linear structure type.
Figure 27:
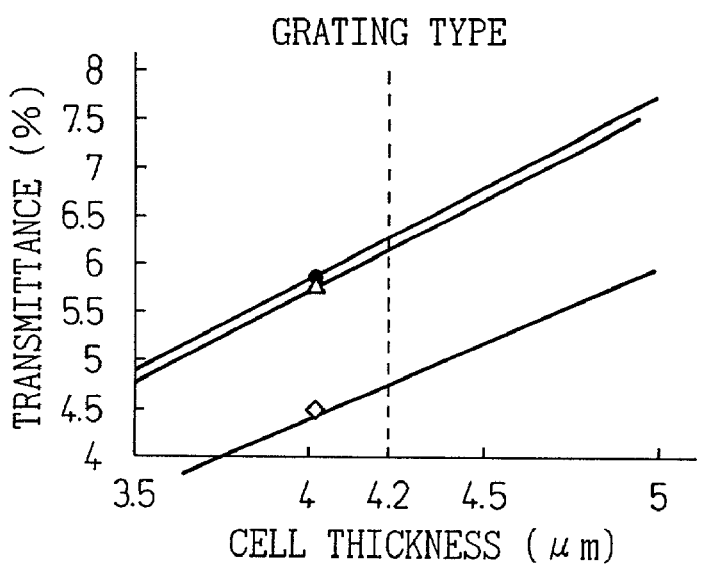
FIG. 27 is a view showing the relation between the cell thickness and the transmittance in the case of the alignment division of the grating type.
Figure 28:
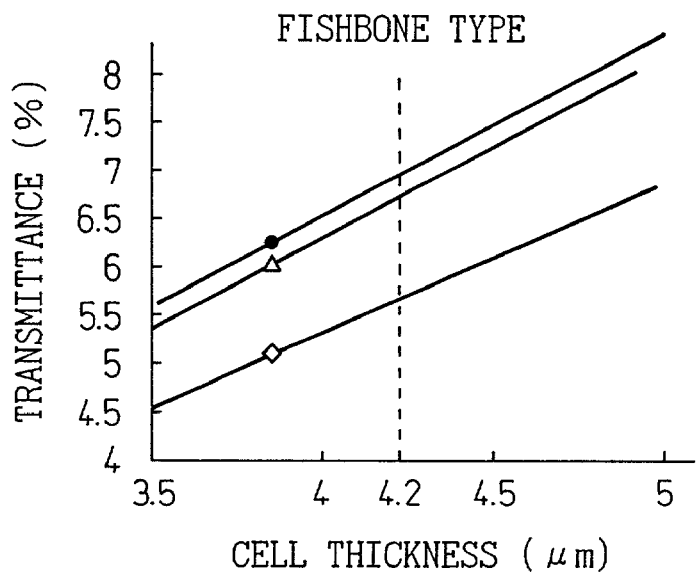
FIG. 28 is a view showing the relation between the cell thickness and the transmittance in the case of the alignment division of the fishbone type.

FIGS. 26 to 28 are views showing the relation between the cell thickness and the transmittance. FIG. 26 shows the relation between the cell thickness and the transmittance in the case of the alignment division realized by parallel linear structures (for example, FIG. 21). FIG. 27 shows the relation between the cell thickness and the transmittance in the case of the alignment division realized by the grating pattern, shown, for example, in FIG. 23. FIG. 28 shows the relation between the cell thickness and the transmittance in the case of the alignment division realized by fishbone pattern, shown, for example, in FIG. 24.

In these views, the curve plotted by squares shows a case in which no retardation plates (λ/4) are provided and the polarizers are arranged in the plus sign arrangement, the curve plotted by triangles shows a case in which retardation plates (λ/4) are provided and the polarizers are arranged in the plus sign arrangement, and the curve plotted by black circles shows a case in which retardation plates (λ/4) are provided and the polarizers are arranged in the 45° arrangement.

In curve plotted by squares shown in FIG. 26, when the cell thickness is 4.2 µm, the transmittance is 4.4%, which is the same as that of a liquid crystal display device which is used by the present applicant. According to the curves plotted by triangles and black circles, when the cell thickness is 4.2 µm, the transmittance is 5.8%. Further, according to the curve plotted by black circles shown in FIG. 27, when the cell thickness is 4.2 µm, the transmittance is 6.2%. According to the curve plotted by black circles shown in FIG. 28, when the cell thickness is 4.2 µm, the transmittance is 6.9%. As described above, according to the present invention described above, it is possible to enhance the transmittance.

Figure 29:
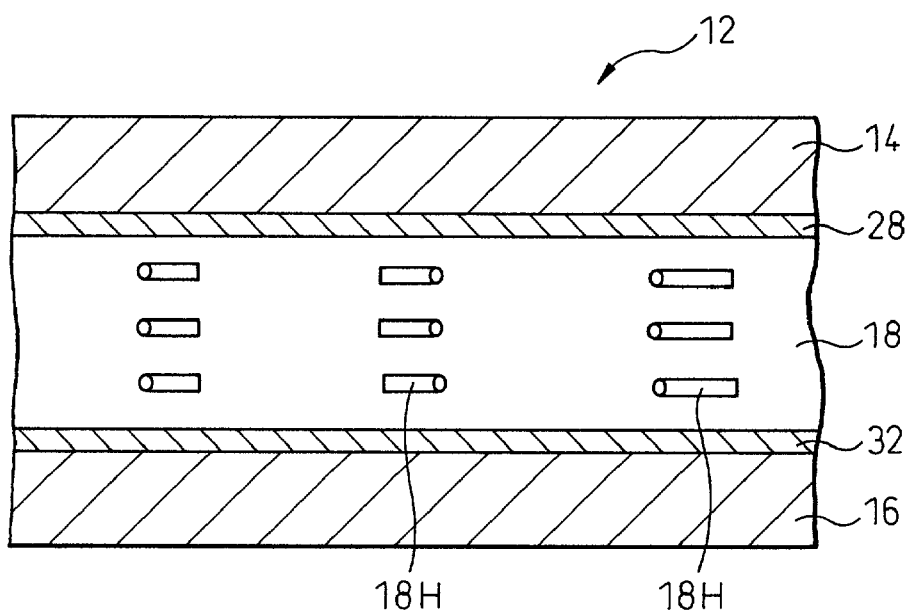
FIG. 29 is a cross-sectional view showing another example of the liquid crystal cell.
Figure 30:
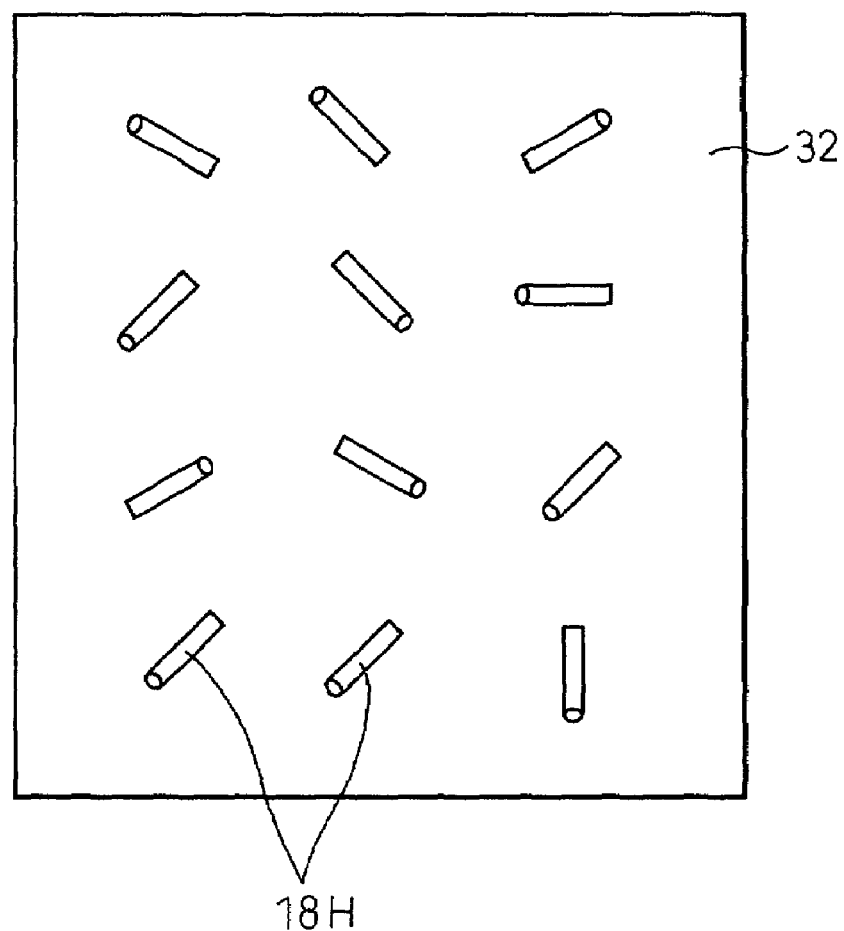
FIG. 30 is a plan view showing the liquid crystal cell of FIG. 29.

FIG. 29 is a cross-sectional view showing another embodiment of the liquid crystal cell with the alignment division. FIG. 30 is a plan view showing the liquid crystal cell of FIG. 29. The liquid crystal cell 12 includes a pair of substrates 14 and 16 having electrodes and a liquid crystal layer 18 arranged between the pair of substrates 14 and 16. This liquid crystal cell 12 is used together with the first and second polarizers 20 and 22 and the first and second retardation plates 24 and 26 shown in FIG. 1. In this embodiment, the liquid crystal layer 18 is not limited to the vertical alignment, but the liquid crystal layer 18 of the horizontal alignment type may be used. However, the liquid crystal layer 18 is composed in such a manner that the state of alignment of the liquid crystal molecules 18H changes accompanying a change in the polar angle and a change in the azimuth angle upon application of voltage. It is not necessary for the substrates 14 and 16 to have the linear structures (ribs) 30 and 34 and the slits 38 for controlling the alignment.

Figure 31:
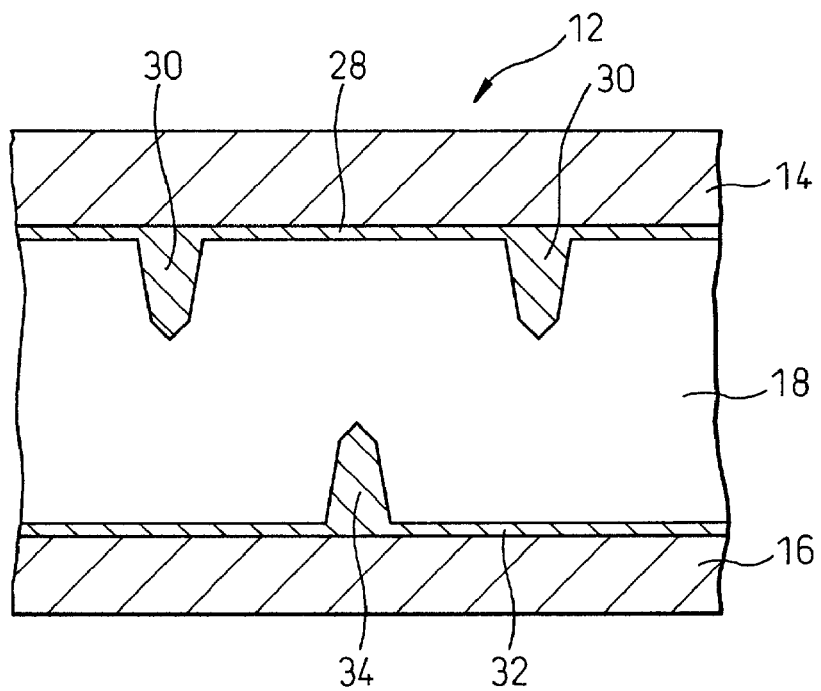
FIG. 31 is a view showing the liquid crystal cell having electrically conductive linear structures of the liquid crystal display of the second embodiment of the present invention.

FIG. 31 is a view showing a liquid crystal display device of the second embodiment of the present invention, with a liquid crystal cell having electrically conductive linear structures. The liquid crystal display device 10 includes a liquid crystal cell 12 in which the liquid crystal layer 18 is arranged between the first and second substrates 14 and 16, first and second polarizers 20 and 22, and first and second retardation plates 24 and 26 (see FIG. 1).

The first substrate 14 has linear structures 30, and the second substrate 16 has linear structures 34. The linear structures 30 and 34 are alternately arranged in parallel with each other as explained before, for example, as shown in FIG. 3. The linear structures 30 and 34 may be arranged in a grating pattern or a fishbone shape.

The linear structures 30 and 34 are electrically conductive structures. In FIG. 31, the linear structures 30 are made of the same metallic material as that of the electrode 28 of the first substrate 14, and the linear structures 34 are made of the same metallic material as that of the electrode 32 of the second substrate 16. For example, linear protrusions are formed on the substrate in advance before the electrode 28 and 32 are formed, and the electrode 28 and 32 are formed on the substrate by ITO. Alternatively, the linear structures 30 and 34 are formed on the electrode 28 and 32 by an electrically conductive resin such as a resin in which conductive grains of carbon are mixed. The height of the linear structures 30 and 34 is 0.1 µm to half of the cell thickness. As an example, the height of the linear structures 30 and 34 is 1.5 µm. A vertical alignment film is coated on the electrode 32 and the linear structures 30 and 34.

In the embodiments described above, the linear structures 30 and 34 are made of dielectric substance. In the case where the linear structures 30 and 34 are made of dielectric substance, part of voltage supplied between the electrodes 28 and 29 is absorbed by the dielectric substance, so that voltage applied to the liquid crystal is lowered. Therefore, the liquid crystal molecules are insufficiently inclined when voltage is applied, and the transmittance is lowered. In this embodiment, since the linear structures 30 and 34 are electrically conductive, part of voltage supplied between the electrodes 28 and 32 is not absorbed, and voltage applied to the liquid crystal is not lowered, and thus the liquid crystal molecules are sufficiently inclined when voltage is applied, and the transmittance is not lowered.

Figure 32:
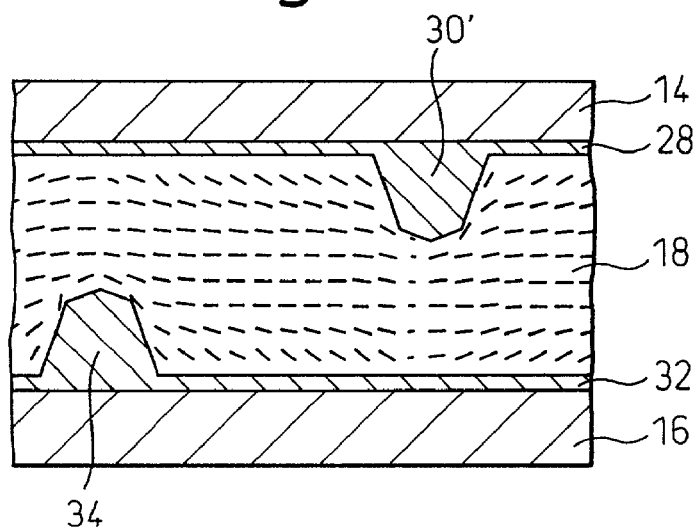
FIG. 32 is a view showing a state of alignment of the liquid crystal in the case of using the liquid crystal cell of FIG. 31.

FIG. 32 is a view showing a state of alignment of the liquid crystal in the case where the liquid crystal cell shown in FIG. 31 is used. It can be understood that the liquid crystal molecules are sufficiently inclined or lie when voltage is applied.

Figure 33:
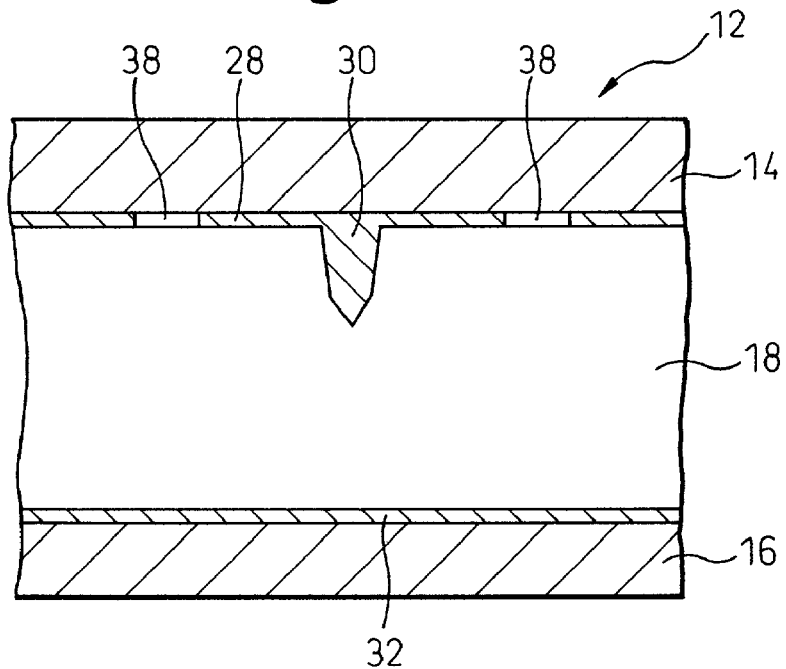
FIG. 33 is a cross-sectional view showing another embodiment of the liquid crystal cell having electrically conductive linear structures.

FIG. 33 is a view showing another embodiment of the liquid crystal cell having electrically conductive linear structures. The first substrate 14 has linear structures 30 and slits 38. The second substrate 16 has no linear structure or no slit. However, it is possible to adopt an arrangement in which the first substrate 14 has linear structures 30 and the second substrate 16 has slits 38.

Figure 34:
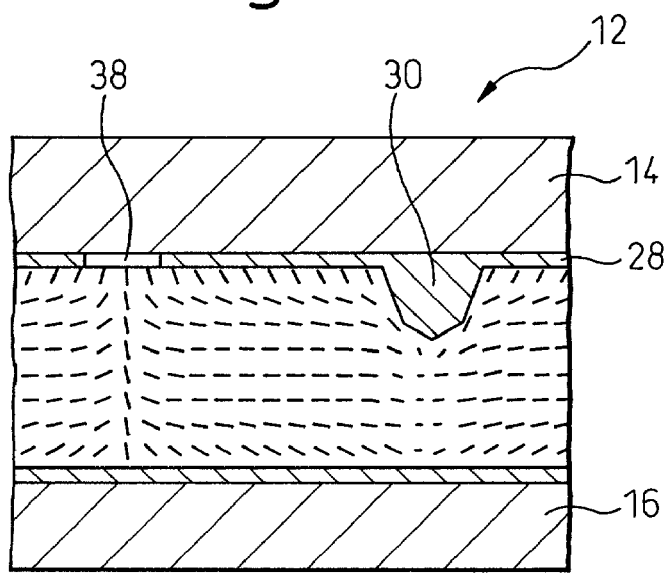
FIG. 34 is a view showing a state of alignment of the liquid crystal in the case of using the liquid crystal cell of FIG. 33.

FIG. 34 is a view showing a state of alignment of the liquid crystal in the case where the liquid crystal cell shown in FIG. 33 is used. It can be understood that when voltage is applied, the liquid crystal molecules located close to the slit 38 are not sufficiently inclined, but the liquid crystal molecules located close to the linear structure 30 are sufficiently inclined. When the arrangement shown in FIG. 33 is adopted, it is possible to realize excellent alignment division, and further the transmittance can be enhanced.

Figure 35:
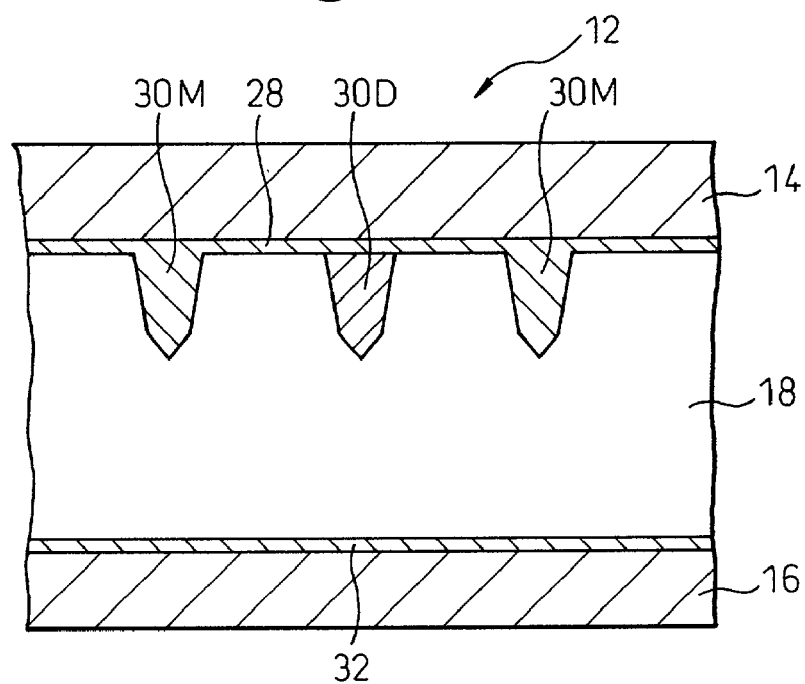
FIG. 35 is a view showing another embodiment of the liquid crystal cell having electrically conductive linear structures.

FIG. 35 is a view showing another embodiment of the liquid crystal cell having electrically conductive linear structures. The first substrate has linear structures 30M and linear structures 30D, and the second substrate 16 has no linear structure or no slit. The linear structures 30M are electrically conductive, and the linear structures 30D are dielectric. In the case where the linear structures 30M are arranged at long intervals, the linear structure 30D is arranged between the linear structures 30M.

Figure 36:
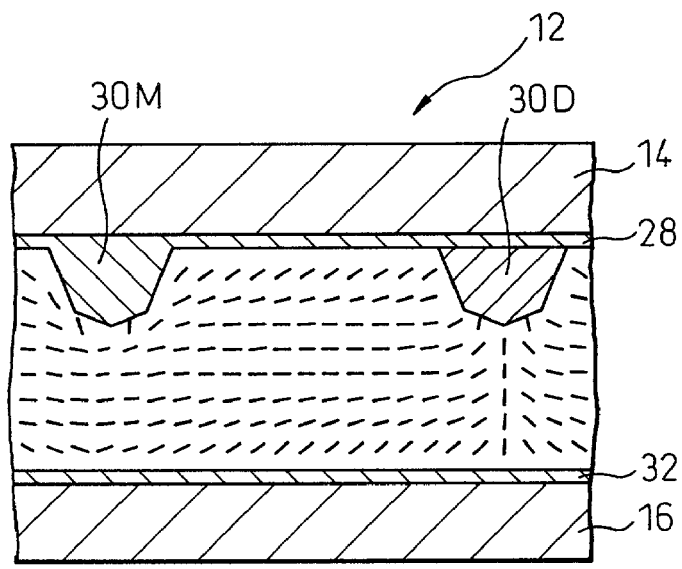
FIG. 36 is a view showing a state of alignment of the liquid crystal in the case where the liquid crystal cell of FIG. 35 is used.

FIG. 36 is a view showing a state of alignment of the liquid crystal in the case where the liquid crystal cell shown in FIG. 35 is used. It can be understood that when voltage is applied, the liquid crystal molecules located close to the linear structure 30D are not sufficiently inclined, but the liquid crystal molecules located close to the linear structure 30M are sufficiently inclined. When the arrangement shown in FIG. 35 is adopted, it is possible to attain excellent alignment division, and further the transmittance can be enhanced.

Figure 37A:
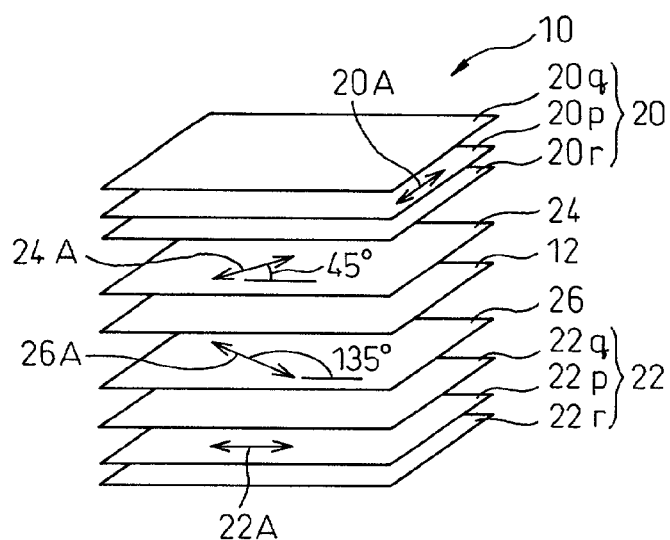
FIGS. 37A to 37C are views showing the liquid crystal display device of the third embodiment of the present invention.
Figure 37B:
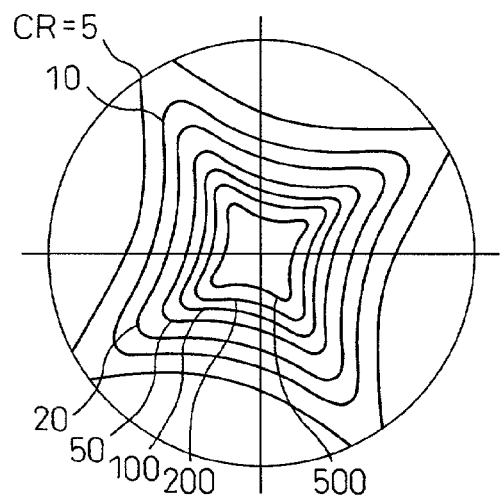
Figure 37C:
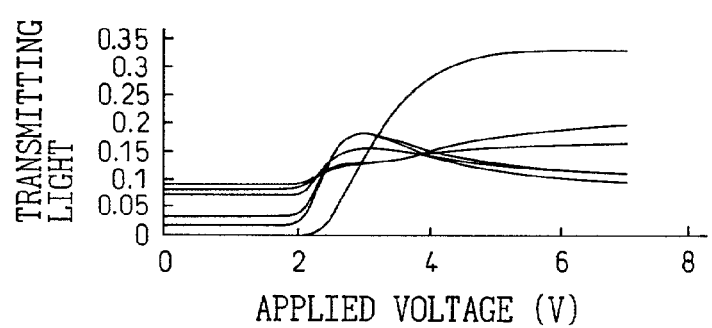

FIGS. 37A to 37C are views showing a liquid crystal display device of the third embodiment of the present invention. FIG. 37A shows an arrangement of the liquid crystal display device, FIG. 37B shows the contrast of the display when a viewer takes an oblique view of the image area, and FIG. 37C shows the relation between applied voltage and the quantity of transmitting light. As shown in FIG. 37A, the liquid crystal display device 10 includes a liquid crystal cell 12, first and second polarizers 20 and 22, and first and second retardation plates 24 and 26.

The first and second retardation plates 24 and 26 respectively have the optical axes 24A and 26A in a plane parallel to the surfaces of the substrates, and the retardation between the optical axes 24A and 26A is approximately λ/4. The optical axis 24A of the first retardation plate 24 is perpendicular to the optical axis 26A of the second retardation plate 26. The polarizing axes 29A and 22A of the first and second polarizers 20 and 22 are respectively arranged at an angle of 45° with respect to the optical axes 24A and 26A of the first and second retardation plates 24 and 26. The retardation in the plane of the first and second retardation plates 24 and 26 is not less than 120 nm and not more than 160 nm. It is preferable that the retardation in the plane of the first and second retardation plates 24 and 26 is not less than 130 nm and not more than 145 nm.

The first polarizer 20 comprises a polarizing layer (for example, PVA+iodine) 22p, and protective layers (for example, TAC; triacetyl cellulose) 20q and 20r which cover both sides of the polarizing layer 20p. In the same manner, the second polarizer 22 comprises a polarizing layer (for example, PVA+iodine) 22p; and protective layers (for example, TAC; triacetyl cellulose) 22q and 22r which cover both sides of the polarizing layer 22p.

The liquid crystal cell 12 comprises the liquid crystal layer 18 arranged between the first and second substrates 14 and 16, as shown in FIG. 1. Also, the liquid crystal layer 18 comprises the liquid crystal of vertical alignment type. The liquid crystal cell includes structures or slits provided on or in the electrode of at least one of the substrates. The state of alignment of the liquid crystal molecules located on one side of the structure or slit is different from the state of alignment of the liquid crystal molecules located on the other side of the structure or slit. Concerning the structures or slits, all the structures and slits explained before can be used.

FIG. 38 is a view showing an example of the alignment division conducted in FIG. 37A. The alignment division includes bent linear structures 30 provided on the electrode of the first substrate 14, and bent linear slits 38 provided in the electrode of the first substrate 14. In this alignment division, the liquid crystal molecules are aligned in four directions, as shown by the arrows 18C, 18D, 18E and 18F. That is, the alignment division in which one pixel is divided into four domains is realized. In FIG. 38, gate bus lines 40, data bus lines 42, TFTs 44 and subsidiary capacity electrode 46 are shown. The polarizers 20 and 22 are arranged in the plus sign arrangement.

In the arrangement shown in FIGS. 37A and 38, the contrast is shown in FIG. 37B, in which the azimuth at which the highest contrast is obtained is rotated counterclockwise by about 30° from the vertical and the horizontal. Concerning the viewing angle characteristic, the range of oblique viewing angle at which the contrast is not less than 10° is not less than 40°.

Figure 39A:
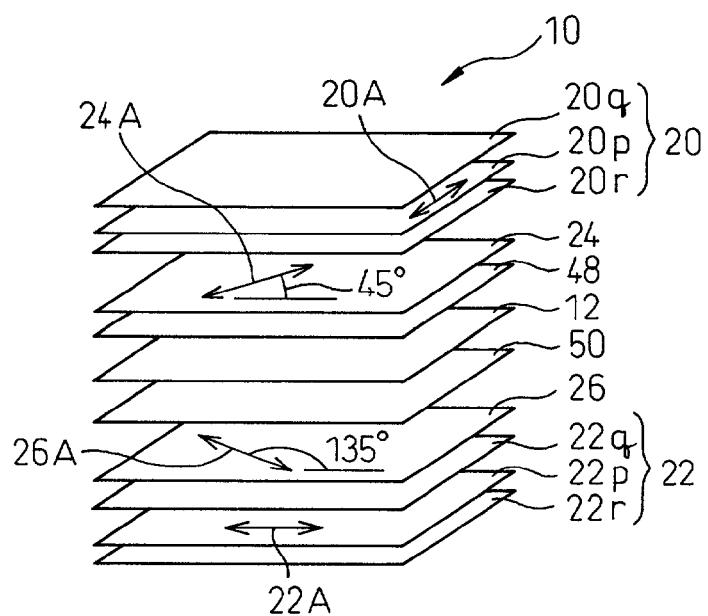
FIGS. 39A to 39C are views showing a variation of the liquid crystal display device shown in FIGS. 37A to 37C.
Figure 39B:
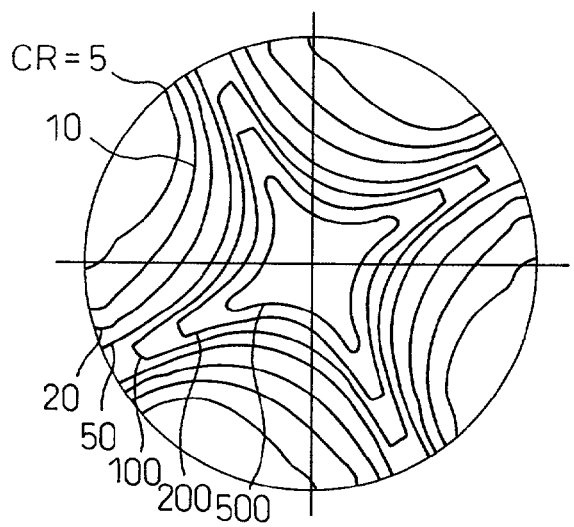
Figure 39C:
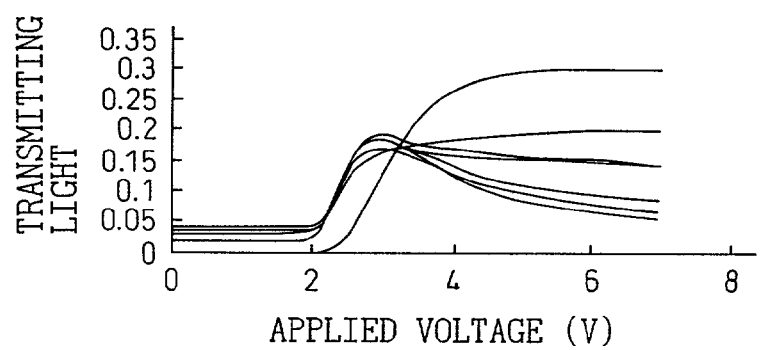

FIGS. 39A to 39C are views showing a variation of the liquid crystal display device shown in FIGS. 37A to 37C. FIG. 39A shows the arrangement of the LCD, FIG. 39B shows the contrast, and FIG. 39C shows the T-V characteristic, corresponding to FIGS. 37A to 37C. This is also applied to the following variations of FIGS. 40A to 53B. The liquid crystal display device 10 shown in FIG. 39A is arranged in the substantially same manner as that of the liquid crystal display device shown in FIG. 37A, but a compensation film (for example, a TAC film) 48 having a negative retardation is arranged or laminated between the first retardation plate (λ/4) 24 and the liquid crystal cell 12, and a compensation film (for example, a TAC film) 50 having a negative retardation is arranged or laminated between the second retardation plate (λ/4) and the liquid crystal cell 12, and a compensation films 48 and 50 are laminated, a positive retardation of the liquid crystal layer 18 is compensated for, and a range in which the contrast is not less than 5 is extended as shown in FIG. 39B. The viewing angle range in which the contrast is not less than 10 can be extended, and the contrast is kept to be not less than 10 even if the oblique viewing angle increased to 50°. However, in the T-V characteristic shown in FIG. 39C, the brightness tends to decrease when voltage is increased. As a result, the reversal of gradation tends to occur.

Figure 40A:
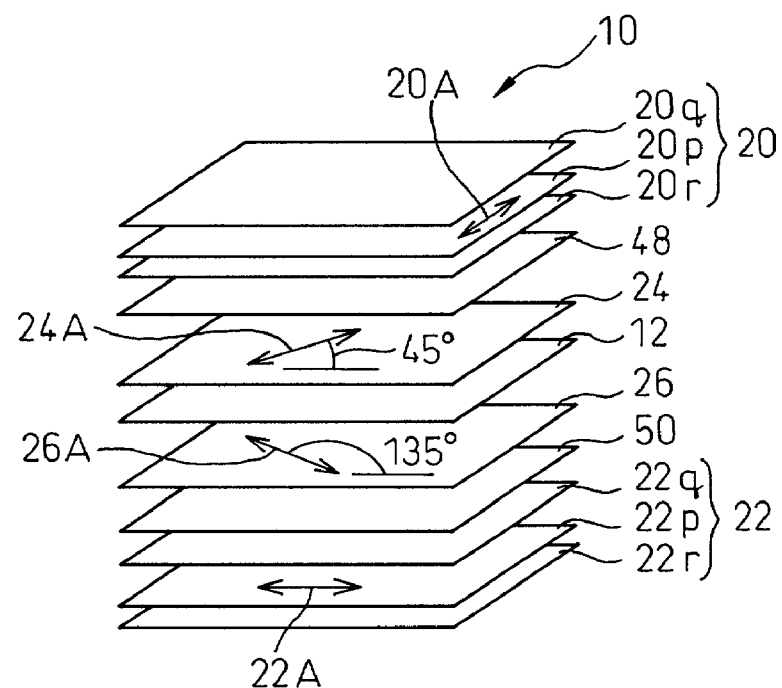
FIGS. 40A and 40B are views showing a variation of the liquid crystal display device shown in FIGS. 37A and 37B.
Figure 40B:
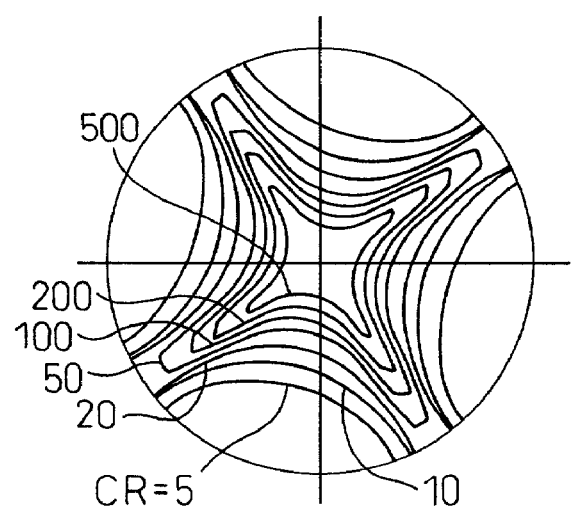

FIGS. 40A and 40B are views showing a case in which the compensation films 48 and 50 having the positions of a negative retardation are not close to the liquid crystal cell 12 but distant from the liquid crystal cell 12. Although the compensation films 48 and 50 are added, the degree of improvement in the viewing angle characteristic is inferior to that of FIGS. 39A to 39C. Due to the foregoing, it is found that it is preferable to arrange the compensation films 48 and 50 having a negative retardation close to the liquid crystal cell 12.

Figure 41A:
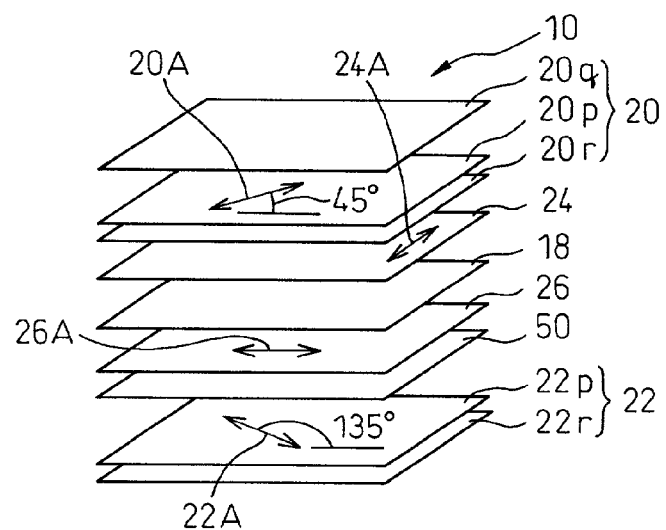
FIGS. 41A to 41C are views showing a variation of the liquid crystal display device shown in FIGS. 37A to 37C.
Figure 41B:
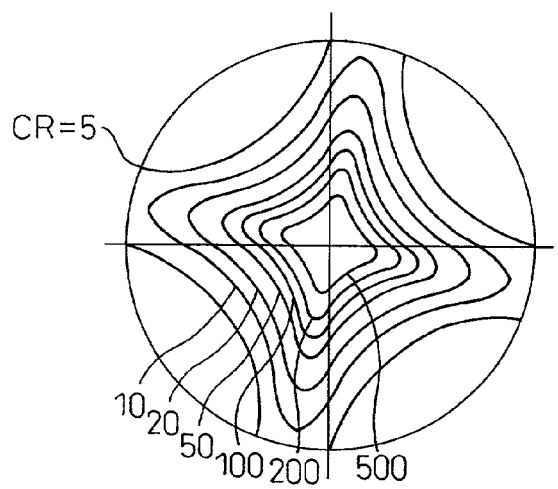
Figure 41C:
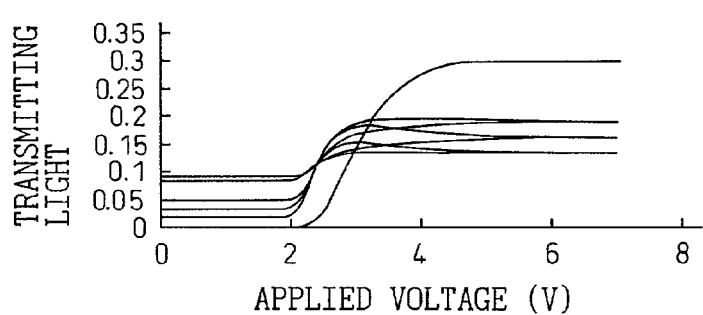

FIGS. 41A to 41C are views showing a variation of the liquid crystal display device shown in FIGS. 37A to 37C. The setting angles of the polarizers 20 and 22 are changed from the values shown in FIG. 37A. The polarizers 20 and 22 are set at azimuth angles of 45° and 135°, and the λ/4 plates 24 and 26 are arranged in the plus sign arrangement. In this case, contrast curves show that the range, in which the contrast is not less than 5, as shown in FIG. 41B, is extended as compared with the embodiment of FIG. 37B. According to T-V characteristic, it can be understood that the decrease of the brightness on the high voltage side is not so much and the gradation characteristic is excellent, as shown in FIG. 41C.

Figure 42A:
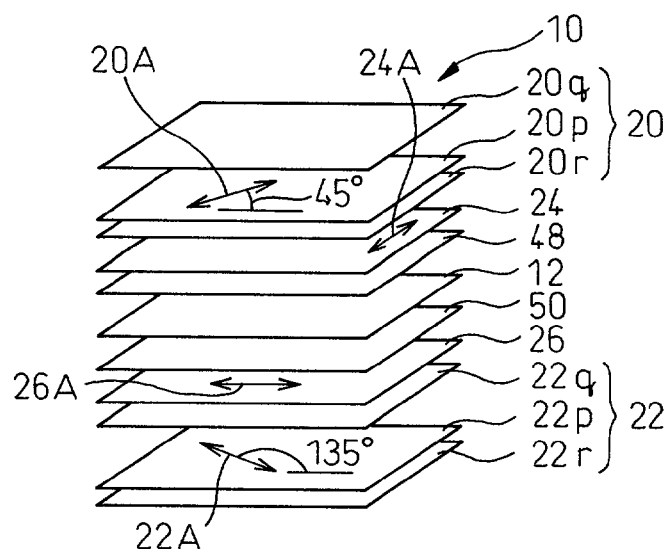
FIGS. 42A to 42C are views showing a variation of the liquid crystal display device shown in FIGS. 37A to 37C.
Figure 42B:
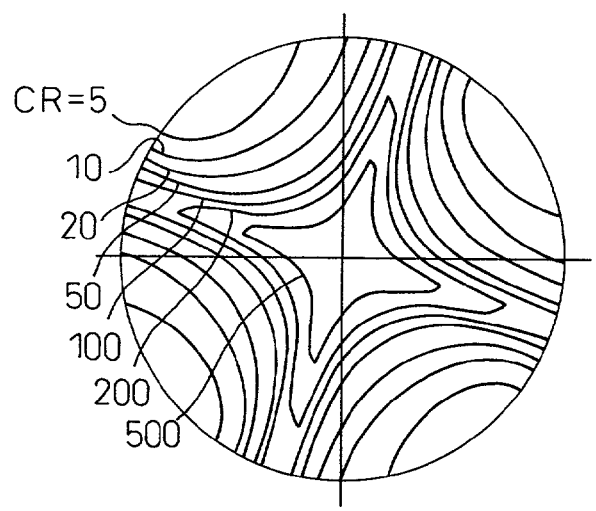
Figure 42C:
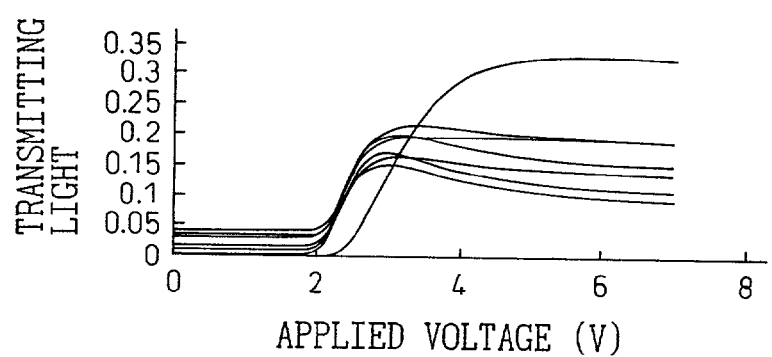

FIGS. 42A to 42C show a variation of the liquid crystal display device shown in FIGS. 37A to 37C. In this arrangement, TAC films, as negative compensation films, 48 and 50 are arranged between the liquid crystal cell 12 and the λ/4 plates 24 and 26, respectively. Due to the foregoing, it is possible to extend a viewing angle range in which the high contrast can be obtained (refer to data shown in FIGS. 41B and 42B). However, in the T-V characteristic, the brightness is lowered on the high voltage side, and a reversal of gradation tends to occur.

Figure 43A:
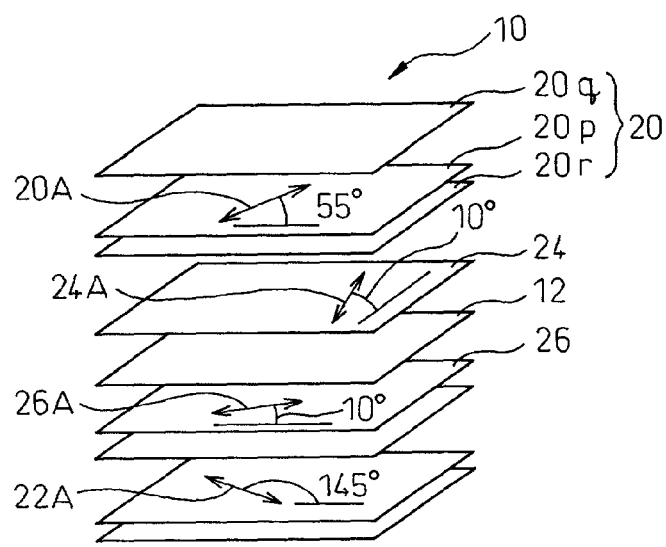
FIGS. 43A to 43C are views showing a variation of the liquid crystal display device shown in FIGS. 37A to 37C.
Figure 43B:
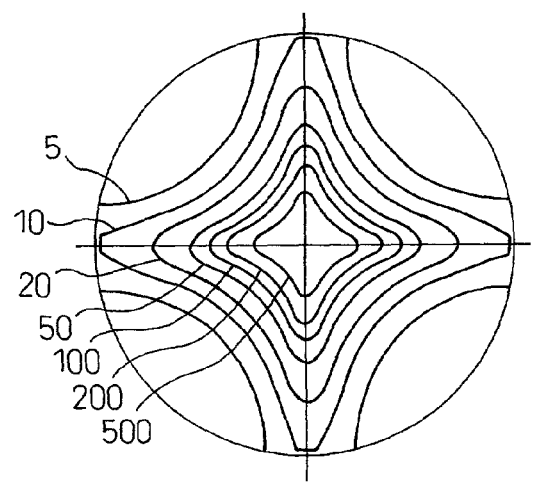

FIGS. 43A to 43B are views showing a variation of the liquid crystal display device shown in FIGS. 37A to 37C. In this arrangement, the angles of the polarizers 20 and 22 are optimized, so that the viewing angle azimuth at which the contrast becomes maximum is set at the vertical and the horizontal. In this case, calculation is made supposing that the retardation plates (λ/4) 24 and 26 are perfect uniaxial films. The direction of the absorbing axis 22A of the polarizer 22 on the incident side is set at an azimuth angle of 145° and the arrangement of Cross-Nicol arrangement is adopted. The direction of the slow axis 26A of the retardation plate 26 adjacent to the polarizer 22 is set at an azimuth angle of 10°, that is, the direction of the slow axis 26A of the retardation plate 26 adjacent to the polarizer 22 is set at an angle of 45° with respect to the absorbing axis 22A of the polarizer 22 on the incident side. The slow axis 24A of the retardation plate 24 of the pair is set at an azimuth angle of 100°, that is, the slow axis 24A of the retardation plate 24 is set so that the slow axes 24A and 26A of the pair of retardation plates 24 and 26 are perpendicular to each other. In this arrangement, no compensation films are provided.

Figure 43C:
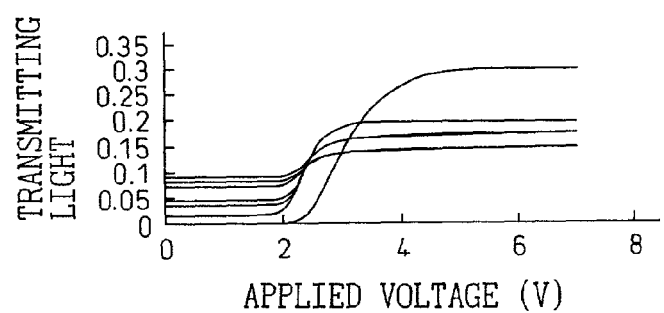
Figure 44A:
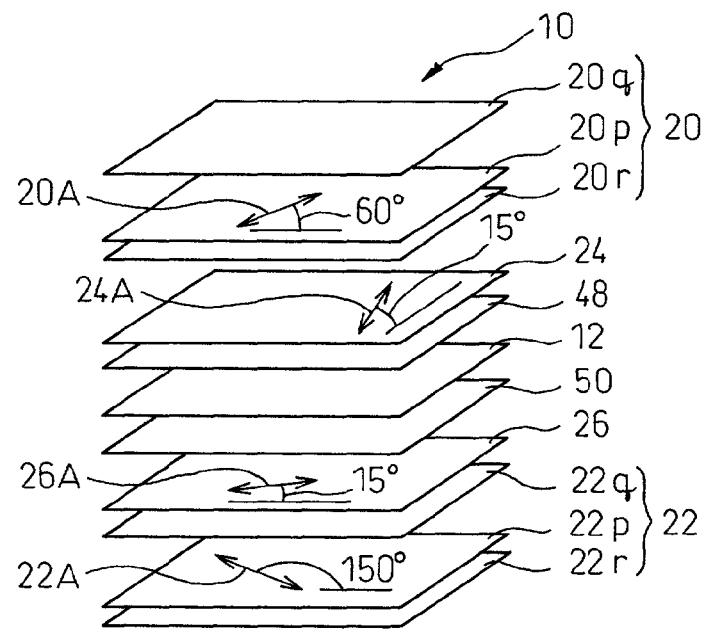
FIGS. 44A to 44C are views showing a variation of the liquid crystal display device shown in FIGS. 37A to 37C.
Figure 44B:
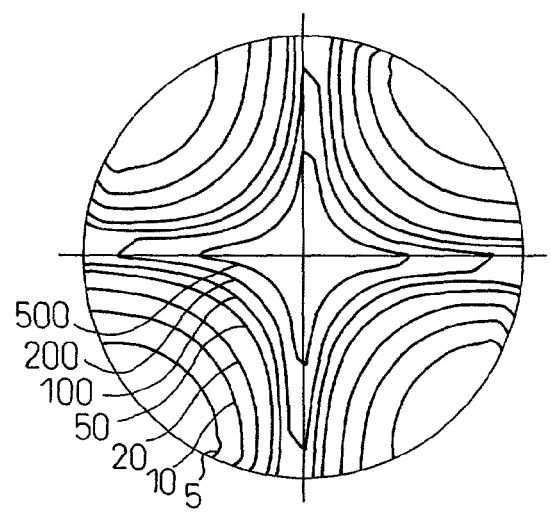
Figure 44C:
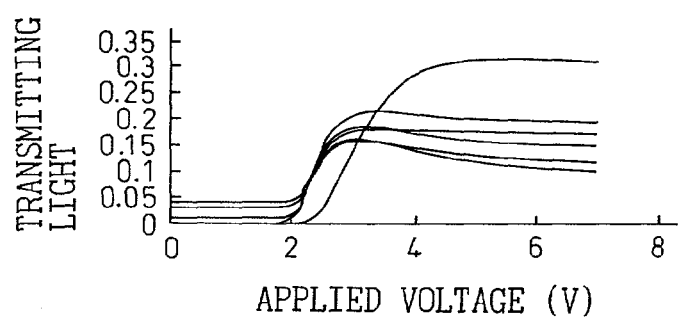

FIGS. 44A to 44C are views showing a variation of the liquid crystal display device shown in FIGS. 43A to 43C. In this arrangement, the angles formed between the polarizers 20 and 22 and the retardation plates 24 and 26 are fixed with respect to those of FIGS. 43A to 43C, and TAC films as negative compensation layers 48 and 50 are laminated between the liquid crystal cell 12 and the retardation plates 24 and 26, respectively. Due to the foregoing, the viewing angle range is extended as compared with the viewing angle range shown in FIGS. 43A to 43C. The retardation plate 24(26) and 48(50) can be one plate, or the plate 24(26) can have the negative retardation whose value is almost equal to the addition of the negative retardation of plate 24(26) and that of plate 48(50).

In the foregoing embodiments, an explanation was made regarding the alignment division in which one pixel is divided into four domains. Explanation is next made regarding the alignment division in which one pixel is divided into two domains. Concerning the two-divided alignment division, the alignment is divided into two, that is, vertically upper and lower portions. Upon the application of voltage to the liquid crystal molecules, the liquid crystal molecules of the upper half of the pixel are inclined to the lower azimuth, and the liquid crystal molecules of the lower half of the pixel are inclined to the upper azimuth.

Figure 45A:
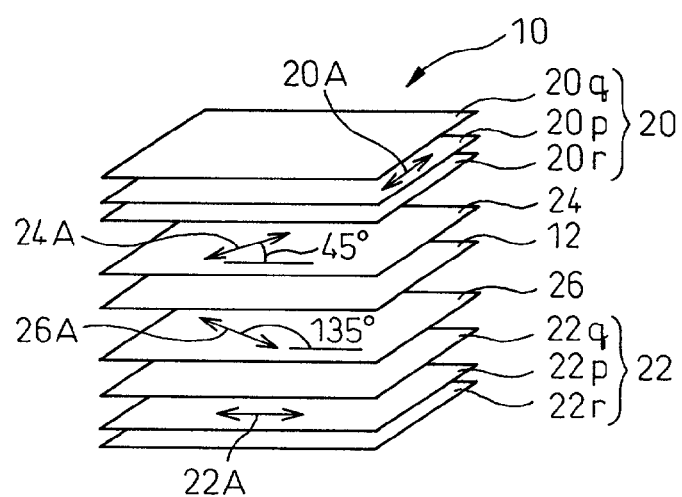
FIGS. 45A to 45C are views showing a variation of the liquid crystal display device shown in FIGS. 37A to 37C.
Figure 45B:
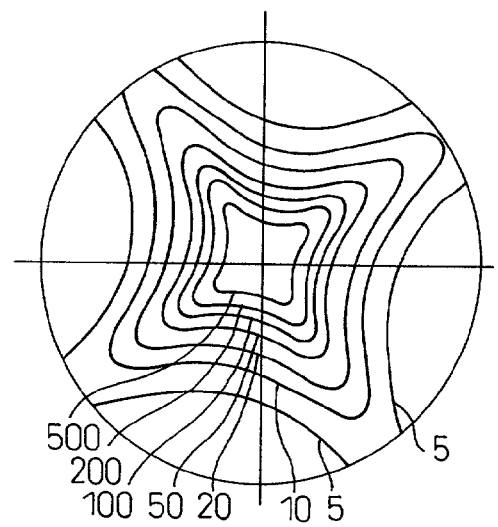
Figure 45C:
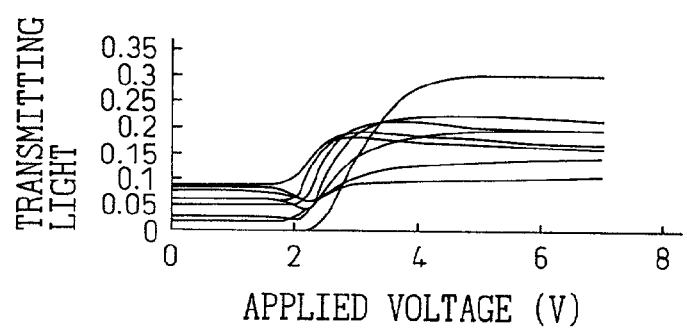

FIGS. 45A to 45C are views showing a variation of the liquid crystal display device shown in FIGS. 37A to 37C. The polarizers 20 and 22 are set in the cross, and the retardation plates 24 and 26 are respectively set at the azimuth angles of 45° and 135°.

Figure 46A:
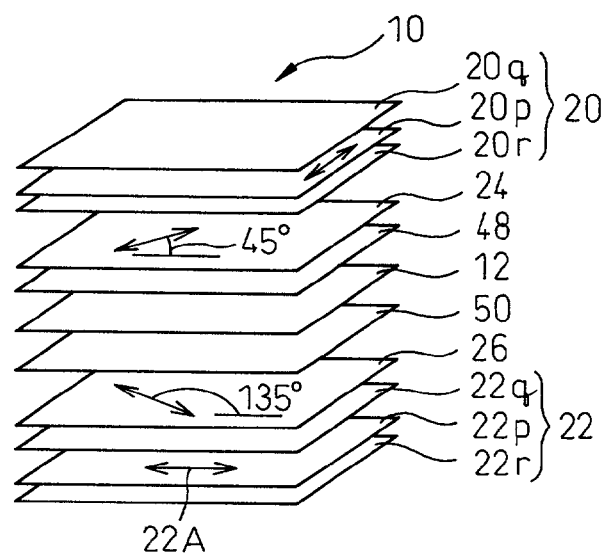
FIGS. 46A to 46C are views showing a variation of the liquid crystal display device shown in FIGS. 37A to 37C.
Figure 46B:
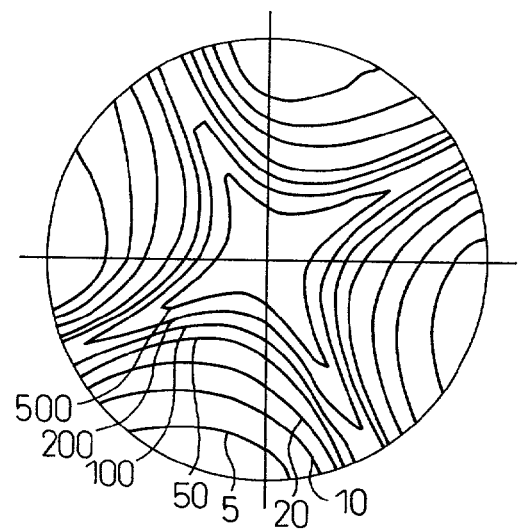
Figure 46C:
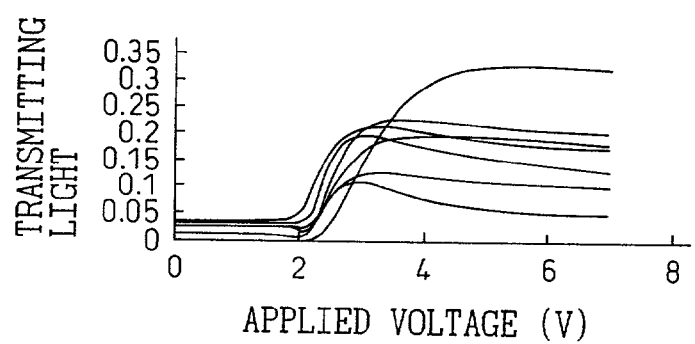

FIGS. 46A to 46C are views showing a variation of the liquid crystal display device shown in FIGS. 45A to 45C. FIGS. 37A to 37C show the case of the four-divided alignment division. On the other hand, FIGS. 46A to 46C show the case of the two-divided alignment division. Arrangements of the polarizers and films are the same as those shown in FIG. 37A. TAC films as negative compensation layers 48 and 50 are laminated between the liquid crystal cell 12 and the retardation plates 24 and 26, respectively.

Figure 47A:
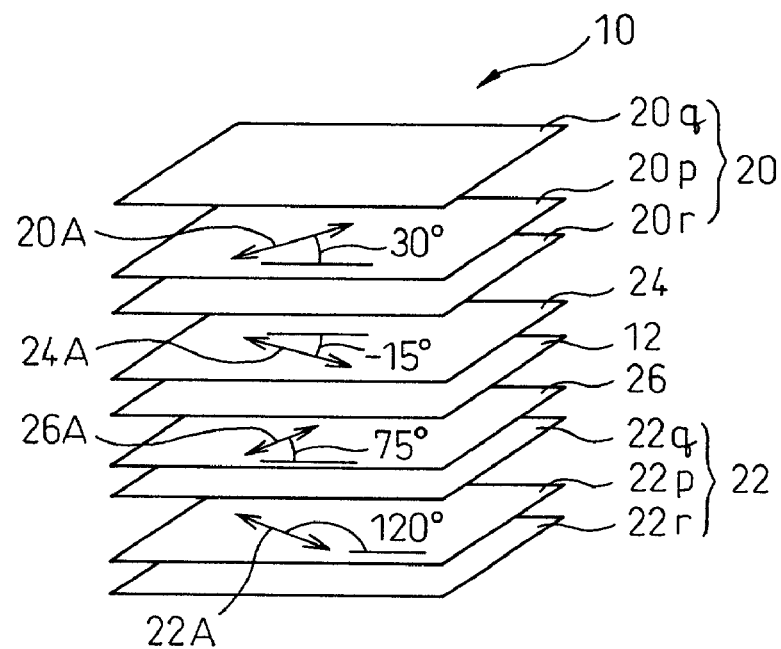
FIGS. 47A to 47B are views showing a variation of the liquid crystal display device shown in FIGS. 37A to 37C.
Figure 47B:
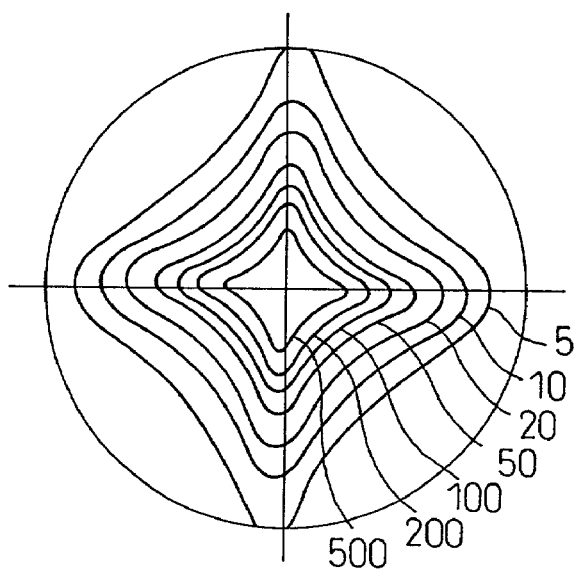

FIGS. 47A and 47B are views showing a variation of the liquid crystal display device shown in FIGS. 37A to 37B. In this arrangement, the setting angles of the polarizers 20 and 22 and the retardation plates 24 and 26 are changed, so that the viewing angle characteristic is made to be symmetrical with respect to the vertical and the horizontal directions. The absorbing axis 22A of the polarizer 22 on the incident side is set at an azimuth angle of 120°, the slow axis 26A of the retardation plate 26 close to the polarizer 22 is set at an azimuth angle of 75°, the slow axis 24A of the retardation plate 24 of the pair is set at an azimuth angle of −15°, and the absorbing axis 20A of the polarizer 20 on the emergent side is set at an azimuth angle of 30°.

Figure 48A:
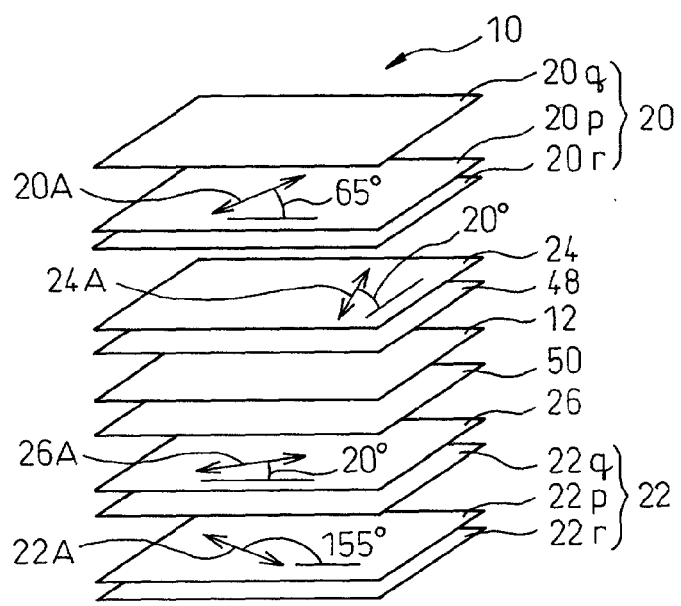
FIGS. 48A to 48C are views showing a variation of the liquid crystal display device shown in FIGS. 37A to 37C.
Figure 48B:
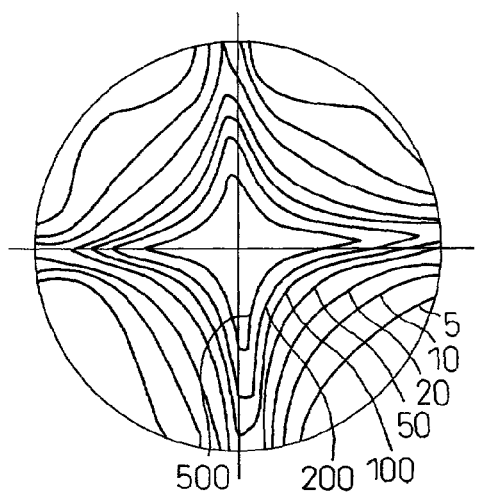
Figure 48C:
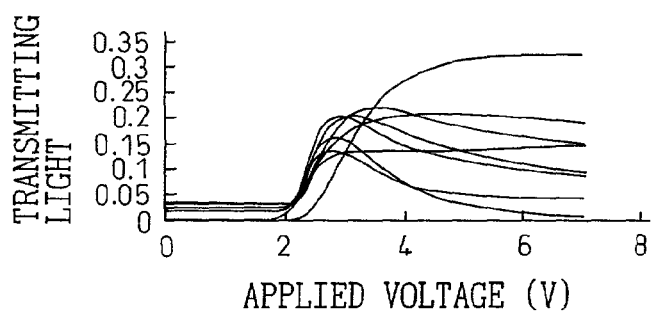

FIGS. 48A to 48C are views showing a variation of the liquid crystal display device shown in FIGS. 47A and 47B. TAC films, as negative compensation layers, 48 and 50 are laminated between the liquid crystal cell 12 and the retardation plates 24 and 26, respectively. The absorbing axis 22A of the polarizer 22 on the incident side is set at an azimuth angle of 155°, the slow axis 26A of the retardation plate 26 close to it is set at an azimuth angle of 20°, the slow axis 24A of the retardation plate 24 of the pair is set at an azimuth angle of 110°, and the absorbing axis 20A of the polarizer 20 on the emergent side is set at an azimuth angle of 65°. Due to the foregoing, the symmetry is lost, however, it is possible to realize a wide range of contrast.

Figure 49A:
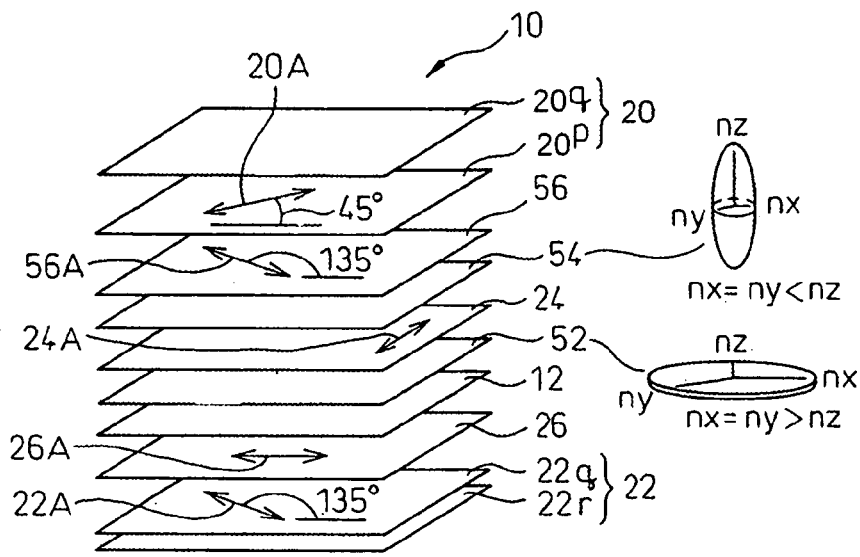
FIGS. 49A to 49C are views showing a variation of the liquid crystal display device shown in FIGS. 37A to 37C.
Figure 49B:
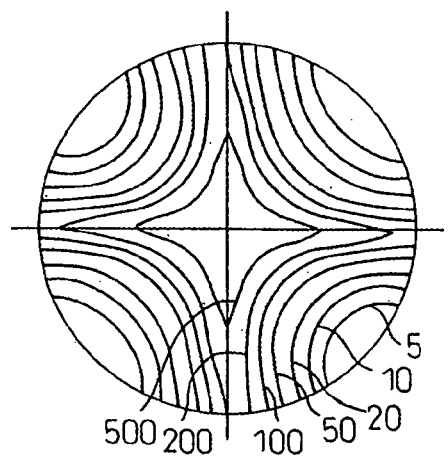
Figure 49C:
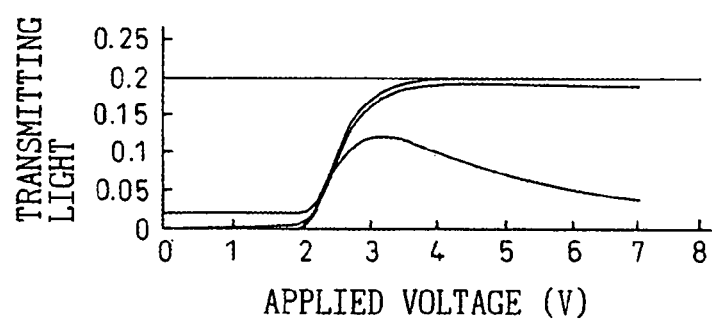

FIGS. 49A to 49C are views showing a variation of the liquid crystal display device shown in FIGS. 37A to 37C. This arrangement is devised such that the retardation of the liquid crystal layer 18 is completely canceled, and the viewing angle range of the polarizers 20 and 22 is maximized and, further, leakage of light caused by the retardation plates 24 and 26 is minimized. The arrangement is explained from the polarizer 22 on the backlight side. An angle of the absorbing axis 22A of the polarizer 22 is set at an azimuth angle of 135°, the slow axis 26A of the λ/4 plate 26 is then set at an azimuth angle of 0°, and aligning directions of the liquid crystal cell 12 of the four-divided alignment division are set at azimuth angles of 45°, 135°, 225° and 315°. Next, in order to completely cancel a birefringence of the liquid crystal layer 18 which is vertically aligned, an optical layer 52 having indices of refraction in the form of a profile of a sitting cushion is set (Δnd is the same as that of the liquid crystal layer), the slow axis 24A of the λ/4 plate 24 is then set at an azimuth angle of 90°, a uniaxial optical layer 54 having a slow axis perpendicular to the substrates (expressed as a Rugby ball type in the drawing) is set. Next, the film 56, which is a uniaxial film and the retardation of which is 140 nm, is set in such a manner that the slow axis 56A is set at an azimuth angle of 135°, and the polarizer 20 is then set in such a manner that the absorbing axis 20A is set at an azimuth angle of 45°. In this case, the symmetric characteristic with respect to the vertical and horizontal directions is obtained, and further even in the azimuth of oblique angle of 45°, the range of the oblique viewing angle in which the contrast is not less than 10 is 50°. In this case, it is preferable that the retardation of the optical layer 52, the profile of which is like sitting cushion, is the same as the retardation of the liquid crystal layer 18. When the retardation is set in the range of ±10%, it is possible to extend the range of good contrast.

Figure 50A:
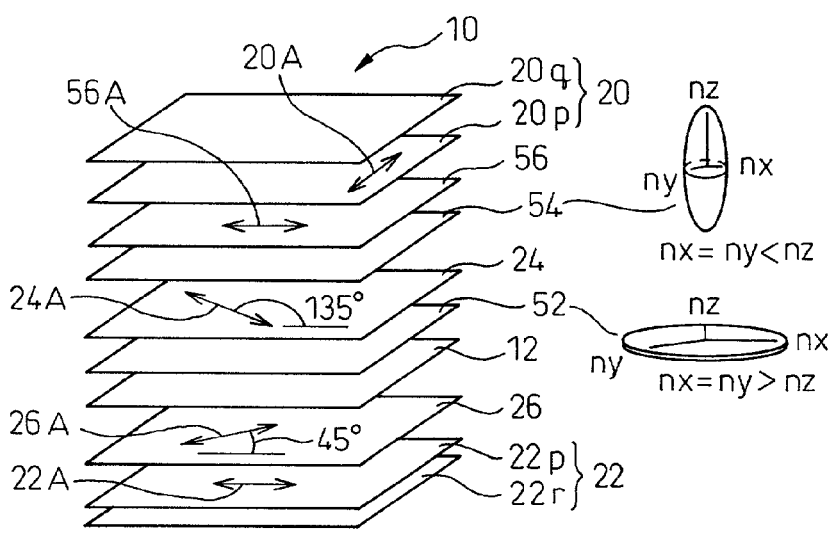
FIGS. 50A to 50C are views showing a variation of the liquid crystal display device shown in FIGS. 37A to 37C.
Figure 50B:
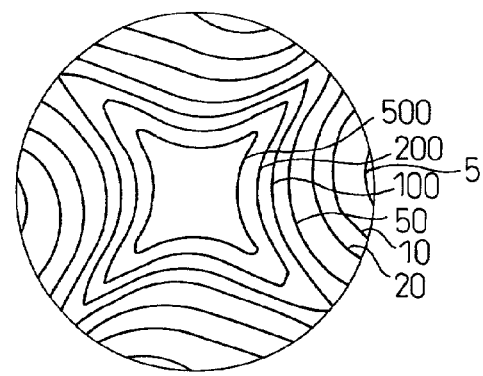
Figure 50C:
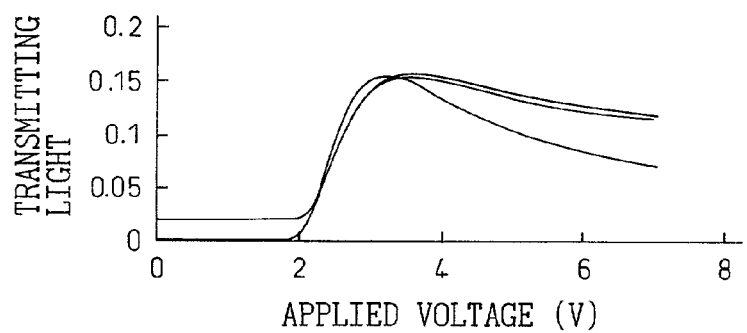

FIGS. 50A to 50C are views showing a variation of the liquid crystal display device shown in FIGS. 49A to 49C. This variation is different from the embodiment shown in FIG. 49A at the setting angles of the polarizers 20 and 24. The arrangement will be explained from the polarizer 22 on the backlight side. The absorbing axis 22A of the polarizer 22 is set at an azimuth angle of 0°, the slow axis 26A of the λ/4 plate 26 is set at an azimuth angle of 45°, and the alignment directions of the four-divided alignment division of the liquid crystal cell 12 are set at azimuth angles of 45°, 135°, 225° and 315°. Next, in order to completely cancel birefringence of the liquid crystal layer which is vertically aligned, the optical layer 52 having indices of refraction in a profile of sitting cushion is set (Δnd is the same as that of the liquid crystal layer). Next, the slow axis 24A of the λ/4 plate 24 is set at an azimuth angle of 135°. Next, the uniaxial optical layer 54 is set, the profile of which is expressed as a Rugby ball type in the drawing, the slow axis of which is perpendicular to the substrate. Next, a film 56, which is a uniaxial film and the retardation of which is 140 nm, is set in such a manner that the slow axis 56A is set at an azimuth angle of 0°. Then, the polarizer 20 is set in such a manner that the absorbing axis 20A is set at an azimuth angle of 90°. In this case, the azimuth at which the contrast is highest is displaced and is 45° with respect to the vertical and the horizontal, but the oblique viewing angle at which the contrast becomes 5 is 75° at the worst, and it is possible to realize a wide viewing angle range.

Figure 51A:
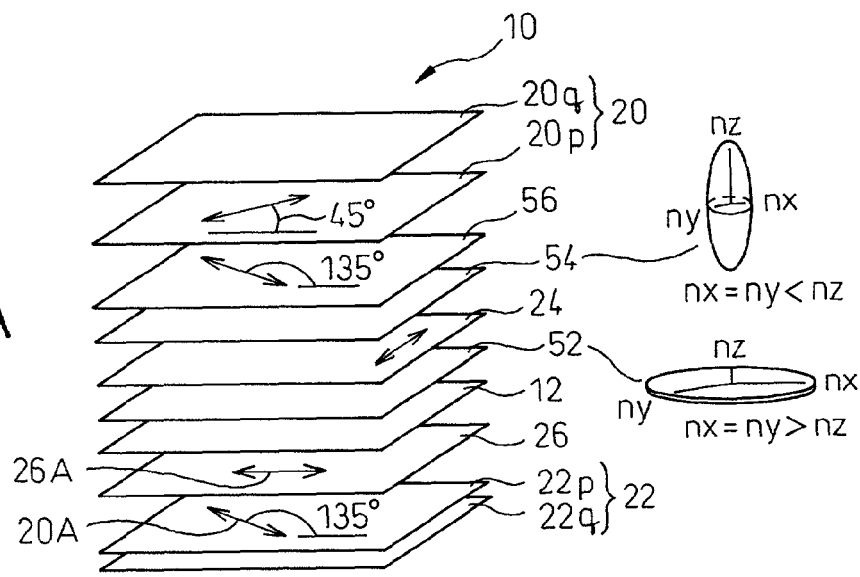
FIGS. 51A to 51C are views showing a variation of the liquid crystal display device shown in FIGS. 37A to 37C.
Figure 51B:
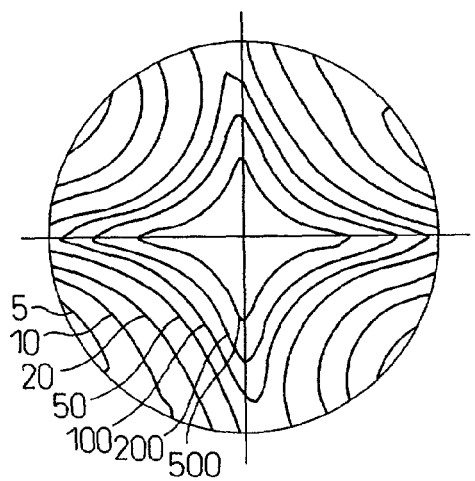
Figure 51C:
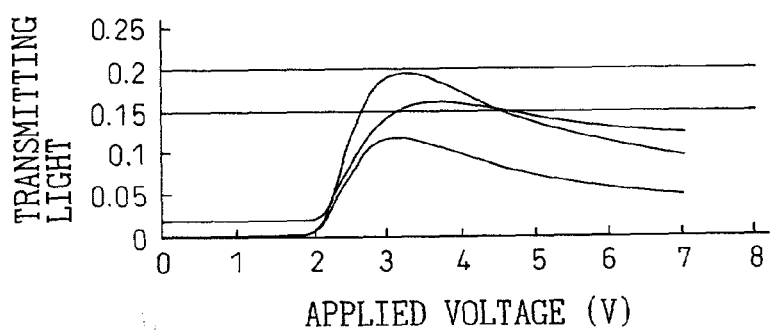

FIGS. 51A to 51C are views showing a variation of the liquid crystal display device shown in FIGS. 37A to 37C. In the embodiment shown in FIGS. 49A to 49C, the alignment is divided into four, however, in this embodiment, the alignment is divided into two. Essentially, with respect to the embodiment shown in FIGS. 49A to 49C, this embodiment is composed in such a manner that the alignment directions are 90° and 270°, that is, the alignment is divided into two, and the arrangements of the polarizers 20 and 22, the films 52, 54 and 56 for improving the viewing angle and the λ/4 plates are the same as those shown in FIGS. 49A to 49C. When the viewing angle characteristic is checked, concerning the viewing angle characteristic of the ratio of contrast, the characteristic of this embodiment is superior to that of the embodiment shown in FIGS. 49A to 49C. On the other hand, when the T-V characteristic is checked, the undulation of the T-V characteristic upon the application of voltage becomes larger than that of FIG. 49C. Therefore, it can be understood that the viewing angle characteristic in the case of displaying a middle tone is inferior but it can be considered that the arrangement of two-divided alignment division can be easily manufactured as compared with the arrangement of four-divided alignment division.

Figure 52A:
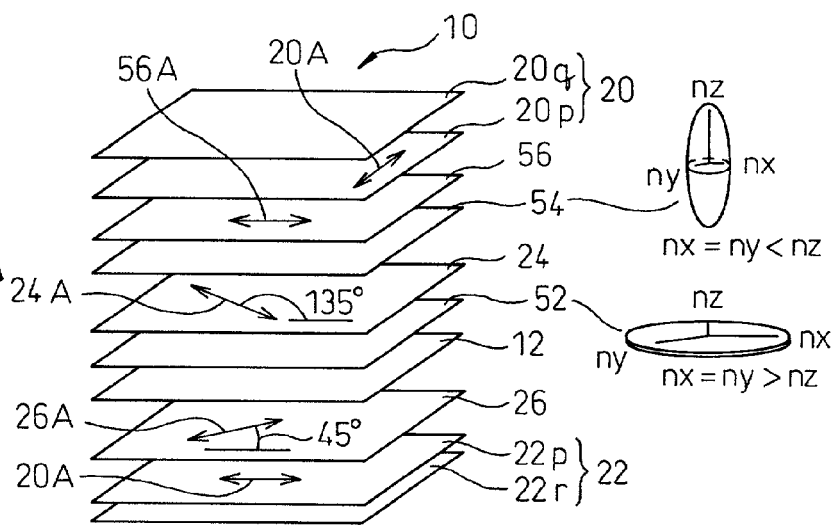
FIGS. 52A to 52C are views showing a variation of the liquid crystal display device shown in FIGS. 37A to 37C.
Figure 52B:
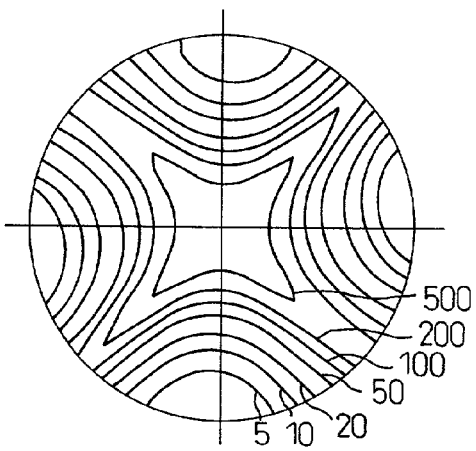
Figure 52C:
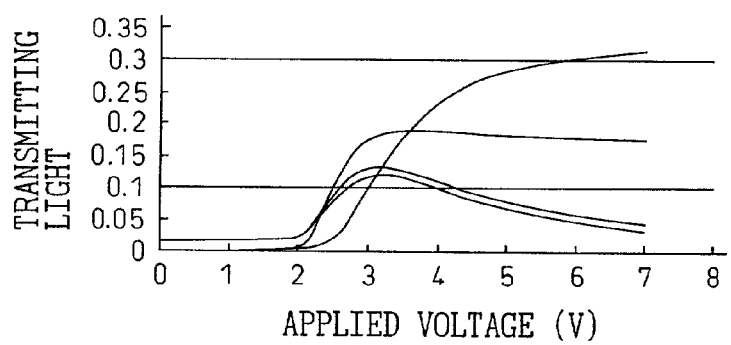

FIGS. 52A to 52C are views showing a variation of the liquid crystal display device shown in FIGS. 37A to 37C. With respect to the embodiment shown in FIGS. 50A to 50C, in this embodiment, the setting angles of the polarizers 20 and 22 and the compensation films 52, 54 and 56 are not changed, and the alignment of the liquid crystal cell 12 is divided into two, in which the alignment azimuth angles are set at 90° and 270°.

Figure 53A:
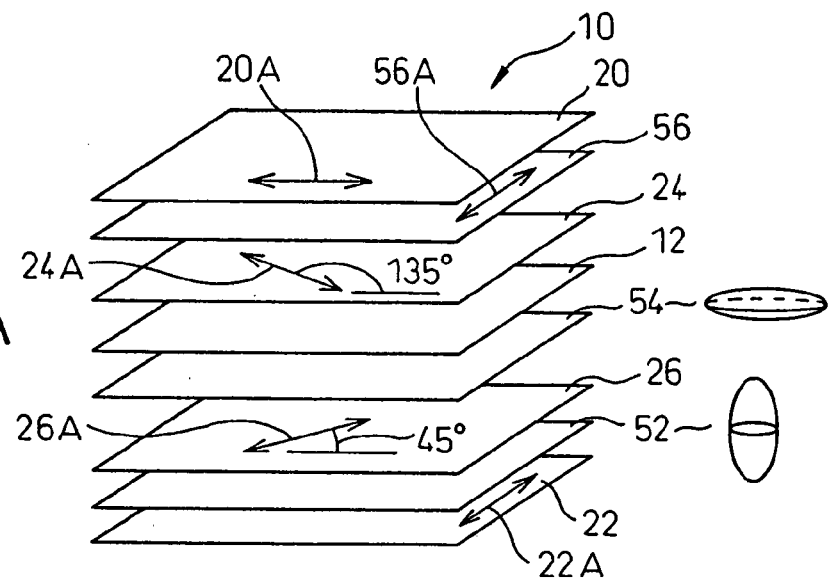
FIGS. 53A and 53B are views showing a variation of the liquid crystal display device shown in FIGS. 37A to 37B.
Figure 53B:
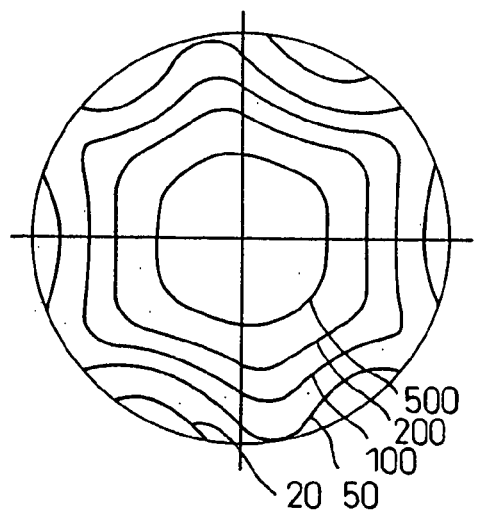

FIGS. 53A and 53B are views showing a variation of the liquid crystal display device shown in FIGS. 37A to 37C. In the embodiment described before, a uniaxial oriented film, especially an optically uniaxial film, is used for the λ/4 plates 24 and 26. On the other hand, in this embodiment, a film, the negative retardation (=(nx+ny)/2−nz) of which is zero, is used for the λ/4 plates 24 and 26. When the viewing angle characteristic (shown in FIG. 53B) of the ratio of contrast in this case is checked, a line of the contrast 10 cannot be seen, and an excellent viewing angle characteristic can be realized in the range of an azimuth oblique angle of 80°. Concerning the film, the negative retardation of which is 0, it is possible to use NZ Film manufactured by Nitto Denko Co. and SZ Film manufactured by Sumitomo Kagaku Co. which are on the market. Concerning the negative retardation (=(nx+ny)/2−nz), when it is set at 0±20 nm, it is possible to realize an especially wide viewing angle. Further, while the absorbing axis of the polarizer on one side and the slow axis of the phase film 56 are made to be perpendicular to each other, the phase film 56 is set close to the polarizer 20. Concerning the value of the retardation on the face of the phase film 56, when the phase film 56 is arranged close to both of the pair of polarizers, the value is set in the range not less than 25 nm and not more than 70 nm. When the phase film 56 is arranged close to only the polarizer on one side, the value is set in the range not less than 60 nm and not more than 160 nm (in this example, 140 nm). Further, the film 52 having a positive optical anisotropy in the vertical direction is put on the substrate, and the position is set between the λ/4 plate 26 and the polarizer 22. In this case, a value of the retardation is set in the range not less than 80 nm and not more than 300 nm. The value is preferably set at 90 nm±10 nm. In this case, it is possible to realize an especially wide viewing angle as shown in FIG. 53B. The retardation of plate 54[={(nx+ny)/z−nz}×d] is almost equal to the retardation of vertically aligned 2C cell 12 (Δn·d).

Figure 54:
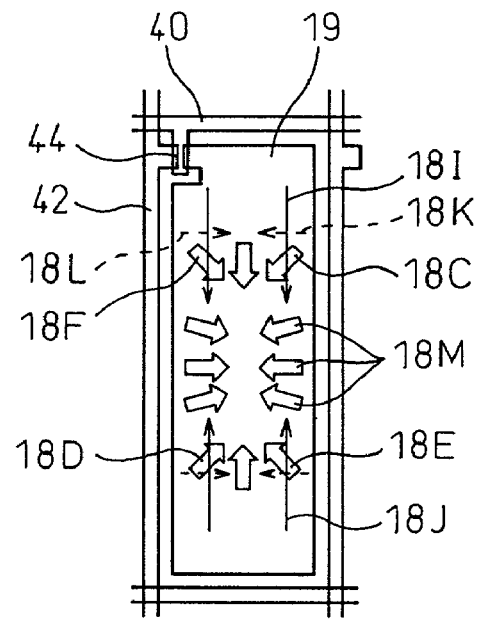
FIG. 54 is a view showing a variation of the liquid crystal display shown in FIG. 37A.

FIG. 54 is a view showing the relation between the alignment regulating directions to realize the four-divided alignment division and the alignment directions of liquid crystal molecules realized at the time. The solid line arrows 18I and 18J show azimuths to which the liquid crystal molecules on the TFT substrate side are tilted down, and the dotted line arrows 18K and 18L show azimuths to which the liquid crystal molecules on the CF substrate side are tilted down. By these alignment regulating means, the action to tilt the liquid crystal molecules is exerted as shown by the bold arrows 18C, 18D, 18E and 18F. The thus obtained result of regulating the alignment azimuth is shown by the bold arrow 18M. In this case, the characteristic thing is that the directions of the bold arrows 18C, 18D, 18E and 18F do not coincide with the direction of the bold arrow 18M. In this case, in the intermediate region of the alignment regulating azimuths shown by the bold arrows 18C, 18D, 18E and 18F, the alignment of the liquid crystal molecules is directed to the azimuth so that the intermediate region of the alignment regulating azimuth can be equally divided into two. Therefore, when the entire pixel is viewed, it is tilted toward the center of the pixel like the petals of tulip, that is, it is tilted toward the center of the pixel as if a flower of tulip were in bloom being directed outside.

Figure 55:
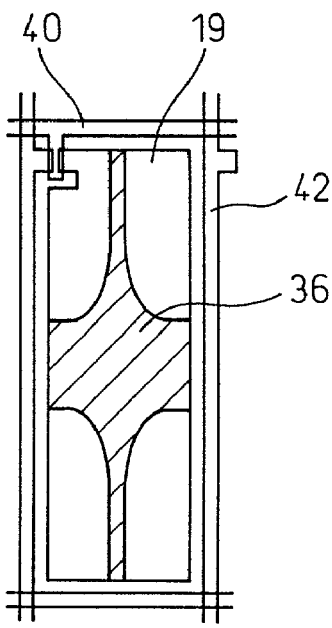
FIG. 55 is a view showing a distribution of a quantity of transmission light on the front surface when the polarizers are set in a cross in the liquid crystal display shown in FIG. 54.

FIG. 55 is a view showing a distribution of a quantity of transmission light on the front face when the polarizers are set being formed into a cross. As shown in the view, a black cross region exists at the center of the pixel. Therefore, it is impossible to obtain a bright display. When the λ/4 plates are set on both sides of the liquid crystal layer in this case, it is possible to realize a bright display.

Concerning the method of regulating the alignment shown in FIG. 54, the optical alignment method and the rubbing method were used. As explained above, when the present invention is applied, it is possible to realize a bright display and it is also possible to realize a liquid crystal display device having a wide viewing angle.

Figure 58A:
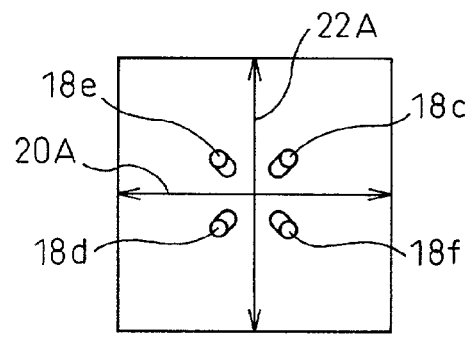
FIGS. 58A to 58C are views showing the alignment and the transmittance of the liquid crystal molecules of the liquid crystal display device in which the alignment division is conducted.
Figure 58B:
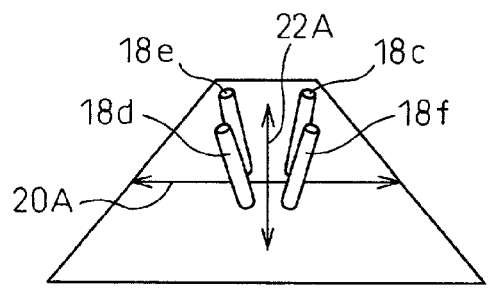
Figure 58C:
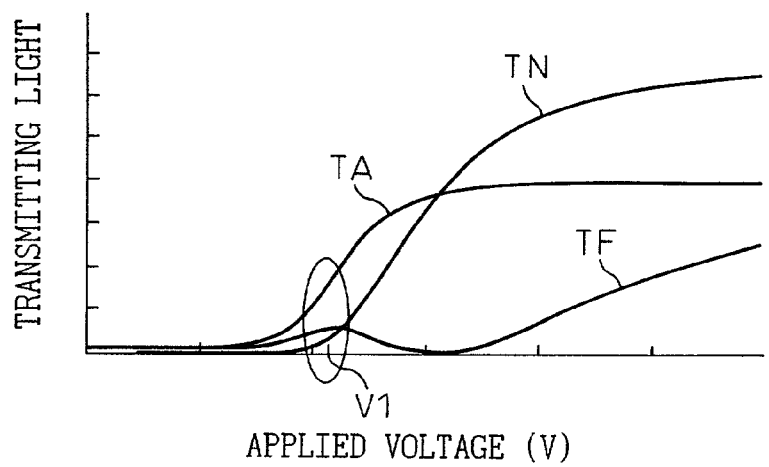

FIG. 56 is a view showing a liquid crystal display device of the fourth embodiment of the present invention. FIGS. 57A and 57B are views for explaining an action of the specific direction light scattering film shown in FIG. 56. FIGS. 58A to 58C are views showing the alignment of liquid crystal molecules and the transmittance of the liquid crystal display device in which the alignment is divided. In FIG. 56, the liquid crystal display device 10 includes a liquid crystal cell 12, first and second polarizers 20 and 22, a specific direction light scattering film 60, and a viewing angle improving film 62. The polarizers 20 and 22 are composed of polarizing layers 20p and 22p and protective layers 20q, 20r, 22q and 22r, as shown in FIG. 39A. The protective layer 20r shown in FIG. 56 comprises a portion of the polarizer 20.

The liquid crystal cell 12 comprises the liquid crystal layer 18 arranged between the first and second substrates 14 and 16, as shown in FIG. 1. The liquid crystal layer 18 is composed of liquid crystal of a vertical alignment type. The liquid crystal cell 12 is subjected to alignment division. That is, the liquid crystal cell 12 includes structures or slits provided on the electrode of at least one of the substrates, so that the state of alignment of liquid crystal molecules on one side of the structure or slit is different from the state of alignment of liquid crystal molecules on the other side of this structures or slits. Concerning the structures or the slits, it is possible to use all the structures or the slits which have already been explained.

FIGS. 58A to 58C are views showing liquid crystal molecules 18c, 18d, 18e and 18f in the four different states of alignment, and the relation between the applied voltage and the quantity of transmitting light. FIG. 58A shows the states of alignment of the liquid crystal molecules 18c, 18d, 18e and 18f when a relatively low voltage, for example a voltage V1, shown in FIG. 58C, is applied and the image area is viewed in the normal direction. FIG. 58B shows the states of alignment of the liquid crystal molecules 18c, 18d, 18e and 18f when the same voltage V1 is applied and the image area is viewed in an oblique direction. In FIG. 58C, curve TA is a T-V curve of the alignment of the liquid crystal molecules 18c and 18e in FIG. 58B, curve TF is a T-V curve of the alignment of the liquid crystal molecules 18d and 18f in FIG. 58B, and curve TN is a T-V curve of the averaged alignment of all liquid crystal molecules in FIG. 58A. As can be seen in FIG. 58C, when a relatively low voltage V1 is applied and the image area is viewed in an oblique direction, the brightness becomes higher than that of a case in which the image area is viewed in the normal direction. In the case where the relatively low voltage V1 is applied, it is intended that a relatively dark display with respect to gradation or gray scale is realized, but the display becomes whitish at a certain viewing angle. This phenomenon becomes remarkable in the case where the viewing angle improving film 62 is included.

The liquid crystal display device 10 shown in FIG. 56 is suitable for solving the above problems by providing a specific direction light scattering film 60. By the specific direction light scattering film 60, light is scattered in one specific direction, and light is scattered only slightly in the other directions. An example of the specific direction light scattering film 60 is Nimisty manufactured by Sumitomo Kagaku Co.

FIG. 57A shows a case in which the liquid crystal display device 10 having no specific direction light scattering film 60 is viewed in an oblique direction, and FIG. 57B is a view showing a case in which the liquid crystal display device 10 having the specific direction light scattering film 60 is viewed in an oblique direction. In the case shown in FIG. 57A, light, which obliquely transmits through the liquid crystal cell 12, enters a viewer's eye. In this case, the viewer sees a whitish display as described above. In the case shown in FIG. 57B, light made incident to the specific direction light scattering film 60 in the normal direction is scattered in an oblique upper direction. Therefore, light, which is transmitted through the liquid crystal cell 12 in the normal direction, and light, which is obliquely transmitted through the liquid crystal cell 12, enter the viewers eye at the same time. Accordingly, it is possible for the viewer to see the image area in the substantially same condition as that of a case in which the viewer sees the image area in the normal direction. In order to reduce the parallax between the light, which is transmitted through the liquid crystal cell 12 in the normal direction, and the light, which is obliquely transmitted through the liquid crystal cell 12, it is preferable that the specific direction light scattering film 60 is arranged close to the polarizer 20 on the emergent side of light.

The viewing angle improving film 62 is, for example, the retardation plate (λ/4 plate) 24 and 26 described in the above embodiment. When the polarizers 20 and 22 and the retardation plates (λ/4 plate) 24 and 26 are combined with each other, a circular polarization is created and the brightness is enhanced as described above. In this connection, in the arrangement shown in FIG. 56, the viewing angle improving film 62 is provided only on one substrate 14, however, of course, the viewing angle improving film 62 may be provided on the other substrate 16. Further, the viewing angle improving film 62 may be one of the films 48, 50, 52, 54 and 56 shown in FIGS. 39 to 53. That is, the viewing angle improving film 62 is composed of a uniaxial oriented film, a biaxial oriented film or a film having a negative retardation.

Figure 59:
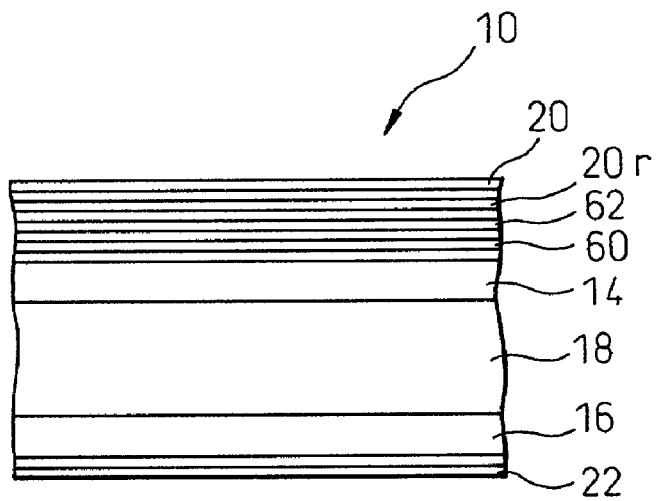
FIG. 59 is a view showing a variation of the liquid crystal display device shown in FIG. 56.
Figure 60:
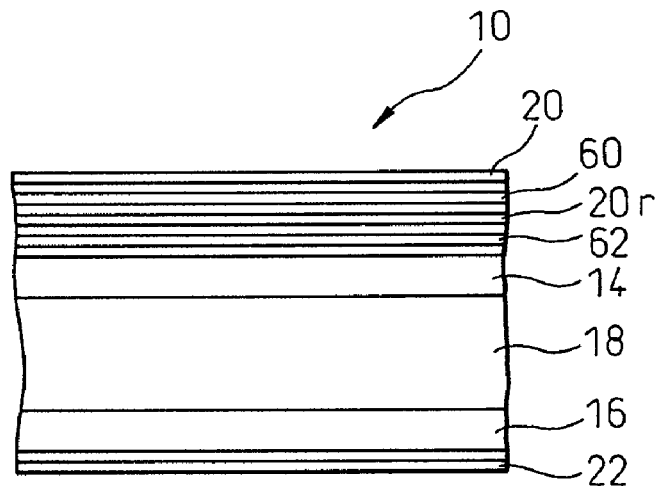
FIG. 60 is a view showing a variation of the liquid crystal display device shown in FIG. 56.

FIG. 59 is a view showing a variation of the liquid crystal display device shown in FIG. 56. In FIG. 56, the specific direction light scattering film 60 is arranged close to the polarizer 20 on the emergent side of light, and the viewing angle improving film 62 is arranged close to the substrate 14. On the other hand, in FIG. 59, the specific direction light scattering film 60 is arranged close to the substrate 14, and the viewing angle improving film 62 is arranged close to the polarizer 20 on the emergent side of light. The action of this embodiment is the same as that of the embodiment shown in FIG. 59.

Concerning the position at which the specific direction light scattering film is arranged, when the viewing angle improving film is arranged close to the liquid crystal layer and the light scattering film is arranged between this viewing angle improving film and the polarizing film, an especially good viewing angle characteristic is provided. Essentially, the viewing angle improving film is provided for cancelling the optical effect of the liquid crystal with respect to light made obliquely incident to the liquid crystal layer. However, when the light scattering film is arranged close to the liquid crystal layer, light made perpendicularly incident to the crystal layer is scattered and obliquely passes through the viewing angle improving film. In this case, although light made perpendicularly incident to the liquid crystal layer is not subjected to an optical action by the liquid crystal layer, the viewing angle improving film exhibits an optical effect. That is, it acts so that leakage of light is caused, which makes matters worse.

Figure 61:
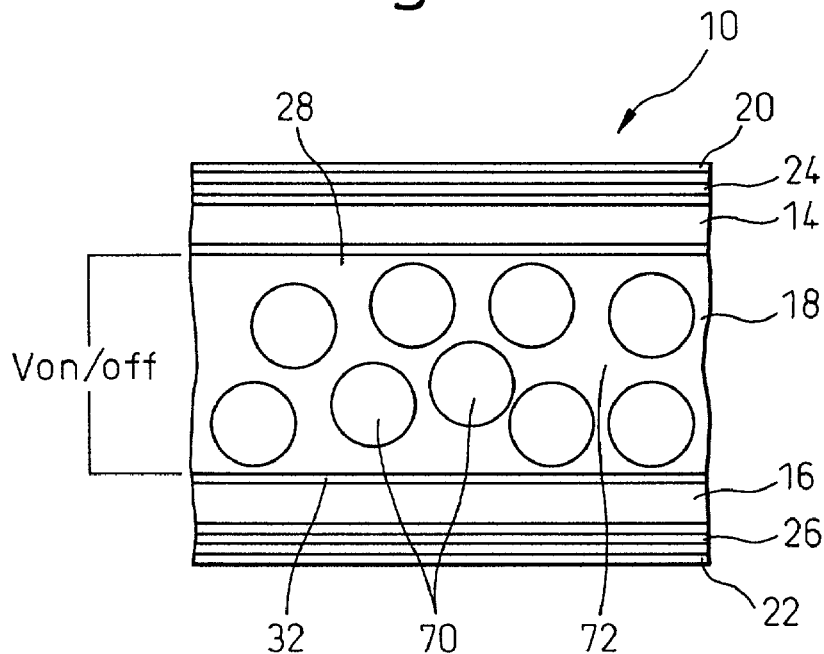
FIG. 61 is a view showing the liquid crystal display device of the fifth embodiment of the present invention.
Figure 62:
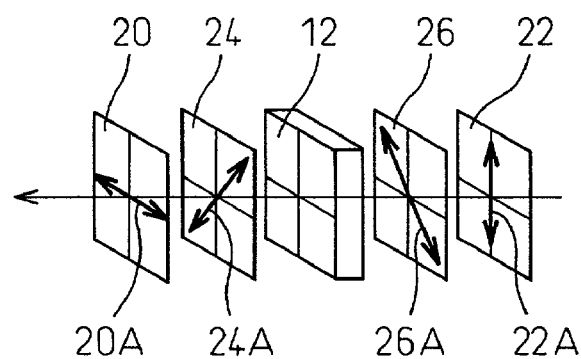
FIG. 62 is a view for explaining polarizing axes of the polarizers and optical axes of the retardation plates of the liquid crystal display device shown in FIG. 61.

FIG. 61 is a view showing a liquid crystal display device of the fifth embodiment. FIG. 62 is a view for explaining polarizing axes of the polarizers and optical axes of the retardation plates of the liquid crystal display device shown in FIG. 61. The liquid crystal display 10 includes a liquid crystal cell 12, first and second polarizers 20 and 22, and first and second retardation plates 24 and 26. Each of the first and second retardation plates 24 and 26 has an optical axis 24A or 26A in a plane parallel to the surfaces of the substrate, and the retardation is substantially λ/4. The optical axis 24A of the first retardation plate 24 is perpendicular to the optical axis 26A of the second retardation plate 26. The polarizing axes 20A and 22A of the first and second polarizers 22 and 22 are arranged at an angle of 45° with respect to the optical axes 24A and 26A of the first and second retardation plates 24 and 26. Voltage is applied between the electrodes 28 and 32.

The liquid crystal cell 12 has a liquid crystal layer 18 interposed between the first and second substrates 14 and 16. The liquid crystal layer 18 comprises liquid crystal droplets 70 dispersed in a resin 72. The liquid crystal display device having the liquid crystal layer 18, which is made of the liquid crystal droplets 70 and the resin 72, is referred to as a polymer dispersed type liquid crystal display device. However, it should be noted that the present invention is not limited to the polymer dispersed type liquid crystal display device, but the present invention can be applied to another type liquid crystal display device having a liquid crystal layer 18 in which the liquid crystal droplets 70 coexist in the resin 72.

Figure 63:
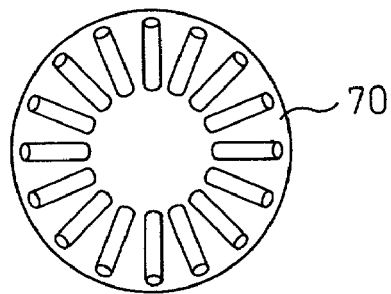
FIG. 63 is a view showing a state of alignment of liquid crystal molecules in the liquid crystal droplets shown in FIG. 63.

FIG. 63 is a view showing a state of alignment of liquid crystal molecules in the liquid crystal droplets 70 when voltage is not applied. Liquid crystal molecules are aligned in all alignment directions. When voltage is applied in this state, the liquid crystal molecules are aligned in the liquid crystal droplets 70 perpendicularly to the substrate surface.

Figure 64:
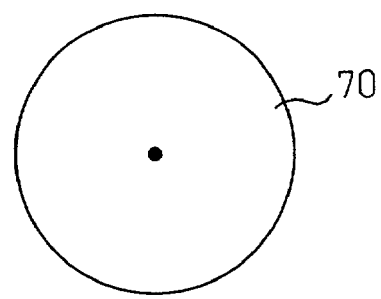
FIG. 64 is a view showing a display in the state of alignment of the liquid crystal molecules shown in FIG. 63.

FIG. 64 is a view showing a display in the state of alignment of the liquid crystal molecules shown in FIG. 63 when voltage is not applied. The liquid crystal molecules are aligned substantially at random with respect to the substrate surface. Therefore, when the polarizers 20 and 22 are arranged in a Cross Nicol and the λ/4 plates are arranged, a white display is created.

Figure 65:
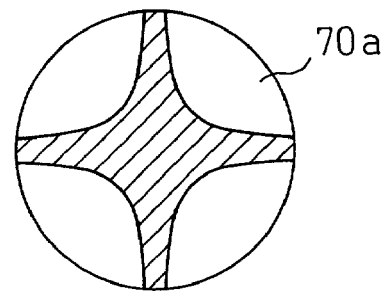
FIG. 65 is a view showing a display of a conventional liquid crystal display device.

FIG. 65 is a view showing a conventional liquid crystal display device having the polarizers 20 and 22, but no retardation plates 24 and 26. As shown in FIG. 63, the liquid crystal molecules are aligned in all aligning directions in the liquid crystal droplets 70a, and the absorbing axes 20A and 22A of the polarizers 20 and 22 are arranged perpendicular to each other. Therefore, in a portion in which the liquid crystal molecules are aligned in the same direction as the absorbing axes 20A and 22A, the display becomes black, which is the same as the black lines 36 in FIGS. 4 and 9.

According to the present invention, it is possible to erase a black display portion shown in FIG. 65, to realize a bright display shown in FIG. 64, by providing the retardation plates 24 and 26.

In order to realize the polymer dispersed type liquid crystal panel, an attempt is made in such a manner that fluorine resin and an ultraviolet-ray curable type resin are mixed with each other by a mixing ratio of 8:2 so that the size of liquid crystal droplets could be increased to as large as possible. It is possible to use liquid crystal having positive dielectric constant anisotropy. Alternatively, it is also possible to use liquid crystal having negative dielectric constant anisotropy. In the case where liquid crystal having positive dielectric constant anisotropy is used, it is desirable that the liquid crystal molecules lie down when voltage is not applied. Therefore, it is unnecessary to coat an alignment film, and a mixture of the liquid crystal with the resin is filled into between the substrates which have been washed. In the case where liquid crystal having negative dielectric constant anisotropy is used, the liquid crystal molecules lie down when voltage is applied. Therefore, when voltage is not applied, it is necessary for the liquid crystal molecules to be aligned in the vertical direction. Due to the foregoing, a polyimide film having the vertical alignment property is coated on the substrate.

After the mixture of liquid crystal with resin is filled, ultraviolet ray is irradiated so that the resin is cured. In this process, the liquid crystal and the resin are separated from each other and the droplets 70 of liquid crystal are formed.

Figure 66:
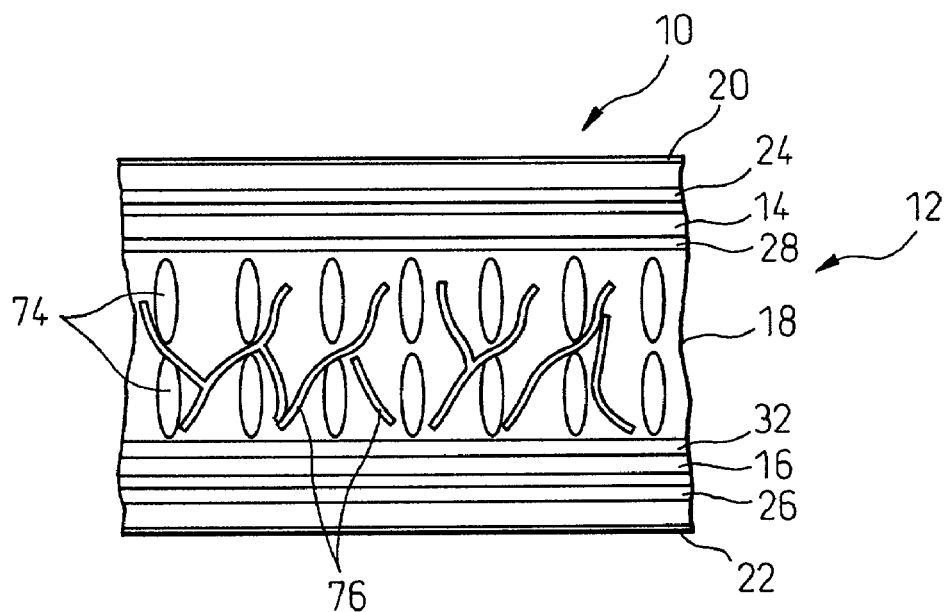
FIG. 66 is a view showing the liquid crystal display of the sixth embodiment of the present invention.
Figure 67:
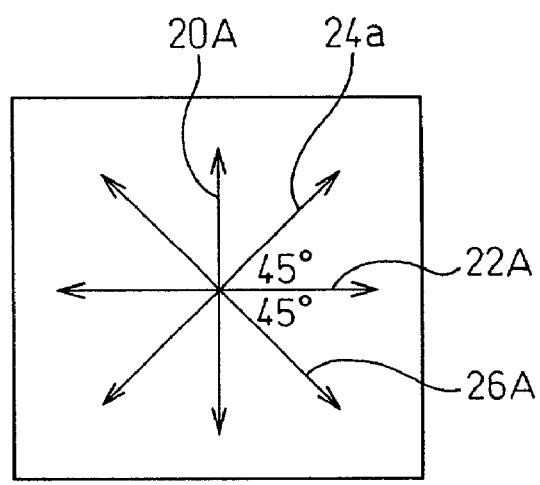
FIG. 67 is view for explaining polarizing axes of the polarizers and optical axes of the retardation plates of the liquid crystal display device shown in FIG. 66.

FIG. 66 is a view showing a liquid crystal display device of the sixth embodiment of the present invention. FIG. 67 is view for explaining polarizing axes of the polarizers and optical axes of the retardation plates of the liquid crystal display device shown in FIG. 66. The liquid crystal display device 10 includes a liquid crystal cell 12, first and second polarizers 20 and 22, and first and second retardation plates 24 and 26. Each of the first and second retardation plates 24 and 26 has an optical axis 24A or 26A in a plane parallel to the surfaces of the substrates, and the retardation is substantially λ/4. The optical axis 24A of the first retardation plate 24 is perpendicular to the optical axis 26A of the second retardation plate 26. The polarizing axes 20A and 22A of the first and second polarizers 20 and 22 are arranged at an angle of 45° with respect to the optical axes 24A and 26A of the first and second retardation plates 24 and 26. Voltage is applied between the electrodes 28 and 32.

The liquid crystal cell 12 includes a liquid crystal layer 18 arranged between the first and second substrates 14 and 16.

The liquid crystal layer 18 comprises a liquid crystal 74 dispersed in a polymer network 76. The liquid crystal display device having the liquid crystal layer 18, which is composed of the liquid crystal 74 and the polymer network 76, is referred to as a polymer network type liquid crystal display device. The liquid crystal is a vertical aligning type liquid crystal having a negative dielectric constant anisotropy. The first substrate 14 is a color filter substrate, and the second substrate 16 is a TFT substrate.

In the alignment division using the vertical alignment type liquid crystal and the linear structures 30 and 34 and the slits 38 as described above, the problem that when a portion of the liquid crystal molecules and the polarizing axes of the polarizers coincide with each other in the case of application of voltage, the brightness is lowered may be encountered, and therefore, the retardation plates (λ/4) are provided so that the brightness can be enhanced. However, in the case where this technique is applied to an image area of a notebook type personal computer, the image area of which must be brighter, if there are provided linear structures 30 and 34 and slits 38 in the display region, the ratio of opening of the display region is decreased, and it becomes impossible to provide a sufficiently high brightness. Therefore, when the linear structures 30 and 34 and the slits 38 are provided only on the bus lines and the subsidiary capacitor lines, the ratio of opening of the display region is increased, and it becomes possible to provide a sufficiently high brightness. However, in this case, an interval between the linear structures 30 and 34 or an interval between the linear structure 30 and the slit 38 is extended too long, and it takes long time for the inclination of crystals to be spread. As a result, the speed of response is lowered. This problem can be solved by this embodiment.

The polymer network 76 is formed so that the pretilt of liquid crystal molecules of the liquid crystal 74 and the direction of inclination of the liquid crystal molecules in the case of application of voltage can be regulated, which is referred to as a polymer stabilization. The polymer network 76 is a structure of polymerization which is made when a liquid crystal type or a non-liquid crystal type monomer is polymerized by the action of ultraviolet rays or heat. This polymer network 76 is solidified as a structure having a specific alignment in the process of polymerization. Accordingly, in the polymer network 76, when the liquid crystal molecules of the liquid crystal droplets 74 are aligned substantially in the vertical direction being accompanied by pre-tilt and voltage is applied to the liquid crystal molecules, the liquid crystal molecules are inclined in the direction (pre-tilt direction), which is regulated by the polymer network 76, with a quick response.

The monomer composing the polymer network 76 is made of an ultraviolet curable type or thermo-setting type monomer. It is preferable that the monomer composing the polymer network 76 is a two functional acrylate or a mixture in which a two functional acrylate and a single functional acrylate are mixed with each other. It is preferable that the pre-tilt angle of the liquid crystal molecules regulated by the polymer network 76 is not less than 80°.

Figure 68:
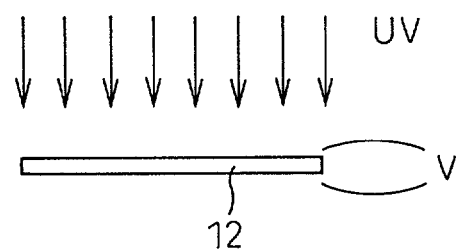
FIG. 68 is a view showing a stabilization treatment of the liquid crystal cell shown in FIG. 66.

Stabilization treatment of the polymer network 76 is conducted by the method shown in FIG. 68. The liquid crystal cell 12 is composed in such a manner that the liquid crystal monomer is inserted between a pair of substrates 14 and 16. While voltage is being applied upon the electrodes 28 and 32 of the liquid crystal cell 12, the liquid crystal cell 12 is irradiated with ultraviolet rays (UV), so that the liquid crystal monomer is subjected to optical polymerization. In this way, the liquid crystal monomer is polymerized. Since polymerization is conducted while voltage is being applied, the liquid crystal molecules are aligned toward the linear structures 30 and 34 and the slits 38 in the same manner as that of a usual alignment division type liquid crystal display device.

When the application of voltage, which is conducted for stabilization treatment, is stopped, the liquid crystal molecules are regulated by the solidified polymer and kept in a state of alignment of predetermined directions. In this way, the liquid crystal is pretilted. In this case, even if the linear strictures 30 and 34 and the slits 38 are not provided, the bus lines and the protrusions of the subsidiary capacitor electrodes function in the same manner as that of the linear structures 30 and 34 and the slits 38. Therefore, the liquid crystal is pre-tilted. In this case, the behavior of the liquid crystal molecules is not affected by the speed of response. Therefore, the liquid crystal molecules may be pre-tilted while a relatively long period of time is being spent for the process of pretilt.

In this connection, although the polymer network 76 is set into a state of solidification, it is not a perfect solid body. Therefore, when voltage is applied upon the polymer network 76 in the use of the liquid crystal display device, the liquid crystal molecules are inclined with respect to the substrate surfaces according to the pre-tilt. At this time, the entire liquid crystal molecules are already pre-tilted. Therefore, the speed of response is high.

The pre-tilt angle depends upon a quantity of monomer to be added, an optical polymerization starting agent, a quantity of irradiated ultraviolet rays and an applied voltage. In order to keep the characteristic of the vertical alignment type liquid crystal, it is preferable that the pre-tilt angle is not less than 80°.

Figure 69:
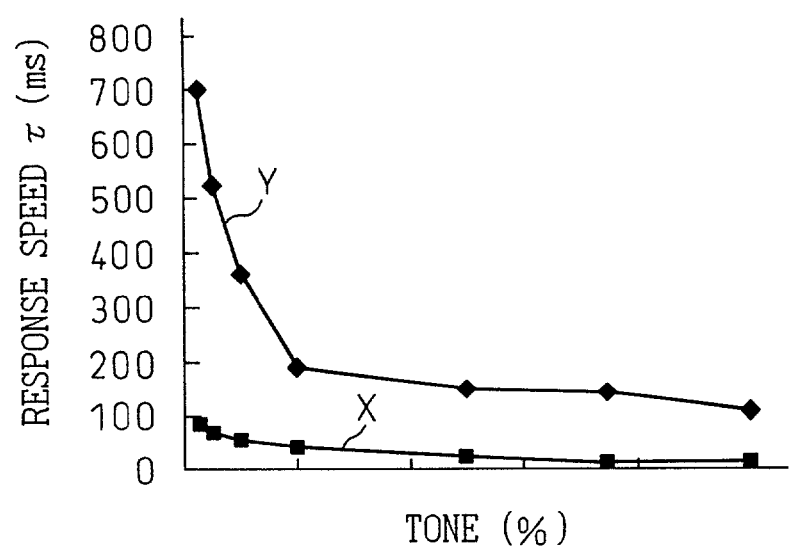
FIG. 69 is a view showing the relation between the tone and the speed of response in the case where the liquid crystal display device is used.

FIG. 69 is a graph showing the relation between the gradation and the speed of response in the case where the liquid crystal display device is used. Curve X shows a speed of response in the case of the present invention, and curve Y shows a speed of response in the case where the polymer network 76 is not subjected to stabilization treatment. The liquid crystal monomer is 1.8 weight %, and the applied voltage for stabilization is 5.4 V. According to the present invention, the response property for displaying of the liquid crystal display device is considerably enhanced.

FIGS. 70A to 70D are views showing a structure for the alignment division of the liquid crystal display device shown in FIG. 66. The color filter substrate 14 and TFT substrate 16 are provided with electrodes 28 and 32 and vertical alignment films 29 and 33. Although the alignment films are not shown in the above embodiments, the alignment films similar to the vertical alignment films 29 and 33 shown in FIG. 70 are provided. Further, the gate bus lines 40 and the subsidiary capacity electrodes 46 are shown in FIG. 70.

Figure 70A:
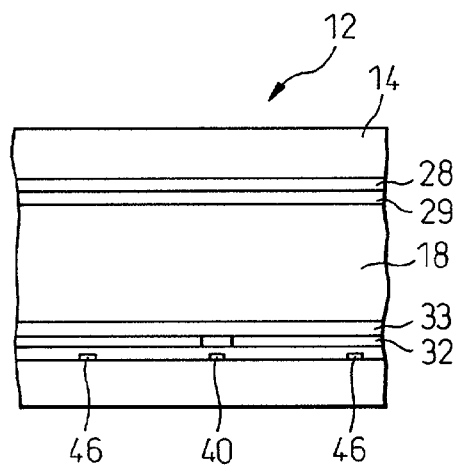
FIGS. 70A to 70D are views showing a structure for the alignment division of the liquid crystal display device shown in FIG. 66.
Figure 70B:
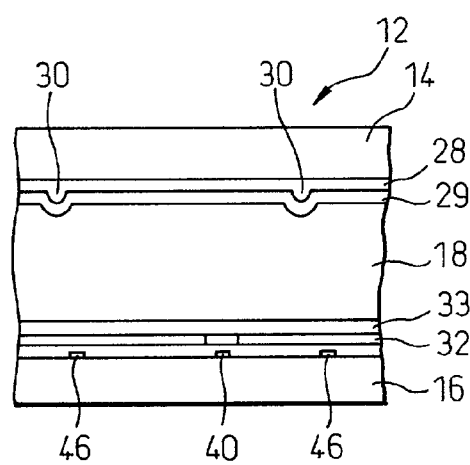

In the structure shown in FIG. 70A, there are provided no linear structures 30 and 34 and slits 38. In the stabilization treatment of this case, the gate bus lines 40 and the auxiliary capacitor electrodes 46 act as protruding structures. In FIG. 70B, the linear structures 30 are provided only on the color filter substrate 14. The linear structures 30 are provided at positions corresponding to the subsidiary capacity electrodes 46. Therefore, the linear structures 30 do not have an influence on the ratio of opening of the display region.

Figure 70C:
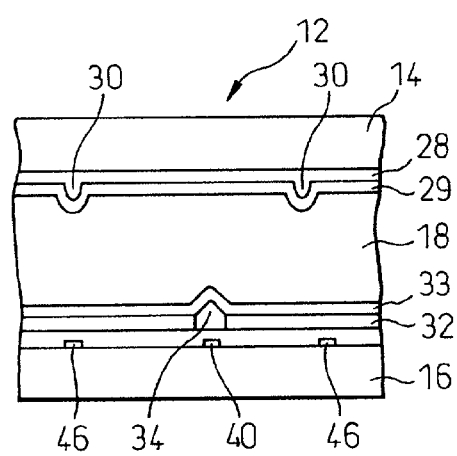

In FIG. 70C, the linear structures 30 are provided on the color filter substrate 14, and the linear structures 34 are provided on the TFT substrate 16. The linear structures 30 are provided at positions corresponding to the subsidiary capacity electrodes 46, and the linear structures 34 are provided at positions corresponding to the gate bus lines 40. Therefore, they do not affect the ratio of opening of the display region.

Figure 70D:
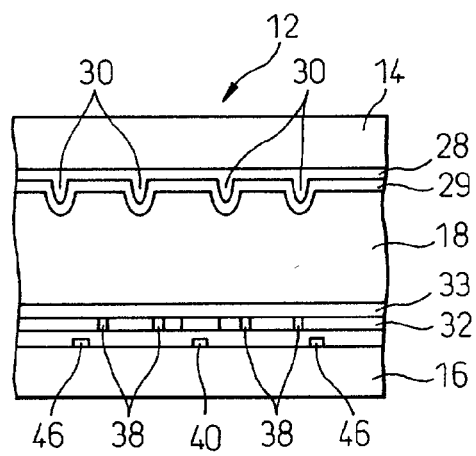

In FIG. 70D, the linear structures 30 are provided on the color filter substrate 14, and the slits 38 are provided on the TFT substrate 16. The linear structures 30 and the slits 38 are arranged at intervals shorter than those of the embodiment shown in FIG. 70C. For example, the linear structures 30 and the slits 38 can be arranged by the pattern shown in FIG. 38 or other patterns.

As explained above, according to the present invention, it is possible to provide a liquid crystal display device of high brightness by which a viewer is capable of viewing an excellent image area over a wide viewing angle.

The invention claimed is:

1. A liquid crystal display device comprising:
   a liquid crystal cell comprising a pair of substrates and a liquid crystal layer arranged between the pair of substrates, the liquid crystal of the liquid crystal cell being of a vertical alignment type;
   first and second polarizers arranged on either side of the liquid crystal cell;
   a first retardation plate arranged between the liquid crystal cell and the first polarizer;
   a second retardation plate arranged between the liquid crystal cell and the second polarizer;
   each of the first and second retardation plates having an optical axis in a plane parallel to the surfaces of the substrates and a retardation of substantially $\lambda/4$, the optical axis of the first retardation plate being perpendicular to the optical axis of the second retardation plate, the negative retardation $((nx+ny)/2-nz)$ of each of the retardation plates being approximately zero;
   a first optical plate arranged on or near the liquid crystal cell and having refractive indices in the relationship of $nx=ny>nz$, the first optical plate having a retardation the value of which is identical to that of the liquid crystal layer and the sign of which is reverse to that of the liquid crystal layer;
   a second optical plate having refractive indices in the relationship of $nx=ny<nz$, said second optical plate or a part thereof being arranged on or near the first polarizer; and
   a third optical plate arranged on or near the second polarizer and having refractive indices in the relationship of $nx>ny=nz$.

2. A liquid crystal display device according to claim 1, wherein the retardation of the second optical plate is not less than 80 nm and not more than 300 nm.

3. A liquid crystal display device according to claim 1, wherein the retardation of the third optical plate is not less than 25 nm and not more than 160 nm.

* * * * *

UNITED STATES PATENT AND TRADEMARK OFFICE
CERTIFICATE OF CORRECTION

PATENT NO. : 7,151,582 B2  Page 1 of 1
APPLICATION NO. : 10/079008
DATED : December 19, 2006
INVENTOR(S) : Yoshida et al.

It is certified that error appears in the above-identified patent and that said Letters Patent is hereby corrected as shown below:

On the Title Page

Under "(56) U.S. Patent Documents", insert the following references:

-- 6,661,488 12/2003 Takeda et al. --
        -- 6,281,956 08/2001 Ohmuro et al.--

Under "Foreign Patent Documents" insert the following references:

-- EP 0538796 01/1993 --
        -- JP 11-258605 09/1999--
        -- JP 10-153782 06/1998 --
        -- JP 08-247210 11/1996 --

Under "Other Publications" insert the following document:

-- Lien et al., "Ridge and Fringe-Field Multi-Domain Homeotropic LCD," SID 98, 5/98 --

-- Chen et al., "Optimum Film Compensation Modes for TN and VA LCD's," SID 1998, 5/98--

Signed and Sealed this

Tenth Day of July, 2007

JON W. DUDAS
*Director of the United States Patent and Trademark Office*